(12) United States Patent
Lei et al.

(10) Patent No.: US 12,719,273 B2
(45) Date of Patent: Aug. 25, 2026

(54) SMART CONNECTION DEVICE, JUMP STARTER, AND BATTERY CLAMP

(71) Applicant: SHENZHEN CARKU TECHNOLOGY CO., LIMITED, Shenzhen (CN)

(72) Inventors: Yun Lei, Shenzhen (CN); Zhifeng Zhang, Shenzhen (CN); Ming Chen, Shenzhen (CN); Jianping Lin, Shenzhen (CN); Mingxing Ouyang, Shenzhen (CN)

(73) Assignee: SHENZHEN CARKU TECHNOLOGY CO., LIMITED, Shenzhen (CN)

( * ) Notice: Subject to any disclaimer, the term of this patent is extended or adjusted under 35 U.S.C. 154(b) by 708 days.

(21) Appl. No.: 18/319,814

(22) Filed: May 18, 2023

(65) Prior Publication Data

US 2023/0291200 A1 Sep. 14, 2023

Related U.S. Application Data

(63) Continuation of application No. PCT/CN2021/094489, filed on May 19, 2021.

(30) Foreign Application Priority Data

Nov. 19, 2020 (CN) ......................... 202011306688.8
Nov. 19, 2020 (CN) ......................... 202011306689.2
(Continued)

(51) Int. Cl.
*H02J 1/10* (2026.01)
*H02J 7/60* (2026.01)
*H02J 7/68* (2026.01)

(52) U.S. Cl.
CPC .............. *H02J 1/122* (2020.01); *H02J 7/663* (2026.01); *H02J 7/68* (2026.01)

(58) Field of Classification Search
CPC .... H02J 1/122; H02J 7/663; H02J 7/68; H02J 7/62; H02J 7/65; H02J 7/685; H02H 7/18
(Continued)

(56) References Cited

U.S. PATENT DOCUMENTS 5,793,185 A * 8/1998 Prelec ................ H01M 6/5033 320/105
6,791,809 B2 * 9/2004 Pannwitz ............... H02J 7/663 361/90
(Continued)

FOREIGN PATENT DOCUMENTS

CN 201674224 U 12/2010
CN 102055184 A 5/2011
(Continued)

OTHER PUBLICATIONS

WIPO, International Search Report and Written Opinion for International Application No. PCT/CN2021/094489, Jul. 12, 2021.
(Continued)

*Primary Examiner* — M Baye Diao
(74) *Attorney, Agent, or Firm* — HAUPTMAN HAM, LLP

(57) ABSTRACT

The present disclosure provides a smart connection device, a jump starter and a battery clamp. The smart connection device includes a power connection terminal electrically couple with a power source, a load connection terminal electrically couple with an external load, a switch element electrically coupled between the power connection terminal and the load connection terminal, and a switch drive module electrically coupled to the switch element. A reverse connection detection module detects a connection state between
(Continued)

the load connection terminal and the external load, and outputs a corresponding control signal to switch operation states of the switch drive module. The switch drive module in an active state is able to respond to a drive signal to turn on the switch element. The switch element is in an off state when the switch drive module is in a disable state, to prevent the power source from discharging to the external load.

29 Claims, 24 Drawing Sheets

(30) Foreign Application Priority Data

Nov. 19, 2020 (CN) ......................... 202011307492.0
Nov. 19, 2020 (CN) ......................... 202011307745.4
Nov. 19, 2020 (CN) ......................... 202011318257.3

(58) Field of Classification Search
USPC .......................................................... 320/105
See application file for complete search history.

(56) References Cited

U.S. PATENT DOCUMENTS

| | | | | |
|---|---|---|---|---|
| 7,514,900 | B2 * | 4/2009 | Sander | H02J 7/35 320/101 |
| 7,855,865 | B2 * | 12/2010 | Saarinen | H02J 7/62 361/111 |
| 8,199,024 | B2 * | 6/2012 | Baxter | H01R 13/641 340/687 |
| 8,587,266 | B2 * | 11/2013 | Yang | H02M 5/293 323/244 |
| 9,768,435 | B2 * | 9/2017 | Koebler | H01M 10/425 |
| 9,957,942 | B2 * | 5/2018 | Sierak | F02N 11/0862 |
| 10,148,105 | B2 * | 12/2018 | Lei | F02N 11/10 |
| 11,114,869 | B2 * | 9/2021 | Inskeep | H02J 7/68 |
| 11,277,014 | B1 * | 3/2022 | Lei | H02J 7/68 |
| 11,979,045 | B2 * | 5/2024 | Lei | H02J 7/68 |
| 2006/0145655 | A1 * | 7/2006 | Sheng | H02J 7/68 320/105 |
| 2010/0283623 | A1 | 11/2010 | Baxter et al. | |
| 2011/0211286 | A1 | 9/2011 | Pan et al. | |
| 2015/0306964 | A1 * | 10/2015 | Wang | B60L 53/00 320/162 |
| 2018/0006478 | A1 * | 1/2018 | Lei | F02N 11/10 |

FOREIGN PATENT DOCUMENTS

| | | | | | |
|---|---|---|---|---|---|
| CN | 202042902 | U | | 11/2011 | |
| CN | 104134990 | A | | 11/2014 | |
| CN | 104218537 | A | | 12/2014 | |
| CN | 204354966 | U | | 5/2015 | |
| CN | 204559193 | A | | 8/2015 | |
| CN | 105226943 | B | * | 7/2018 | H02M 3/1588 |
| CN | 108448344 | A | | 8/2018 | |
| CN | 108979931 | A | | 12/2018 | |
| CN | 109995103 | A | | 7/2019 | |
| JP | 1980101765 | A | | 8/1980 | |
| JP | 2002051453 | A | | 2/2002 | |
| KR | 102086848 | B1 | | 3/2020 | |
| WO | 2013123943 | A2 | | 8/2013 | |
| WO | 2020177467 | A1 | | 9/2020 | |

OTHER PUBLICATIONS

Second Office Action issued in corresponding CN application No. 202011306688.8 dated Feb. 14, 2026.
The extended European search report issued in corresponding EP application No. 21893315.8 dated Apr. 22, 2024.
The first office action issued in corresponding CA application No. 3199720 dated Sep. 24, 2024.
The first office action issued in corresponding CN application No. 202180001843.1 dated Jul. 6, 2023.
“New Energy Vehicle Technology and Application”, Wei Ling et al., Metallurgical Industry Press, pp. 121-124, Sep. 2018.
The second office action issued in corresponding CN application No. 202180001843.1 dated Jan. 4, 2024.
“Neusoft Carrier MCU Application System”, compiled by Shanghai Neusoft Carrier Microelectronics Co., Ltd., Beijing University of Aeronautics and Astronautics Press, p. 216, Jan. 2017.
Decision to refuse issued in corresponding CN application No. 202180001843.1 dated Mar. 29, 2024.

* cited by examiner

SMART CONNECTION DEVICE, JUMP STARTER, AND BATTERY CLAMP

CROSS-REFERENCE TO RELATED APPLICATION(S)

The present disclosure is a continuation application of International Application No. PCT/CN2021/094489, filed on May 19, 2021, which claims priority to Chinese Patent Application No. 202011318257.3, 202011306689.2, 202011306688.8, 202011307745.4, 202011307492.0, entitled "smart connection device, jump starter and battery clamp", each filed on Nov. 19, 2020, the entire disclosures of all of which are hereby incorporated by reference in their entireties.

TECHNICAL FIELD

The present disclosure relates to the field of electronic technology, and more particularly to a smart connection device, a jump starter, and a battery clamp.

BACKGROUND

Emergency jump starter products currently available on the market can realize an emergency start-up output function to start an engine of a vehicle. However, start-up circuits of most products are not capable of automatically recognizing polarities of connected electrodes. In an electrical connection operation between a jump starter and an external load such as a vehicle battery, some users cannot correctly distinguish the polarities of the connected electrodes of the external load and an output terminal of the jump starter. When the electrodes of the external load and the output terminal of the jump starter are incorrectly coupled together, for example, the connection electrodes of the two are reversely connected, related circuits may be short circuited, which may cause damage to external load or a battery of the jump starter, and may even cause fire which may bring safety incidents, such as property damage, personnel injury, etc.

Some jump starters currently available on the market are provided with a polarity recognition circuit or a polarity reverse connection protection circuit. However, most of them use a photoelectric isolation device as a polarity detection device. When the electrodes are reversely connected, the photoelectric isolation device outputs a reverse connection signal, and then a controller (such as MCU) disconnects a discharging circuit of the jump starter according to the reverse connection signal. At the same time, the controller also controls a corresponding state indication circuit to raise an alarm prompt.

However, the photoelectric isolation devices and the controllers have application defects such as high cost, easy attenuation of service life, long response time, and easy failure due to external interference. When the user reversely connects the electrodes of the external load and the output terminal of the jump starter, once the photoelectric isolation device fails or the transmission of the reverse connection signal is abnormal, it will cause the controller to make a misjudgment, so that the controller cannot accurately and timely respond to the reverse connection signal to cut off the discharge of the jump starter in time. In this way, it is easy to cause damage to the jump starter or the external load.

SUMMARY

To solve the above-mentioned application defects of existing polarity detection circuits for connection electrodes and a power output control system, the present disclosure provides a smart connection device, a jump starter, and a battery clamp, which can quickly detect and respond to a reverse connection state of the external load, and control a discharge of the power source to the external load in time, thereby improving detection speed and effectiveness of relevant protection functions, and improving safety and reliability of a power output control system.

A first aspect of the present disclosure provides a smart connection device. The smart connection device includes a power connection terminal, a load connection terminal, a switch circuit, a controller, and a detection unit. The power connection terminal is configured to electrically couple with a power source. The load connection terminal is configured to electrically couple with an external load. The switch circuit is electrically coupled between the power connection terminal and the load connection terminal. The controller is electrically coupled to the switch circuit and configured to output a drive signal to the switch circuit, wherein the switch circuit is able to enter a conducting state based on the drive signal output by the controller, so as to conduct an electrical connection between the power source and the external load, thereby realizing a discharge of the power source to the external load. The detection unit is electrically coupled to the load connection terminal. The detection unit is configured to detect a connection state between the load connection terminal and the external load, and output a corresponding control signal according to a detected connection state. The control signal is not sent to the controller.

A second aspect of the present disclosure provides a jump starter. The jump stater includes a housing, a battery pack, and the smart connection device described in the first aspect. The battery pack and at least part of structures of the smart connection device are provided in the housing, and the power connection terminal of the smart connection device is electrically coupled to the battery pack of the jump starter.

A third aspect of the present disclosure provides a battery clamp. The battery clamp includes a housing, a power input interface, a connection element, and the smart connection device described in the first aspect. The power input interface is provided on the housing, and the power input interface is configured to electrically couple with an external power device, wherein the external power device includes a battery pack. At least part of structures of the smart connection device are provided in the housing, and the power connection terminal of the smart connection device is electrically coupled to the power input interface, and is electrically coupled to the battery pack of the external power device through the power input interface. One end of the connection element is electrically coupled to the load connection terminal of the smart connection device, and the other end of the connection element is configured to electrically couple with an external load.

BRIEF DESCRIPTION OF THE DRAWINGS

In order to illustrate the technical solutions of the embodiments of the present disclosure more clearly, the accompanying drawings required for describing the embodiments will be briefly introduced below. It is obvious that the accompanying drawings described below only illustrate some embodiments of the present disclosure. Those skilled in the art may also obtain other drawings based on these accompanying drawings without paying any creative efforts.

DESCRIPTION OF SYMBOLS OF MAIN COMPONENTS

Figure 1:
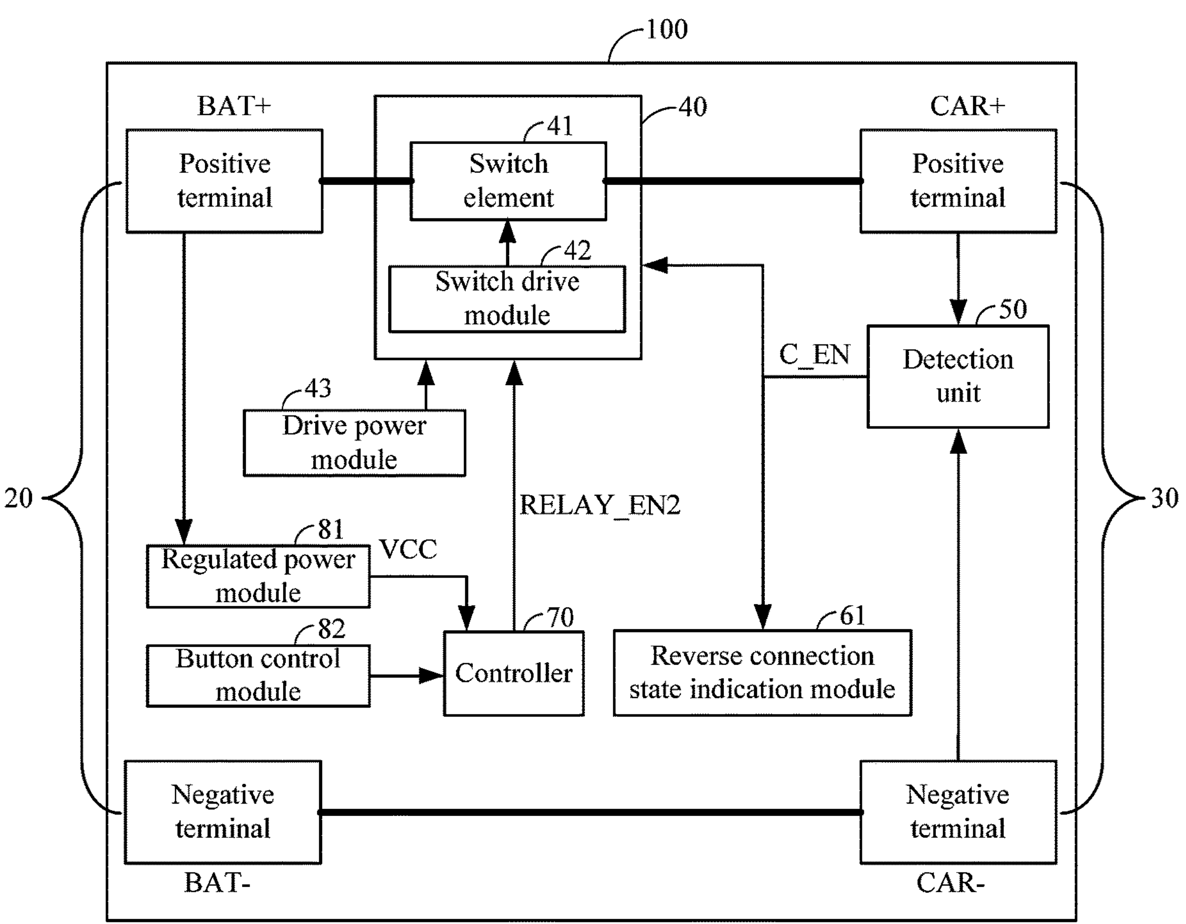
FIG. 1 is a schematic diagram of functional modules of a smart connection device according to an embodiment of the present disclosure.

Smart connection device 100, 101, 102, 103, 104, 105, 106, 107, 108; current output circuit 11; power connection terminal 20; positive terminal BAT+; negative terminal BAT−; load connection terminal 30; positive terminal CAR+; negative terminal CAR−; first ground terminal PGND; switch circuit 40; switch element 41; relay K1; drive power circuit 410; switch drive module 42; drive signal input terminal 421, 421*a*; disable signal input terminal 422; switch unit Q2; software-driven module 42*a*; software-driven switch Q21; hardware-driven module 42*b*; load voltage detection terminal 421*b*; hardware-driven switch Q22; drive power module 43; drive power input terminal 431; drive control switch Q81; disable control module 44; disable signal output terminal 441; disable control switch Q82; drive signal transmission module 45; first input terminal 451; second input terminal 452; output terminal 453; logic AND gate U3; detection unit 50; reverse connection detection module 50*a*, 50*b*, 50*c*, 50*d*, 50*e*, 50*f*; first detection terminal 51; second detection terminal 52; drive voltage input terminal 53; control signal output terminal 54; first transistor Q3; second transistor Q6; second ground terminal GND; load connection state indication module 60; reverse connection state indication module 61; third transistor Q1; display unit 611; light-emitting diode LED2; alarm unit 612; loudspeaker LS1; capacitor C6; forward connection state indication module 62; controller 70; micro controller U2; regulated power module 81, 81'; power input terminal 811; regulated power output terminal 812; regulated power generation module 813; control switch module 814; voltage control switch Q83; button control module 82; button module 51; button control switch Q84; load voltage detection module 83; temperature detection module 84; current detection module 85; over-current and short-circuit protection module 86; resistor R2, R3, R4, R5, R10, R11, R16, R17, R21, R22, R23, R27, R26; diode D1, D3, D6, D41; zener diode D9; jump starter 200, 200'; housing 201, 201', 301; battery pack 202; connection jack 203, 501; charging interface 204; battery clamp 300; power input interface 302; connection element 400, 205, 303; first wire clamp 401; second wire clamp 402; cable 403; connection plug 404; external power device 500.

The present disclosure will be further illustrated by following specific embodiments with reference to the above-mentioned accompanying drawings.

DETAILED DESCRIPTION

Technical solutions in the embodiments of the present disclosure will be clearly and completely described below with reference to the accompanying drawings in the embodiments of the present disclosure. It is understood that the accompanying drawings are only for illustrative purposes, and are only schematic drawings, which cannot be understood as restrictions on the present disclosure. Obviously, the described embodiments are only part of the embodiments of the present disclosure, not all the embodiments. Based on the embodiments in the present disclosure, all other embodiments obtained by those skilled in the art without paying any creative efforts fall within the scope of protection of the present disclosure.

Unless otherwise defined, all technical and scientific terms used in the present disclosure have the same meanings as those commonly understood by those skilled in the art. The terms used in the specification of the present disclosure are only for the purpose of describing the specific embodiment, and are not intended to limit the present disclosure.

A first aspect of the present disclosure provides a smart connection device. In the smart connection device, a detection unit is configured to detect a connection state between a load connection terminal and an external load. When the detection unit detects that the external load is reversely coupled to the load connection terminal, the detection unit outputs a control signal to directly disconnect a switch circuit electrically coupled between the external load and a power source. In this way, the control signal corresponding to a reverse connection state of the external load can be quickly responded to, so as to prevent the power source from discharging to the external load. Wherein, the smart connection device can be applied in an emergency jump stater, and can also be applied in a battery clamp.

FIG. 1 is a schematic diagram of functional modules of a smart connection device 100 provided by the present disclosure. As illustrated in FIG. 1, the smart connection device 100 includes a power connection terminal 20, a load connection terminal 30, and a switch circuit 40. The power connection terminal 20 is configured to electrically couple with a power source (not illustrated). The load connection terminal 30 is configured to electrically couple with an external load (not illustrated). The switch circuit 40 is electrically coupled between the power connection terminal 20 and the load connection terminal 30, and configured to conduct or disconnect an electrical connection between the power source and the external load.

Figure 2:
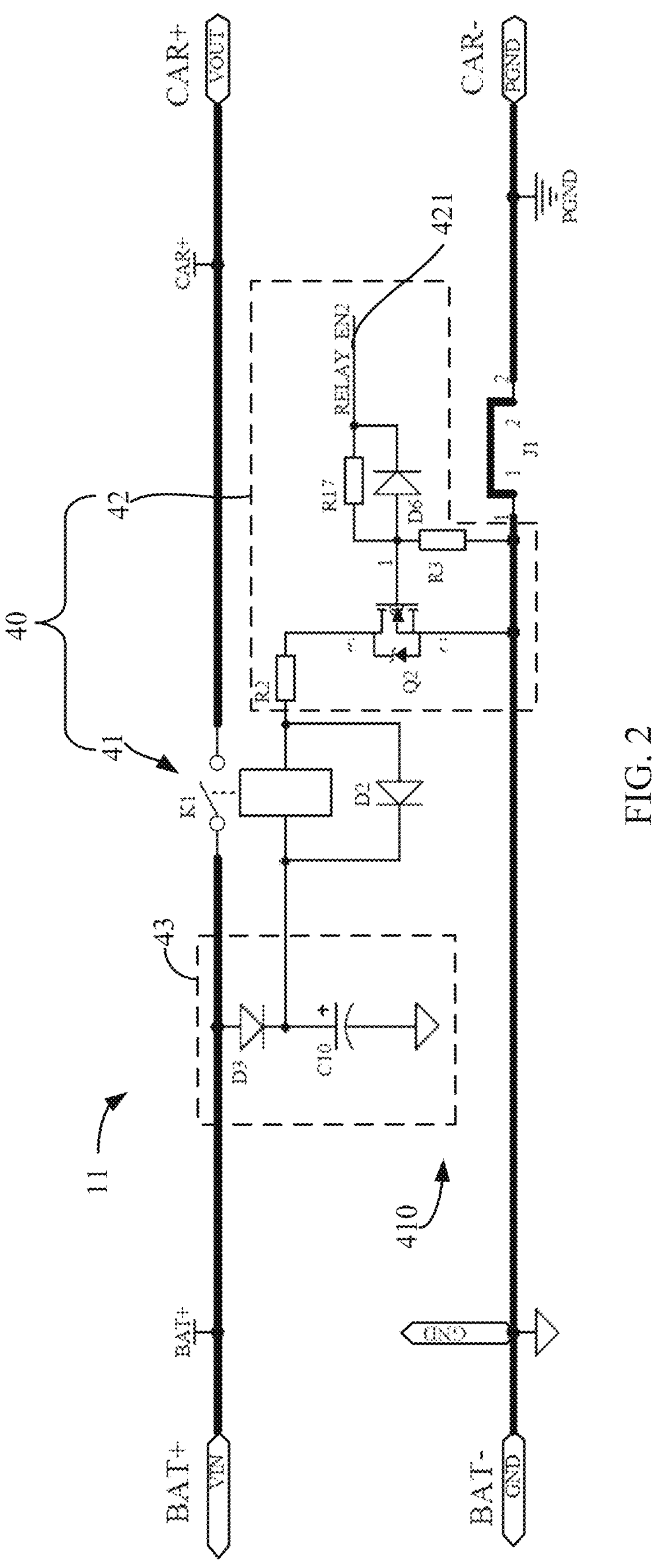
FIG. 2 is a schematic diagram of circuit structures of a current output circuit of the smart connection device illustrated in FIG. 1.

Referring to FIG. 1 and FIG. 2 together, the power connection terminal 20, the load connection terminal 30, and the switch circuit 40 cooperate to form a current output circuit 11 through which the power source can discharge to the external load. The switch circuit 40 is configured to conduct or disconnect the current output circuit 11. In this way, the power source can discharge to the external load through the smart connection device 100.

In this embodiment, the power connection terminal 20 includes a positive terminal BAT+ and a negative terminal BAT−. The positive terminal BAT+ and the negative terminal BAT− are configured to electrically couple with a positive electrode and a negative electrode of the power source in a one-to-one correspondence. The power source is coupled to the smart connection device 100 through the power connection terminal 20, so as to provide operating voltage for the smart connection device 100 and provide, through the switch circuit 40, electrical energy for the external load. It can be understood that when the smart connection device 100 is applied in an emergency jump starter, the power source may be a built-in battery module of the emergency jump starter. When the smart connection device 100 is applied in a battery clamp, the power source may be a battery module of an external power device such as an external emergency jump starter or another energy storage power devices.

The load connection terminal 30 includes a positive terminal CAR+ and a negative terminal CAR−. The positive terminal CAR+ and the negative terminal CAR− are configured to electrically couple with a positive electrode and a negative electrode of the external load in a one-to-one correspondence. The negative terminal CAR− is also electrically coupled to a first ground terminal PGND. The external load may be a vehicle battery or an engine of a vehicle. It can be understood that the vehicle battery includes but is not limited to a lead-acid battery, a lithium battery, and a super capacitor. Taking an example in which the power source is a built-in battery module of an external emergency jump starter, and the external load is a battery or an engine of a vehicle, when the external emergency jump starter is correctly coupled to the smart connection device 100 through the power connection terminal 20, and the external load is correctly coupled to the load connection terminal 30, the external emergency jump starter is able to discharge through the current output circuit 11 formed by the power connection terminal 20, the switch circuit 40, and the load connection terminal 30, so as to provide emergency starting electrical energy for the vehicle battery or the engine of the vehicle. In other words, the external emergency jump starter charge the vehicle battery. In this way, the vehicle can still be started even when its vehicle battery is in a low state-of-charge (SOC). It needs to be noted that, in the present disclosure, "correctly coupled/connected" can also be understood as "forward coupled/connected". Hereinafter, "forward connection" or the like between the external load and the power connection terminal 20 means "correct connection".

Referring to FIG. 1 again, the smart connection device 100 further includes a regulated power module 81 electrically coupled to the power connection terminal 20. The regulated power module 81 is configured to receive, through the power connection terminal 20, an input voltage provided by the power source, and perform voltage conversion on the input voltage to output a stable voltage VCC, such as a DC voltage of 5V, so as to provide a stable operating voltage for various functional modules of the smart connection device 100. For example, when the external emergency jump starter is correctly coupled to the smart connection device 100 through the power connection terminal 20, the regulated power module 81 can obtain the input voltage and work normally, and output the stable voltage VCC to power the functional modules of the smart connection device 100. In this way, the functional modules are powered on and work normally. In other embodiments, the regulated power module 81 may also be electrically coupled to the load connection terminal 30 to receive, through the load connection terminal 30, the input voltage provided by the external load, and perform voltage conversion on the input voltage to output the stable voltage VCC. Wherein, the regulated power module 81 may be a DC-DC converter or a linear regulator, such as a low-dropout linear regulator (LDO).

In this embodiment, the smart connection device 100 further includes a drive power module 43 electrically coupled to the switch circuit 40. The drive power module 43 is configured to supply electrical energy to the switch circuit 40 to energize the switch circuit 40. In this embodiment, an on-off state of the switch circuit 40 is not controllable unless the switch circuit 40 is energized. When the switch circuit 40 is de-energized, the switch circuit 40 is automatically disconnected, with its on-off state being not controllable, that is, the switch circuit 40 is disable. It needs to be noted that the "disable" of the switch circuit 40 referred to herein means that the switch circuit 40 is prevented from responding to any relevant signals such as a drive signal, that is, the switch circuit 40 is in a state in which the switch circuit 40 is not controlled by any relevant signals.

In an embodiment, the drive power module 43 is electrically coupled to the power connection terminal 20, and the electrical energy of the switch circuit 40 is provided by the power source electrically coupled to the power connection terminal 20. Optionally, in another embodiment, the drive power module 43 may also be electrically coupled to the regulated power module 81, and the electrical energy of the switch circuit 40 is provided by the stable voltage VCC that is output by the regulated power module 81.

In the embodiment, the smart connection device 100 further includes a controller 70 electrically coupled to the switch circuit 40. The controller 70 is configured to output a drive signal RELAY_EN2 to the switch circuit 40. In this embodiment, the switch circuit 40 that is energized is able to enter a conducting state based on the drive signal RELAY_EN2 that is output by the controller 70, so as to conduct the electrical connection between the power source and the external load, thereby realizing the discharge of the power source to the external load.

Specifically, in this embodiment, the switch circuit 40 includes a switch element 41 and a switch drive module 42. The switch element 41 is electrically coupled between the power connection terminal 20 and the load connection terminal 30. In this embodiment, the switch element 41 is electrically coupled between the positive terminal BAT+ and the positive terminal CAR+. In another embodiment, the switch element 41 may also be electrically coupled between the negative terminal BAT− and the negative terminal CAR−.

The switch drive module 42 is electrically coupled to the switch element 41 and the controller 70 respectively, and configured to turn on or turn off the switch element 41. The controller 70 is configured to send the drive signal RELAY_EN2 to the switch drive module 42, to turn on the switch element 41 through the switch drive module 42.

The switch element 41 may be an electromagnetic relay or a semiconductor power device, such as a metal oxide semiconductor field effect transistor (MOSFET). In this embodiment, as illustrated in FIG. 2, the switch element 41 is an electromagnetic relay K1, one of the contacts of the relay K1 is electrically coupled to the positive terminal BAT+, and the other contact is electrically coupled to the positive terminal CAR+. One end of the power supply coil of the relay K1 is electrically coupled to the positive terminal BAT+, and the other end of the power supply coil is electrically coupled to the switch drive module 42.

In this embodiment, the smart connection device 100 further includes a button control module 82 electrically coupled to the controller 70. The button control module 82 is able to receive a user's pressing operation, and generate a button instruction in response to the pressing operation, wherein the button instruction is configured to force the controller 70 to output the drive signal RELAY_EN2, so as to realize the discharge of the power source to the external load.

It can be understood that working modes of the controller 70 may include an automatic output mode and a forced output mode. In an embodiment, the controller 70 enters the automatic output mode by default after being powered on. When the controller 70 is in the automatic output mode, the controller 70 does not output the drive signal RELAY_EN2 until it determines that the external load is correctly coupled to the load connection terminal 30 and a load voltage of the external load meets a preset starting condition. The controller 70 enters the forced output mode upon receiving a button instruction, and immediately outputs the drive signal RELAY_EN2 in response to the button instruction. In an embodiment, the controller 70 resumes the automatic output mode after outputting the drive signal RELAY_EN2 in response to the button instruction.

Figure 3:
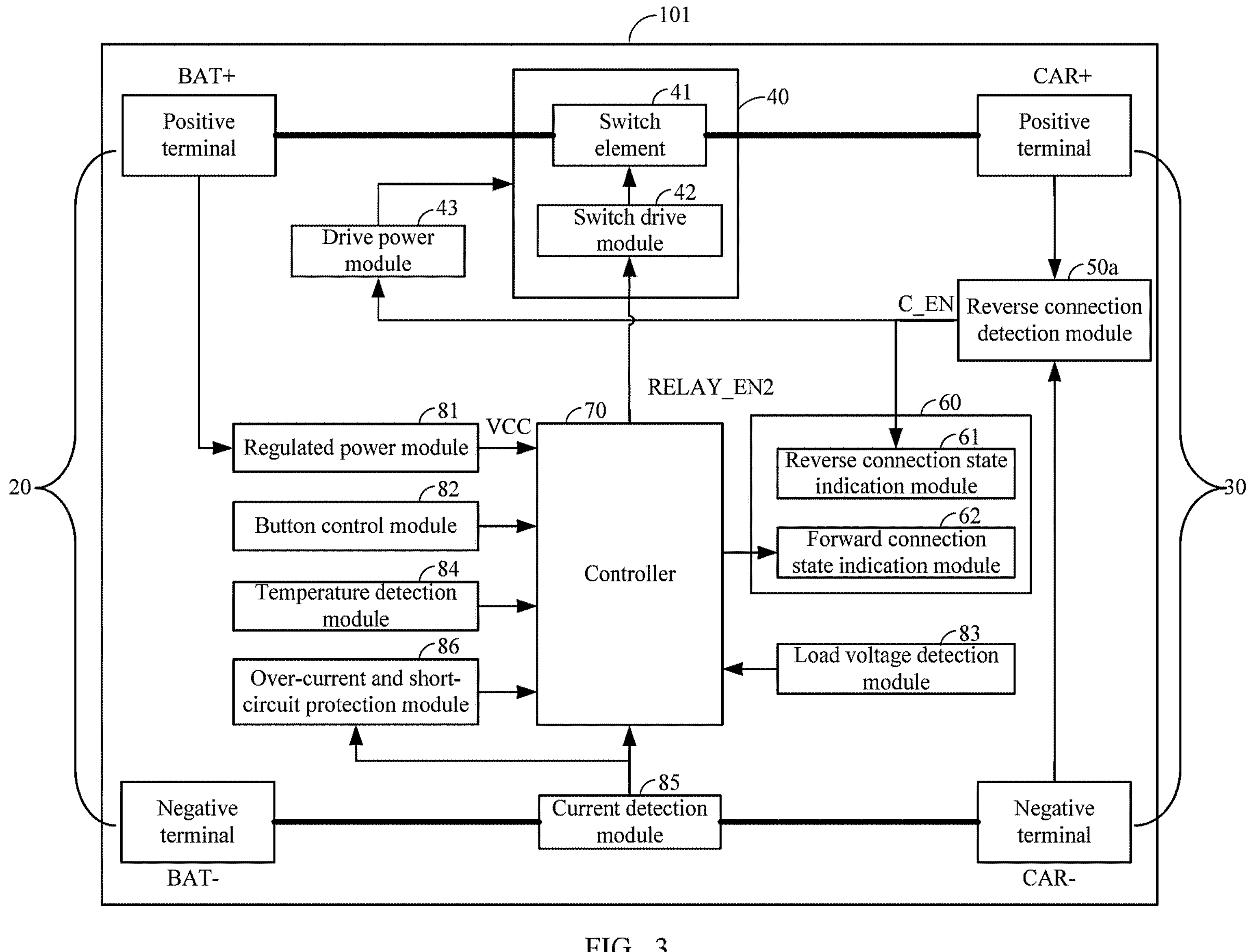
FIG. 3 is a schematic diagram of functional modules of a smart connection device according to a first embodiment of the present disclosure.

In this embodiment, the smart connection device 100 further includes a load voltage detection module 83 (as illustrated in FIG. 3) electrically coupled to the load connection terminal 30. The load voltage detection module 83 is configured to detect, through the load connection terminal 30, a load voltage of the external load, and then output a corresponding load voltage sampling signal. The controller 70 is also electrically coupled to the load voltage detection module 83. When in the automatic output mode, the controller 70 is further configured to receive the load voltage sampling signal output by the load voltage detection module 83, and determine a connection state and a load voltage change state of the external load according to the load voltage sampling signal, so as to determine whether the load voltage of the external load meets a preset starting condition. The controller 70 is further configured to output the drive signal RELAY_EN2 to the switch circuit 40 when it determines that the external load is correctly coupled to the load connection terminal 30 and the load voltage of the external load meets the preset starting condition, so as to conduct the switch circuit 40. Wherein, the preset starting condition may be set as: the voltage value of the external load falls within a preset time interval by an amplitude exceeding a preset amplitude threshold, that is, the load voltage of the external load drops sharply.

In this embodiment, the smart connection device 100 further includes a detection unit 50 electrically coupled to the load connection terminal 30. The detection unit 50 is configured to detect a connection state between the load connection terminal 30 and the external load, and output a corresponding control signal C_EN according to a detected connection state. Specifically, the control signal C_EN includes a first control signal and a second control signal. The detection unit 50 outputs the first control signal when it detects that the external load is reversely coupled to the load connection terminal 30, and outputs the second control signal when it detects that the load connection terminal 30 is under a no-load state or the external load is correctly coupled to the load connection terminal 30.

The switch circuit 40 can be in a disconnected state based on the first control signal, so as to disconnect the electrical connection between the power source and the external load, thereby preventing the power source from discharging to the external load. In this embodiment, the control signal C_EN is not sent to the controller 70.

Since the user can force, through the button control module 82, the controller 70 to output the drive signal RELAY_EN2, when the starting condition is not met, if the user inputs the button instruction to force the controller 70 to output the drive signal RELAY_EN2 to conduct the switch circuit 40 to realize the discharging to the external load, a safety accident may occur. In the present disclosure, when it is detected that the external load is reversely coupled to the load connection terminal 30, the switch circuit 40 electrically coupled between the external load and the power source is directly disconnected based on the first control signal output by the detection unit 50. At this time, even if the user inputs the button instruction to force the controller 70 to output the drive signal RELAY_EN2, the switch circuit 40 will not respond to the drive signal RELAY_EN2, thereby effectively preventing the power source from discharging to the external load, so that safety of the circuits can be ensured. In addition, the control signal C_EN is not sent to the controller 70, a situation that the switch circuit 40 is controlled by the controller 70 resulting in a long response time, or the switch circuit 40 cannot be disconnected timely due to the failure of the controller 70, can be therefore avoided.

The technical solutions provided by the first aspect of the present disclosure will be described in detail below through several specific embodiments.

First Embodiment

The first embodiment of the present disclosure provides a smart connection device. In the smart connection device, the detection unit is configured to detect the connection state between the load connection terminal and the external load, and the electrical energy supplied to the switch circuit is directly controlled by the control signal output by the detection unit, so that the electrical energy supplied to the switch circuit can be suspended when the external load is reversely connected, thereby making the switch circuit be in the disconnected state. In this way, the control signal corresponding to the reverse connection state of the external load can be quickly responded to, so as to prevent the power source from discharging to the external load.

FIG. 3 is a schematic diagram of functional modules of a smart connection device 101 according to the first embodiment of the present disclosure. It should be noted that the smart connection device 101 corresponds to the smart connection device 100 illustrated in FIG. 1.

As illustrated in FIG. 3, in the first embodiment, the detection unit 50 includes a reverse connection detection module 50*a*. The reverse connection detection module 50*a* is configured to detect the connection state between the load connection terminal 30 and the external load, and output a corresponding control signal C_EN according to the detected connection state.

The reverse connection detection module 50*a* is also electrically coupled to the drive power module 43, and the reverse connection detection module 50*a* is further configured to send the control signal C_EN to the drive power module 43, to control the drive power module 43 to supply electrical energy to the switch circuit 40, or to control the drive power module 43 to suspend supplying electrical energy to the switch circuit 40. In this way, the switch circuit 40 can be energized or de-energized based on the control signal C_EN. Wherein, the switch circuit 40 can enter the conducting state based on the drive signal RELAY_EN2 output by the controller 70 when the switch circuit 40 is energized, so as to conduct the electrical connection between the power source and the external load. The switch circuit 40 is in the disconnected state when it is de-energized, so as to disconnect the electrical connection between the power source and the external load.

Specifically, as described above, the control signal C_EN includes a first control signal and a second control signal. In the first embodiment, the reverse connection detection module 50*a* is configured to output the first control signal when it detects that the external load is reversely coupled to the load connection terminal 30, and send the first control signal to the drive power module 43, to control the drive power module 43 to suspend the electrical energy supplied to the switch circuit 40, so as to cut off the electrical energy supplied to the switch circuit 40, to keep the switch circuit 40 in the disconnected state, thereby disconnecting the electrical connection between the power source and the external load. That is, the current output circuit 11 through which the power source discharges to the external load is disconnected, so as to prevent the power source from discharging to the external load.

The reverse connection detection module 50*a* is also configured to output the second control signal when it detects that the load connection terminal 30 is under a no-load state or the external load is correctly coupled to the load connection terminal 30, and send the second control signal to the drive power module 43, to control the drive power module 43 to supply electrical energy to the switch circuit 40, so that the switch circuit 40 is energized. It is understandable that the switch circuit 40 can be conducted or disconnected by the controller 70 according to actual operating conditions only when the switch circuit 40 is energized, so as to realize the discharge of the power source to the external load, or prevent the power source from discharging to the external load.

Since the user can force, through the button control module 82, the controller 70 to output the drive signal RELAY_EN2, when the external load is reversely coupled to the load connection terminal 30, the electrical energy supplied to the switch circuit 40 is cut off, which can prevent the switch circuit 40 from responding to the drive signal RELAY_EN2, wherein the drive signal RELAY_EN2 is output by the controller 70 in response to a button instruction input by the user, so as to prevent the power source from discharging to the external load. In this way, safety of the circuits can be ensured. In addition, the electrical energy of the drive power module 43 to the switch circuit 40 is directly controlled by the control signal C_EN output by the reverse connection detection module 50*a*, therefore, objectives of rapidly responding to the first control signal corresponding to the reverse connection state of the external load as well as timely disconnecting the discharge of the power source to the external load can be achieved.

Figure 4:
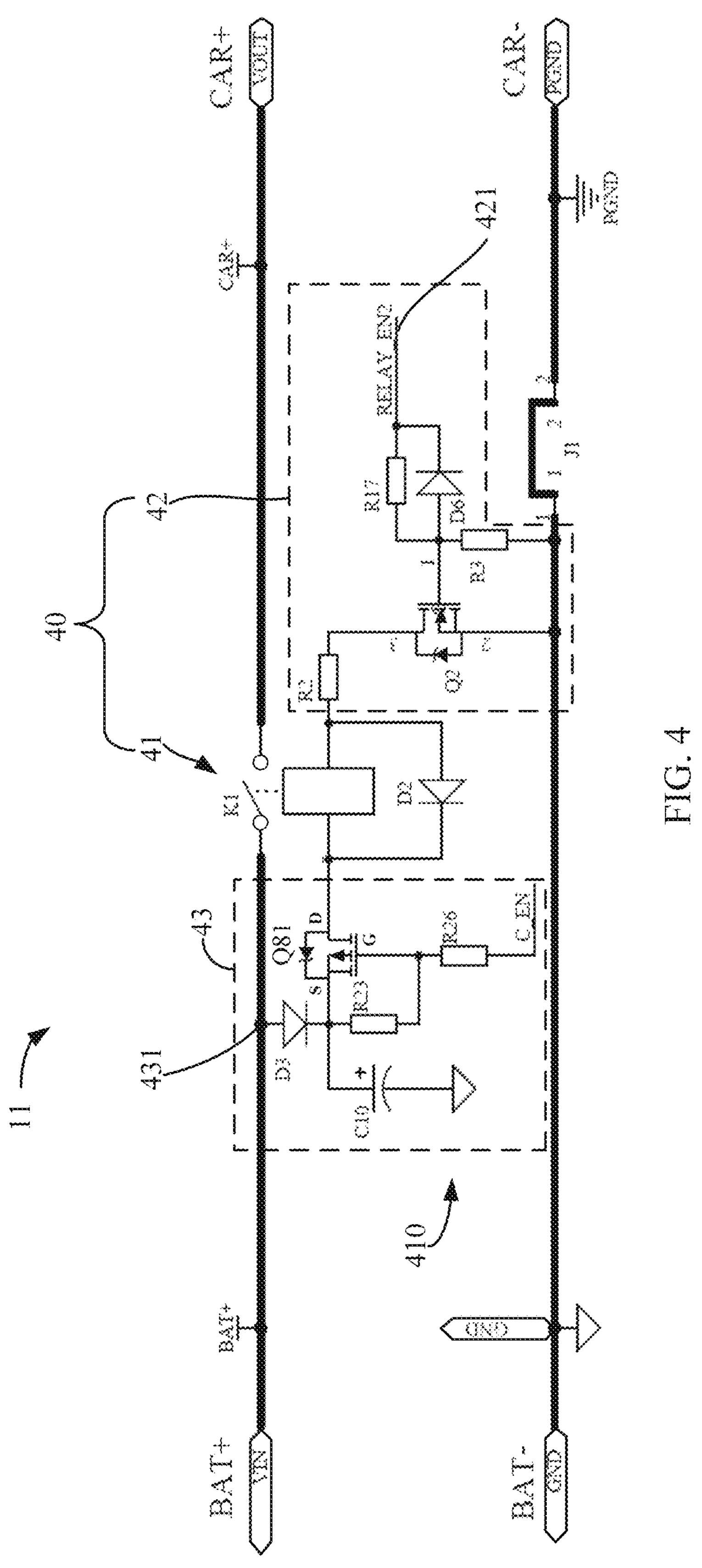
FIG. 4 is a schematic diagram of circuit structures of a current output circuit of the smart connection device illustrated in FIG. 3.

In the first embodiment, the circuit structures of the current output circuit 11 through which the power source discharges to the external load may adopt the circuit structures illustrated in FIG. 4. The circuit structures of the reverse connection detection module 50*a* may adopt the circuit structures illustrated in FIG. 5. The circuit structures and working principles of the drive power module 43 and the reverse connection detection module 50*a* will be described below with reference to FIG. 4 and FIG. 5.

Referring to FIG. 4, in the first embodiment, the drive power module 43 includes a drive power input terminal 431 and a drive control switch Q81. The drive control switch Q81 is electrically coupled between the drive power input terminal 431 and the switch circuit 40, and the switch circuit 40 receives the electrical energy through the drive power input terminal 431. The reverse connection detection module 50*a* sends the control signal C_EN to the drive control switch Q81 to switch the on-off state of the drive control switch Q81, thereby controlling the electrical energy from the drive power module 43 to the switch circuit 40. In response to the control signal C_EN, the drive control switch Q81 is configured to conduct or disconnect the electrical connection between the drive power input terminal 431 and the switch circuit 40.

Specifically, in the first embodiment, the drive power input terminal 431 is electrically coupled to the positive terminal BAT+. Optionally, in another embodiment, the drive power input terminal 431 may be electrically coupled to the regulated power module 81.

A first connection terminal S of the drive control switch Q81 is electrically coupled to the drive power input terminal 431 through a diode D3, wherein an anode of the diode D3 is electrically coupled to the drive power input terminal 431, and a cathode of the diode D3 is electrically coupled to the first connection terminal S of the drive control switch Q81. A second connection terminal D of the drive control switch Q81 is electrically coupled to one end of the power supply coil of the switch element 41, and a control terminal G of the drive control switch Q81 is electrically coupled to the drive power input terminal 431 through a resistor R23 and the diode D3. The control terminal G of the drive control switch Q81 is also electrically coupled to the reverse connection detection module 50*a* through a resistor R26, so that the electrical connection between the reverse connection detection module 50*a* and the drive power module 43 is realized, and the drive power module 43 can receive the control signal C_EN that is output by the reverse connection detection module 50*a*.

In other words, the drive power module 43, the power supply coil of the switch element 41, and the switch drive module 42 are electrically coupled to form a power supply circuit or a drive power circuit 410 of the switch element 41. The drive power input terminal 431 is configured to supply electrical energy to the switch element 41. The drive control switch Q81 and the switch drive module 42 are configured to control an on-off state of the drive power circuit 410. Wherein, the drive control switch Q81 is controlled by the control signal C_EN output by the reverse connection detection module 50*a*, and the switch drive module 42 is controlled by the drive signal RELAY_EN2 output by the controller 70. The drive power circuit 410 is conducted when the drive control switch Q81 and the switch drive module 42 are both turned on, so as to energize the switch element 41, such as the power supply coil of the relay K1, thereby turning on the switch element 41.

Figure 5:
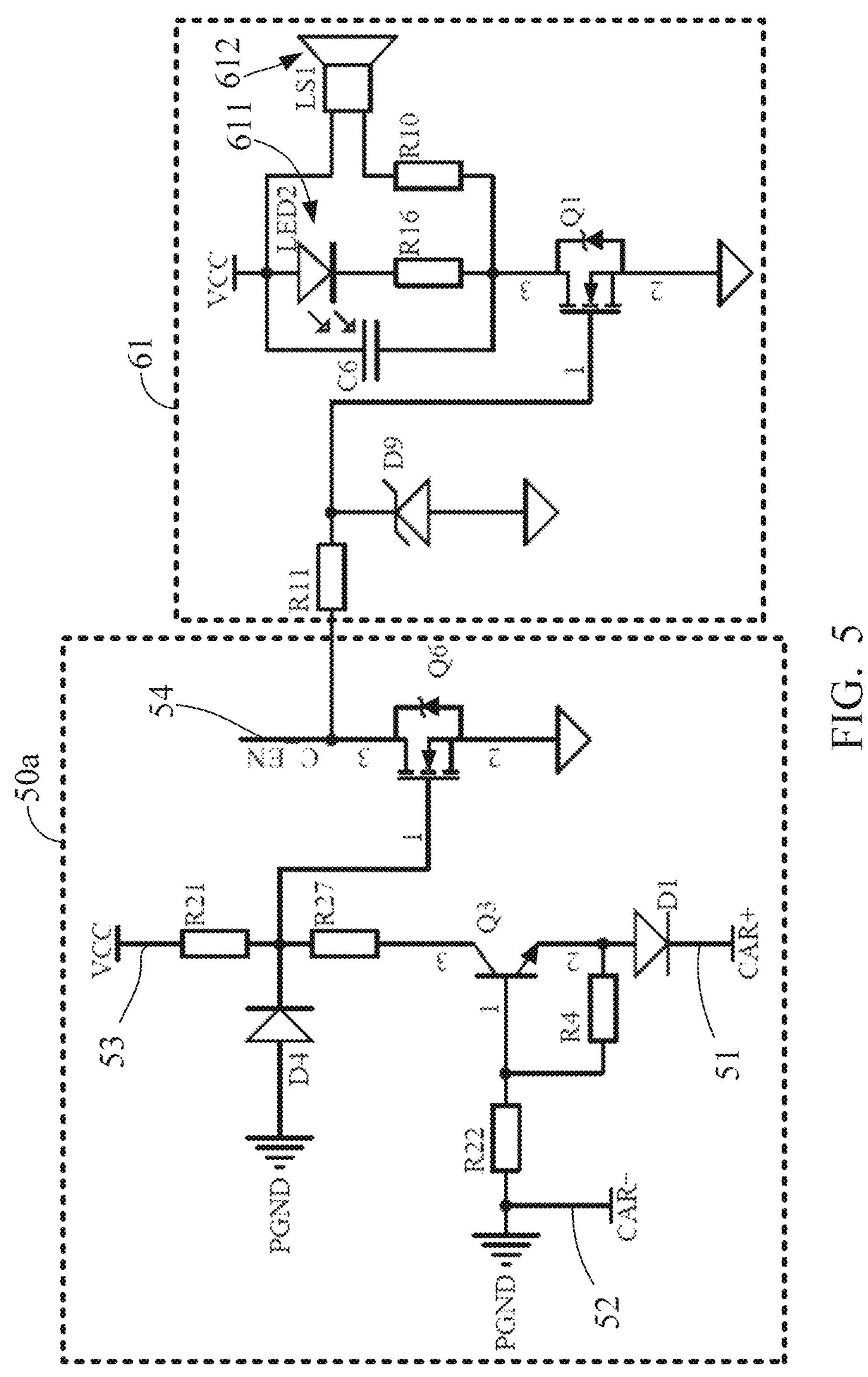
FIG. 5 is a schematic diagram of circuit structures of a reverse connection detection module and a reverse connection state indication module of the smart connection device illustrated in FIG. 3.

Referring to FIG. 5, in the first embodiment, the reverse connection detection module 50*a* is a transistor-containing combined switch circuit, and specifically includes a first detection terminal 51, a second detection terminal 52, a drive voltage input terminal 53, a control signal output terminal 54, a first transistor Q3, and a second transistor Q6. Wherein, the first detection terminal 51 is electrically coupled to the the positive terminal CAR+, and the second detection terminal 52 is electrically coupled to the negative terminal CAR−. As described above, the negative terminal CAR− is also electrically coupled to the first ground terminal PGND. The drive voltage input terminal 53 is electrically coupled to a voltage source VCC, and the reverse connection detection module 50*a* receives, through the drive voltage input terminal 53, a drive voltage provided by the voltage source VCC, so that the reverse connection detection module 50*a* can work normally. The voltage source VCC may be provided by the stable voltage VCC output by the regulated power module 81 or by the power source electrically coupled to the power connection terminal 20. In the first embodiment, the voltage source VCC is provided by the stable voltage VCC output by the regulated power module 81.

The first transistor Q3 is electrically coupled between the first detection terminal 51 and a control terminal 1 of the second transistor Q6. A control terminal 1 of the first transistor Q3 is electrically coupled to the second detection terminal 52. The second transistor Q6 is electrically coupled between the control signal output terminal 54 and a second ground terminal GND (a power reference ground, that is, the negative terminal BAT−). The control terminal 1 of the second transistor Q6 is also electrically coupled to the drive voltage input terminal 53 through a resistor R21.

Specifically, the control terminal 1 of the first transistor Q3 is electrically coupled to the second detection terminal 52 through a resistor R22, and is electrically coupled to the first connection terminal 2 of the first transistor Q3 through a resistor R4. The first connection terminal 2 of the first transistor Q3 is also electrically coupled to the first detection terminal 51 through a diode D1, wherein a cathode of the diode D1 is electrically coupled to the first detection terminal 51, and an anode of the diode D1 is electrically coupled to the first connection terminal 2 of the first transistor Q3. A second connection terminal 3 of the first transistor Q3 is electrically coupled to the control terminal 1 of the second transistor Q6 through a resistor R27. The control signal output terminal 54 is also electrically coupled to the control terminal G of the drive control switch Q81 through the resistor R26, so that the reverse connection detection module 50*a* can send the control signal C_EN to the drive power module 43.

The first transistor Q3 and the second transistor Q6 are transistors that are turned on by a high-level signal, such as an N-channel metal oxide semiconductor field effect transistor (hereinafter "NMOS transistor") or an NPN triode. The drive control switch Q81 is a transistor that is turned on by a low-level signal, such as a P-channel metal oxide semiconductor field effect transistor (hereinafter "PMOS transistor") or a PNP triode. In the first embodiment, the first transistor Q3 is an NPN triode, the second transistor Q6 is an NMOS transistor, and the drive control switch Q81 is a PMOS transistor. It is understandable that the reverse connection detection module 50*a* realizes, by employing simple transistors (such as diodes, triodes, field effect transistors, etc.) and passive devices (such as resistors, capacitors, etc.), the function of detecting the polarity of the electrodes of the external load electrically coupled to the load connection terminal 30, so that the reverse connection state of the external load can be quickly detected based on the fast turn-on and fast turn-off characteristics of the transistors, thereby significantly improving the detection speed and effectiveness of relevant protection functions.

During operation, the reverse connection detection module 50*a* outputs the control signal C_EN to the control terminal G of the drive control switch Q81 to switch an on-off state of the drive control switch Q81, so as to control the electrical energy of the drive power module 43 to the switch circuit 40, and thus control the discharge of the power source to the external load.

Specifically, if the external load is reversely coupled to the load connection terminal 30, that is, the positive electrode of the external load is electrically coupled to the negative terminal CAR−, and the negative electrode of the external load is electrically coupled to the positive terminal CAR+, then the control terminal 1 of the first transistor Q3 receives a high-level signal provided by the positive electrode of the external load, so that the first transistor Q3 is turned on. The control terminal 1 of the second transistor Q6 is electrically coupled to the negative electrode of the external load through the turned-on first transistor Q3 and receives a low-level signal, so that the second transistor Q6 is turned off. The control terminal G of the drive control switch Q81 and the control signal output terminal 54 are electrically coupled to the drive power input terminal 431 and are in a high-level state. At this time, the control signal output terminal 54 outputs the first control signal that is a high-level signal.

The drive control switch Q81 enters an off state because its control terminal G is in a high-level state. In other words, the drive control switch Q81 enters the off state because its control terminal G receives the first control signal (high-level signal) that is output from the control signal output terminal 54 of the reverse connection detection module 50*a*, so as to disconnect an electrical connection between the drive power input terminal 431 and the switch circuit 40, so that the driving power input terminal 431 suspends supplying electrical energy to the switch circuit 40, so that the switch circuit 40 is de-energized and kept in the disconnected state. That is, the electrical energy of the power supply coil of the relay K1 is cut off, so that the relay K1 is kept in an off state because the power supply coil is de-energized.

If the load connection terminal 30 is under a no-load state, or the external load is correctly coupled to the load connection terminal 30, that is, the positive electrode of the external load is electrically coupled to the positive terminal CAR+, and the negative electrode of the external load is electrically coupled to the negative terminal CAR−, then the control terminal 1 of the first transistor Q3 is electrically coupled to the first ground terminal PGND and receives a low-level signal, so that the transistor Q3 is turned off. The control terminal 1 of the second transistor Q6 is electrically coupled to the drive voltage input terminal 53 through the resistor R21 and receive a high-level signal, so that the second transistor Q6 is turned on. The control signal output terminal 54 is electrically coupled to the second ground terminal GND through the turned-on second transistor Q6, so as to be in a low-level state. At this time, the control signal output terminal 54 outputs the second control signal that is a low-level signal.

The drive control switch Q81 enters an on state because its control terminal G receives the second control signal (low-level signal) that is output from the control signal output terminal 54 of the reverse connection detection module 50*a*, so as to conduct the electrical connection between the drive power input terminal 431 and the switch circuit 40, and thus allow the drive power input terminal 431 to supply electrical energy to the switch circuit 40, so that the switch circuit 40 is energized, wherein the switch circuit 40 is kept in the disconnected state when the switch circuit 40 has received the electrical energy but does not receive the drive signal RELAY_EN2.

It is understandable that, in the first embodiment, the drive control switch Q81 is in the on state by default in the normal state, so that the switch circuit 40 is energized in the normal state and kept in the disconnected state.

In the smart connection device 101 provided in the first embodiment of the present disclosure, a transistor-containing combined switch circuit is used as the reverse connection detection module 50*a*, so that the reverse connection state of the external load can be quickly detected based on the fast turn-on and fast turn-off characteristics of the transistors. In addition, the electrical energy of the drive power module 43 to the switch circuit 40 is directly controlled by the control signal C_EN output by the reverse connection detection module 50*a*, so that the power source to the switch circuit 40 can be suspended when the external load is reversely connected, so that the switch circuit 40 is in the disconnected state. In this way, the objectives of rapidly responding to the first control signal corresponding to the reverse connection state of the external load as well as timely disconnecting the discharge of the power source to the external load can be achieved. It can be seen that the use of the smart connection device 101 provided in the first embodiment of the present disclosure can significantly improve the detection speed and effectiveness of relevant protection functions, thereby significantly improving the safety and reliability of the power output control system. In addition, in the smart connection device 101 provided in the first embodiment of the present disclosure, key components are low in cost, and peripheral circuits are simple and reliable, which not only reduces the material cost of the product, but also saves labor cost and material cost of after-sale products.

It can be understood that, in another embodiment, the reverse connection detection module 50*a* may also be a detection circuit composed of sensor devices, such as a photocoupler, to realize the reverse connection detection function of the external load.

Referring to FIG. 3 again, in the first embodiment, the smart connection device 101 further includes a reverse connection state indication module 61 electrically coupled to the reverse connection detection module 50*a*. The reverse connection detection module 50*a* is further configured to send the first control signal to the reverse connection state indication module 61, so as to control the reverse connection state indication module 61 to issue an alarm signal for indicating a reverse connection alarm prompt.

Referring to FIG. 5 again, the reverse connection state indication module 61 includes a third transistor Q1, a display unit 611, and/or an alarm unit 612. The display unit 611 includes at least one light-emitting diode or at least one liquid crystal display device. The display unit 611 is electrically coupled to the reverse connection detection module 50*a*, and the reverse connection detection module 50*a* is further configured to send the first control signal to the display unit 611, so as to control the display unit 611 to emit light or display information to indicating the reverse connection alarm prompt.

The alarm unit 612 includes at least one buzzer or loudspeaker. The alarm unit 612 is electrically coupled to the reverse connection detection module 50*a*. The reverse connection detection module 50*a* is further configured to send the first control signal to the alarm unit 612 to control the alarm unit 612 to emit an alarm sound for indicating the reverse connection alarm prompt.

In the first embodiment, the reverse connection state indication module 61 includes the display unit 611 and the alarm unit 612. The display unit 611 includes a light-emitting diode LED2, and the alarm unit 612 includes a loudspeaker LS1. A control terminal 1 of the third transistor Q1 is electrically coupled to the control signal output terminal 54 of the reverse connection detection module 50*a* through a resistor R11, and is electrically coupled to the second ground terminal GND through a Zener diode D9. A first connection terminal 2 of the third transistor Q1 is electrically coupled to the second ground terminal GND. The light-emitting diode LED 2 and the alarm unit 612 are electrically coupled in parallel between a voltage source VCC and a second connection terminal 3 of the third transistor Q1. Wherein, an anode of the light-emitting diode LED 2 is electrically coupled to the voltage source VCC, and a cathode of the light-emitting diode LED 2 is electrically coupled to the second connection terminal 3 of the third transistor Q1 through a resistor R16. The loudspeaker LS1 is electrically coupled to the second connection terminal 3 of the third transistor Q1 through a resistor R10. The second connection terminal 3 of the third transistor Q1 is also electrically coupled to the voltage source VCC through a capacitor C6.

In the first embodiment, the third transistor Q1 is a transistor that is turned on by a high-level signal, such as an NMOS transistor or an NPN triode.

During operation, if the external load is reversely coupled to the load connection terminal 30, as described above, the control signal output terminal 54 outputs the first control signal that is a high-level signal. The third transistor Q1 enters an on state because its control terminal 1 receives the first control signal (high-level signal) output from the control signal output terminal 54 of the reverse connection detection module 50*a*, thereby conducting the circuit in which the light-emitting diode LED 2 and the loudspeaker LS1 are included, to cause the light-emitting diode LED2 to emit light and cause the loudspeaker LS1 to emit an alarm sound to prompt that the external load is reversely coupled to the load connection terminal 30.

If the load connection terminal 30 is under the no-load state or the external load is correctly coupled to the load connection terminal 30, as described above, the control signal output terminal 54 outputs the second control signal that is a low-level signal. The third transistor Q1 is turned off because its control terminal 1 receives the second control signal (low-level signal) output from the control signal output terminal 54 of the reverse connection detection module 50*a*, so as to disconnect the circuit in which the light-emitting diode LED2 and the loudspeaker LS1 are included, so that the light-emitting diode LED2 does not emit light and the loudspeaker LS1 does not emit an alarm sound.

In the smart connection device 101 provided in the first embodiment of the present disclosure, the working state of the reverse connection state indication module 61 is directly controlled by the control signal C_EN that is output by the reverse connection detection module 50*a*, so that objectives of rapidly responding to the first control signal corresponding to the reverse connection state of the external load and timely providing the user with an alarm prompt of the reverse connection state can be achieved, in this way, the user can adjust the electrical connection between the smart connection device 101 and the external load in time.

Second Embodiment

The second embodiment of the present disclosure provides a smart connection device. In the smart connection device, the detection unit is configured to detect the connection state between the load connection terminal and the external load, and operation states of the switch drive module are controlled by the control signal output by the detection unit, so that the operation state of the switch drive module can be switched to a disable state when the external load is reversely connected, therefore, the switch circuit is in the disconnected state. In this way, the control signal corresponding to the reverse connection state of the external load can be quickly responded to, so as to prevent the power source from discharging to the external load.

Figure 6:
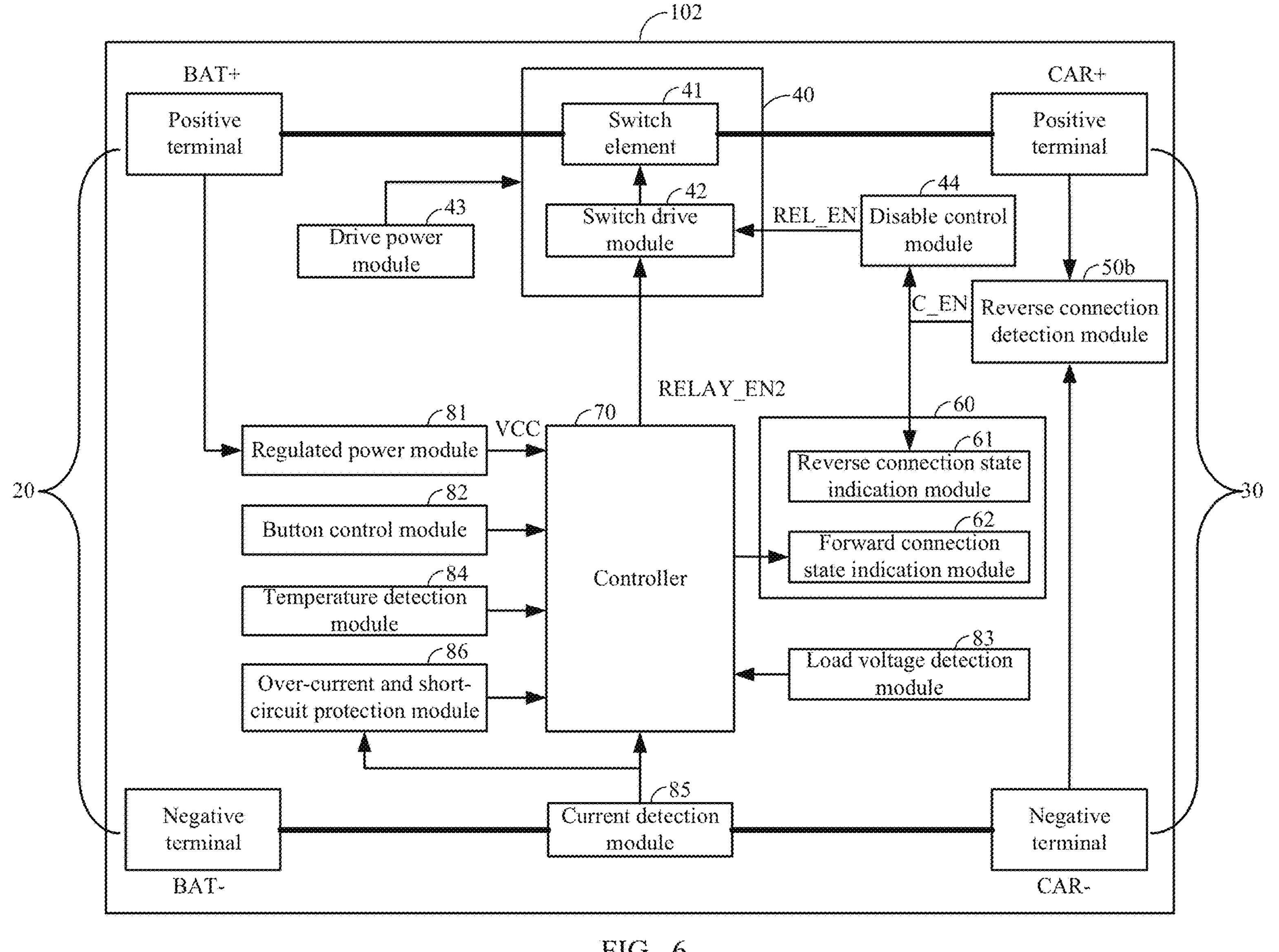
FIG. 6 is a schematic diagram of functional modules of a smart connection device according to a second embodiment of the present disclosure.

FIG. 6 is a schematic diagram of functional modules of a smart connection device 102 according to the second embodiment of the present disclosure. It should be noted that the smart connection 102 corresponds to the smart connection device 100 illustrated in FIG. 1.

As illustrated in FIG. 6, in the second embodiment, the switch circuit 40 includes the switch element 41 and the switch drive module 42, wherein the switch element 41 is electrically coupled between the power connection terminal 20 and the load connection terminal 30. The switch drive module 42 is electrically coupled to the switch element 41 and the controller 70 respectively. The switch drive module 42 is configured to turn on or turn off the switch element 41. The controller 70 is configured to send the drive signal RELAY_EN2 to the switch drive module 42, so as to turn on the switch element 41 through the switch drive module 42. Wherein, when the switch drive module 42 is in an active state, the switch drive module 42 can receive and respond to the drive signal RELAY_EN2 to turn on the switch element 41, so as to keep the switch circuit 40 in the conducting state, thereby conducting the electrical connection between the power source and the external load, so as to realize the discharge of the power source to the external load.

When the switch drive module 42 is in the disable state, the switch drive module 42 can only receive the drive signal RELAY_EN2 but cannot respond to the drive signal RELAY_EN2, so that the switch element 41 cannot be turned on, so that the switch circuit 40 is kept in the disconnected state to disconnect the electrical connection between the power source and the external load. That is, the current output circuit 11 through which the power source discharges to the external load is disconnected, so as to prevent the power source from discharging to the external load.

In the second embodiment, the detection unit 50 includes a reverse connection detection module 50*b*. The reverse connection detection module 50*b* is configured to detect the connection state between the load connection terminal 30 and the external load, and output a corresponding control signal C_EN according to the detected connection state. Wherein, the control signal C_EN is configured to switch the operation states of the switch drive module 42.

Specifically, as described above, the control signal C_EN includes a first control signal and a second control signal. In the second embodiment, the first control signal is configured to switch the operation state of the switch drive module 42 to the disable state, and the second control signal is configured to switch the operation state of the switch drive module 42 to the active state.

In the second embodiment, the smart connection device 102 further includes a disable control module 44 electrically coupled between the reverse connection detection module 50*b* and the switch drive module 42. The disable control module 44 is configured to output a disable signal REL_EN to switch the operation state of the switch drive module 42 to the disable state.

The reverse connection detection module 50*b* is configured to send the control signal C_EN to the disable control module 44, to control the disable control module 44 to output a disable signal REL_EN, or to control the disable control module 44 to suspend outputting the disable signal REL_EN, so that the on-off state of the switch element 41 can be controlled by controlling the operation states of the switch drive module 42.

Specifically, the reverse connection detection module 50*b* outputs the first control signal when it detects that the external load is reversely coupled to the load connection terminal 30, and sends the first control signal to the disable control module 44, to control the disable control module 44 to output the disable signal REL_EN, so as to switch the operation state of the switch drive module 42 to the disable state.

The reverse connection detection module 50*b* also outputs the second control signal when it detects that the load connection terminal 30 is under a no-load state or the external load is correctly coupled to the load connection terminal 30, and sends the second control signal to the disable control module 44 to prevent the disable control module 44 from outputting the disable signal REL_EN, so that the operation state of the switch drive module 42 is kept in the active state.

Since the user can force, through the button control module 82, the controller 70 to output the drive signal RELAY_EN2, when the external load is reversely coupled to the load connection terminal 30, the operation state of the switch drive module 42 is switched to the disable state, which can prevent the switch drive module 42 from responding to the drive signal RELAY_EN2, wherein the drive signal RELAY_EN2 is output by the controller 70 in response to a button instruction input by the user, so as to prevent the power source from discharging to the external load. In this way, electrical safety of the circuits can be ensured. In addition, the operation states of the switch drive module 42 is controlled by the control signal C_EN output by the reverse connection detection module 50*b*, therefore, the objectives of rapidly responding to the first control signal corresponding to the reverse connection state of the external load as well as timely disconnecting the discharge of the power source to the external load can be achieved.

Figure 7:
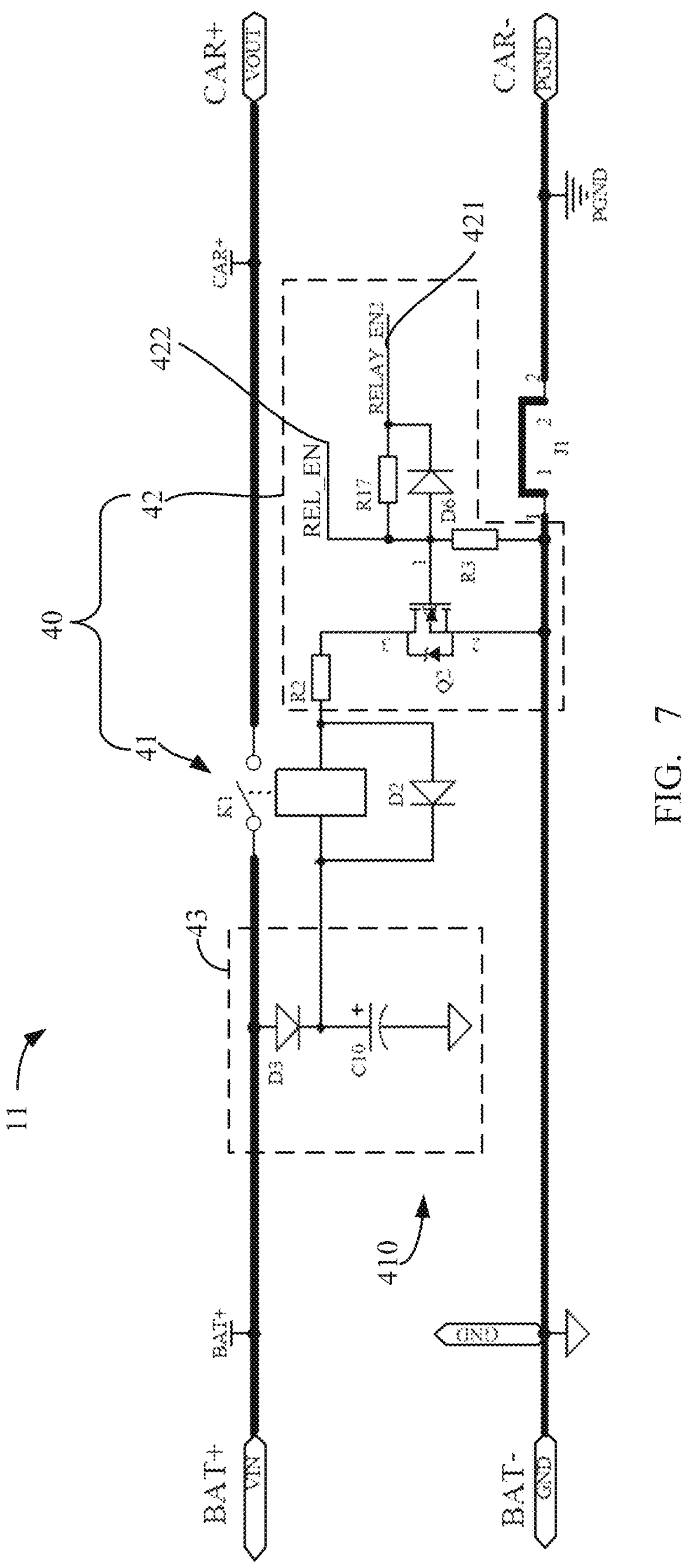
FIG. 7 is a schematic diagram of circuit structures of a current output circuit of the smart connection device illustrated in FIG. 6.

In the second embodiment, the circuit structures of the current output circuit 11 through which the power source discharges to the external load may adopt the circuit structures illustrated in FIG. 7. The circuit structures of the disable control module 44 and the reverse connection detection module 50*b* may adopt the circuit structures illustrated in FIG. 8. The circuit structures and working principles of the switch drive module 42, the disable control module 44, and the reverse connection detection module 50*b* will be introduced below with reference to FIG. 7 and FIG. 8.

Referring to FIG. 7, in the second embodiment, the switch drive module 42 includes a switch unit Q2, a drive signal input terminal 421, and a disable signal input terminal 422. The switch unit Q2 is electrically coupled in series in the drive power circuit 410 of the switch element 41. The switch unit Q2 is configured to control the on-off state of the drive power circuit 410. When the drive power circuit 410 is in a conducting state, the switch element 41 can receive the electrical energy and enter an on state. For example, the power supply coil of the relay K1 can receive the electrical energy when the drive power circuit 410 is conducted, so that the relay K1 remains in a conducting state because the power supply coil is energized.

The drive signal input terminal 421 is electrically coupled to the controller 70 and configured to receive the drive signal RELAY_EN2 output by the controller 70, wherein the drive signal RELAY_EN2 is configured to turn on the switch unit Q2. The disable signal input terminal 422 is electrically coupled to the disable control module 44 and configured to receive the disable signal REL_EN to forcibly turn off the switch unit Q2. In the second embodiment, when the switch unit Q2 simultaneously receives the drive signal RELAY_EN2 and the disable signal REL_EN, the switch unit Q2 preferentially responds to the disable signal REL_EN.

Specifically, in the second embodiment, a first connection terminal 2 of the switch unit Q2 is electrically coupled to the first ground terminal PGND. A second connection terminal 3 of the switch unit Q2 is electrically coupled to the other end of the power supply coil of the relay K1 through a resistor R2. A control terminal 1 of the switch unit Q2 is electrically coupled to the disable signal input terminal 422, and is electrically coupled to the drive signal input terminal 421 through a resistor R17. The control terminal 1 of the switch unit Q2 is also electrically coupled to the first ground terminal PGND through a resistor R3, and is electrically coupled to the drive signal input terminal 421 through a diode D6. Wherein, an anode of the diode D6 is electrically coupled to the control terminal 1 of the switch unit Q2, and a cathode of the diode D6 is electrically coupled to the drive signal input terminal 421. In the second embodiment, the switch unit Q2 is a transistor that is turned on by a high-level signal, such as an NMOS transistor or an NPN triode. The disable signal REL_EN is a low-level signal, and the drive signal RELAY_EN2 is a high-level signal. In this way, it can ensure that the switch unit Q2 preferentially responds to the disable signal REL_EN when the switch unit Q2 receives the drive signal RELAY_EN2 and the disable signal REL_EN at the same time, and that the switch unit Q2 can normally respond to the drive signal RELAY_EN2 in a normal state.

Figure 8:
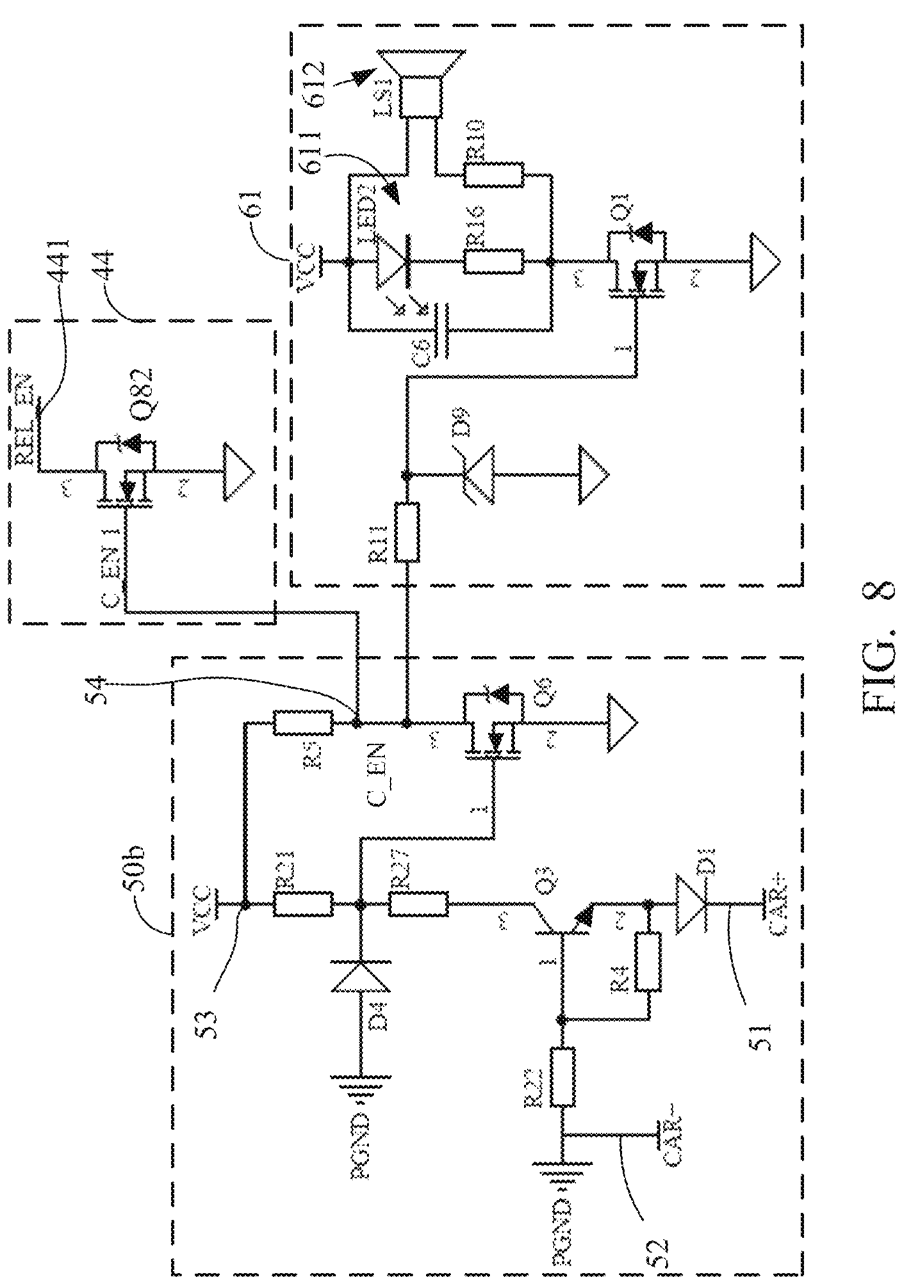
FIG. 8 is a schematic diagram of circuit structures of a reverse connection detection module, a reverse connection state indication module, and a disable control module of the smart connection device illustrated in FIG. 6.

Referring to FIG. 8, in the second embodiment, the structures of the reverse connection detection module 50*b* are similar to those of the reverse connection detection module 50*a* illustrated in FIG. 5 in the first embodiment, except that: the control signal output terminal 54 of the reverse connection detection module 50*b* is also electrically coupled to the drive voltage input terminal 53 through a resistor R5. For the specific structures of the reverse connection detection module 50*b*, reference may be made to the specific introduction of the structures of the reverse connection detection module 50*a* above, which will not be repeated here.

The disable control module 44 includes a disable signal output terminal 441 and a disable control switch Q82. The disable signal output terminal 441 is electrically coupled to the disable signal input terminal 422 of the switch drive module 42, so as to realize the electrical connection between the disable control module 44 and the switch drive module 42. The disable control switch Q82 is electrically coupled between the disable signal output terminal 441 and the ground terminal. A control terminal 1 of the disable control switch Q82 is electrically coupled to the control signal output terminal 54 of the reverse connection detection module 50*b*, so as to realize the electrical connection between the disable control module 44 and the reverse connection detection module 50*b*.

The first transistor Q3, the second transistor Q6, and the disable control switch Q82 of the reverse connection detection module 50*b* are all transistors that are turned on by a high-level signal, such as NMOS transistors or NPN triodes. In the second embodiment, the first transistor Q3 is an NPN triode. The second transistor Q6 and the disable control switch Q82 are both NMOS transistors. It is understandable that the reverse connection detection module 50*b* realizes, by employing simple transistors (such as diodes, triodes, field effect transistors, etc.) and passive devices (such as resistors, capacitors, etc.), the function of detecting the polarity of the electrodes of the external load electrically coupled to the load connection terminal 30, so that the reverse connection state of the external load can be quickly detected based on the fast turn-on and fast turn-off characteristics of the transistors, thereby significantly improving the detection speed and effectiveness of relevant protection functions.

During operation, the reverse connection detection module 50*b* sends the control signal C_EN to the control terminal 1 of the disable control switch Q82 to switch an on-off state of the disable control switch Q82, thereby controlling an output state of the disable control module 44, then, the operation states of the switch drive module 42 is controlled.

Specifically, if the external load is reversely coupled to the load connection terminal 30, that is, the positive electrode of the external load is electrically coupled to the negative terminal CAR−, and the negative electrode of the external load is electrically coupled to the positive terminal CAR+, then the control terminal 1 of the first transistor Q3 receives a high-level signal provided by the positive electrode of the external load, so that the first transistor Q3 is turned on. The control terminal 1 of the second transistor Q6 is electrically coupled to the negative electrode of the external load through the turned-on first transistor Q3 and receives a low-level signal, so that the second transistor Q6 is turned off. The control signal output terminal 54 is electrically coupled to the drive voltage input terminal 53 and is in a high-level state. At this time, the control signal output terminal 54 outputs the first control signal that is a high-level signal.

At this time, the enabling control switch Q82 enters the on state because its control terminal 1 receives the first control signal (high-level signal) that is output from the control signal output terminal 54 of the reverse connection detection module 50*b*. The disable signal output terminal 441 is electrically coupled to the second ground terminal through the turned-on disable control switch Q82 and is in a low-level state. At this time, the disable signal output terminal 441 outputs a low-level signal, wherein the low-level signal is the disable signal REL_EN.

If the load connection terminal 30 is under a no-load state, or the external load is correctly coupled to the load connection terminal 30, that is, the positive electrode of the external load is electrically coupled to the positive terminal CAR+, and the negative electrode of the external load is electrically coupled to the negative terminal CAR−, then the control terminal 1 of the first transistor Q3 is electrically coupled to the first ground terminal PGND and receives a low-level signal, so that the transistor Q3 is turned off. The control terminal 1 of the second transistor Q6 is electrically coupled to the drive voltage input terminal 53 through the resistor R21 and receive a high-level signal, so that the second transistor Q6 is turned on. The control signal output terminal 54 is electrically coupled to the second ground terminal GND through the turned-on second transistor Q6, so as to be in a low-level state. At this time, the control signal output terminal 54 outputs the second control signal that is a low-level signal.

At this time, the disable control switch Q82 enters an off state because its control terminal 1 receives the second control signal (low-level signal) that is output from the control signal output terminal 54 of the reverse connection detection module 50*b*, so that the disable control module 44 is in a non-output state.

It is understandable that, in the second embodiment, the disable control switch Q82 is in the off state by default in the normal state, so that the disable control module 44 is in the non-output state in the normal state, so as to cause the switch drive module 42 to be in the active state and can normally respond to the drive signal RELAY_EN2 to turn on the switch element 41.

In the smart connection device 102 provided in the second embodiment of the present disclosure, a transistor-containing combined switch circuit is used as the reverse connection detection module 50*b*, so that the reverse connection state of the external load can be quickly detected based on the fast turn-on and fast turn-off characteristics of the transistors. The output of the disable signal REL_EN is directly controlled by the control signal C_EN that is output by the reverse connection detection module 50*b*, so as to control the operation states of the switch drive module 42, so that the operation state of the switch drive module 42 can be switched to a disable state when the external load is reversely connected, so that the switch circuit 40 is in the disconnected state. In this way, the objectives of rapidly responding to the first control signal corresponding to the reverse connection state of the external load as well as timely disconnecting the discharge of the power source to the external load can be achieved. It can be seen that the use of the smart connection device 102 provided in the second embodiment of the present disclosure can significantly improve the detection speed and effectiveness of relevant protection functions, thereby significantly improving the safety and reliability of the power output control system. In addition, in the smart connection device 102 provided in the second embodiment of the present disclosure, key components are low in cost, and peripheral circuits are simple and reliable, which not only reduces the material cost of the product, but also saves labor cost and material cost of the after-sale products.

It can be understood that, in another embodiment, the reverse connection detection module 50*b* may also be a detection circuit composed of sensor devices, such as a photocoupler, to realize the reverse connection detection function of the external load.

Referring to FIG. 6 again, in the second embodiment, the smart connection device 102 further includes a reverse connection state indication module 61 electrically coupled to the reverse connection detection module 50*b*. The reverse connection detection module 50*b* is also configured to send the first control signal to the reverse connection state indication module 61, so as to control the reverse connection state indication module 61 to issue an alarm signal for indicating a reverse connection alarm prompt.

Referring to FIG. 8 again, in the second embodiment, the structures of the reverse connection state indication module 61 is the same as those of the reverse connection state indication module 61 illustrated in FIG. 5 in the first embodiment. For the specific structures of the reverse connection state indication module 61, reference may be made to the specific introduction above, which will not be repeated here.

Third Embodiment

The third embodiment of the present disclosure provides a smart connection device. In the smart connection device, the detection unit is configured to detect the connection state between the load connection terminal and the external load, a drive signal transmission module is arranged on a transmission path of the drive signal, and the transmission of the drive signal by the drive signal transmission module is directly controlled by the control signal output by the reverse connection detection module, so that the transmission path of the drive signal can be cut off when the external load is reversely connected. In this way, the control signal corresponding to the reverse connection state of the external load can be quickly responded to, so as to prevent the power source from discharging to the external load.

Figure 9:
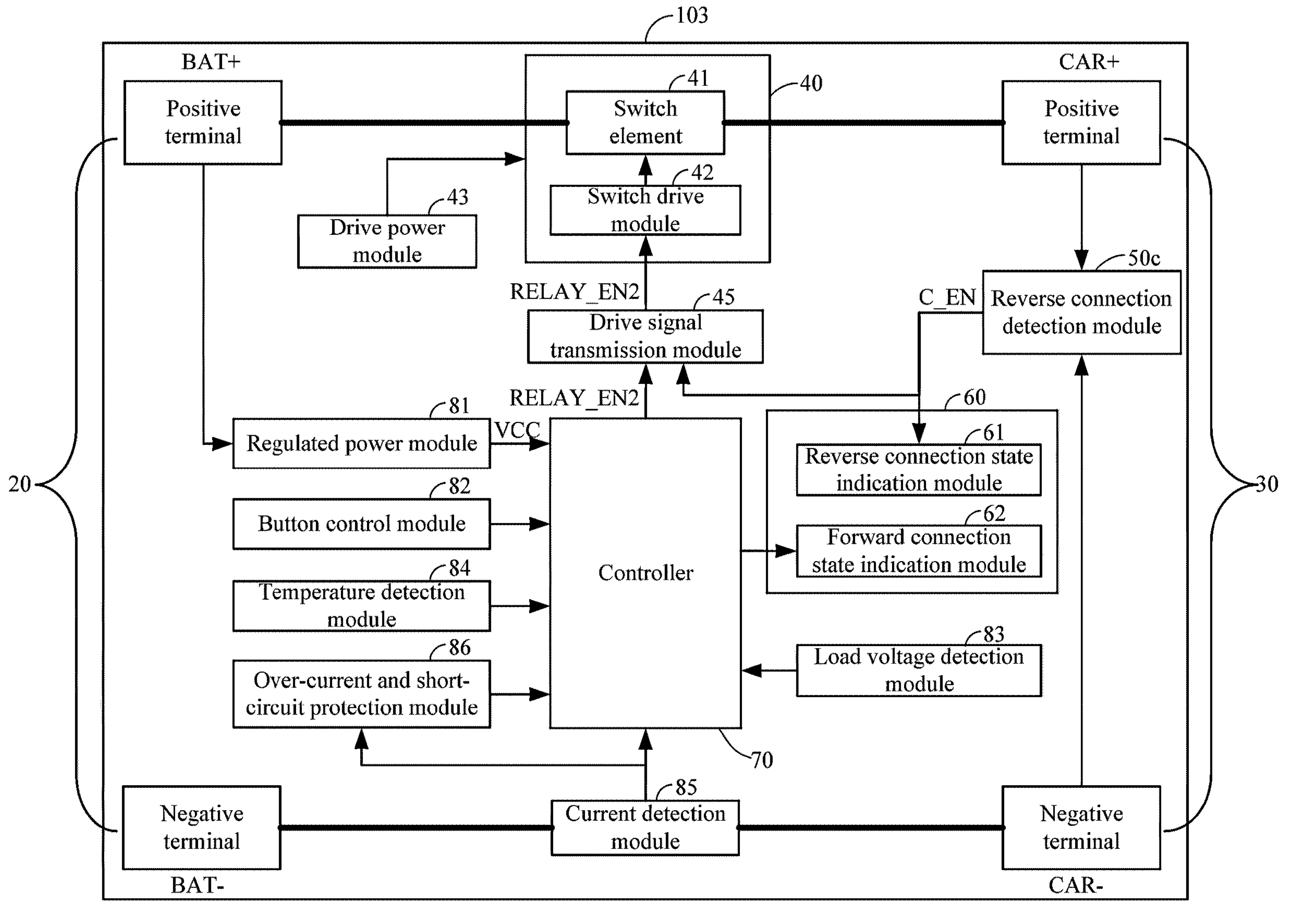
FIG. 9 is a schematic diagram of functional modules of a smart connection device according to a third embodiment of the present disclosure.

FIG. 9 is a schematic diagram of functional modules of a smart connection device 103 according to the third embodiment of the present disclosure. It should be noted that the smart connection device 103 corresponds to the smart connection device 100 illustrated in FIG. 1.

As illustrated in FIG. 9, in the third embodiment, the smart connection device 103 further includes a drive signal transmission module 45 electrically coupled between the switch circuit 40 and the controller 70. The drive signal transmission module 45 is configured to transmit the drive signal RELAY_EN2 output by the controller 70 to the switch circuit 40.

In the third embodiment, the switch circuit 40 includes the switch element 41 and the switch drive module 42. The switch element 41 is electrically coupled between the power connection terminal 20 and the load connection terminal 30. The switch drive module 42 is electrically coupled to the switch element 41 and the drive signal transmission module 45 respectively. The switch drive module 42 is configured to control an on-off state of the switch element 41. The drive signal transmission module 45 is configured to transmit the drive signal RELAY_EN2 output by the controller 70 to the switch drive module 42, so as to turn on the switch element 41 through the switch drive module 42.

As illustrated in FIG. 9, in the third embodiment, the detection unit 50 includes a reverse connection detection module 50*c*. The reverse connection detection module 50*c* is configured to detect the connection state between the load connection terminal 30 and the external load, and output a corresponding control signal C_EN according to the detected connection state.

The reverse connection detection module 50*c* is also electrically coupled to the drive signal transmission module 45. The reverse connection detection module 50*c* is also configured to send the control signal C_EN to the drive signal transmission module 45, to control the transmission of the drive signal RELAY_EN2 by the drive signal transmission module 45, thereby controlling the on-off state of the switch circuit 40.

Specifically, the reverse connection detection module 50*c* outputs the first control signal when it detects that the external load is reversely coupled to the load connection terminal 30, and sends the first control signal to the drive signal transmission module 45, so as to control the drive signal transmission module 45 to suspend the transmission of the drive signal RELAY_EN2, so that the switch circuit 40 is kept in the disconnected state, thereby disconnecting the electrical connection between the power source and the external load. That is, the current output circuit 11 through which the power source discharges to the external load is disconnected, so as to prevent the power source from discharging to the external load.

The reverse connection detection module 50*c* is also configured to output the second control signal when it detects that the load connection terminal 30 is under a no-load state or the external load is correctly coupled to the load connection terminal 30, and send the second control signal to the drive signal transmission module 45, so as to control the drive signal transmission module 45 to resume the transmission of the drive signal RELAY_EN2, so that the switch circuit 40 can receive the drive signal RELAY_EN2 output by the controller 70 and enter the conducting state, thereby conducting the electrical connection between the power source and the external load, so as to realize the discharge of the power source to the external load.

Since the user can force, through the button control module 82, the controller 70 to output the drive signal RELAY_EN2, when the external load is reversely coupled to the load connection terminal 30, the drive signal transmission module 45 is controlled to suspend the transmission of the drive signal RELAY_EN2, which can prevent the switch drive module 42 from receiving and responding to the drive signal RELAY_EN2 output by the controller 70 to turn on the switch element 41. In this way, the switch element 41 can be kept in the off state, so as to prevent the power source from discharging to the external load, thereby ensuring the electrical safety of the circuit. In addition, the transmission of the drive signal RELAY_EN2 by the drive signal transmission module 45 is directly controlled by the control signal C_EN output by the reverse connection detection module 50*c*, therefore, the objectives of rapidly responding to the first control signal corresponding to the reverse connection state of the external load as well as timely disconnecting the discharge of the power source to the external load can be achieved.

In the third embodiment, the circuit structures of the current output circuit 11 through which the power source discharges to the external load may adopt the circuit structures illustrated in FIG. 2. The circuit structures of the reverse connection detection module 50*c* and the drive signal transmission module 45 may adopt the circuit structures illustrated in FIG. 10. The circuit structures and working principles of the switch drive module 42, the reverse connection detection module 50*c*, and the drive signal transmission module 45 will be introduced below with reference to FIGS. 2 and 10.

Referring to FIG. 2 again, the switch drive module 42 includes a switch unit Q2 and a drive signal input terminal 421. The switch unit Q2 is electrically coupled in series to the drive power circuit 410 of the switch element 41. The switch unit Q2 is configured to control the on-off state of the drive power circuit 410. When the drive power circuit 410 is in a conducting state, the switch element 41 can receive the electrical energy and enter an on state. For example, the power supply coil of the relay K1 can receive the electrical energy when the drive power circuit 410 is conducted, so that the relay K1 remains in a conducting state because the power supply coil is energized.

The drive signal input terminal 421 is configured to receive the drive signal RELAY_EN2 transmitted by the drive signal transmission module 45. Wherein, the switch unit Q2 enters an on state when it receives the drive signal RELAY_EN2, so that the drive power circuit 410 of the switch element 41 is conducted, and the switch circuit 40 is in the conducting state. Conversely, the switch unit Q2 is in an off state when the drive signal RELAY_EN2 is not received, so that the drive power circuit 410 of the switch element 41 is disconnected, and the switch circuit 40 is in a disconnected state.

Specifically, a first connection terminal 2 of the switch unit Q2 is electrically coupled to the first ground terminal PGND, a second connection terminal 3 of the switch unit Q2 is electrically coupled to the other end of the power supply coil of the relay K1 through a resistor R2, and a control terminal 1 of the switch unit Q2 is electrically coupled to the drive signal input terminal 421 through a resistor R17. The control terminal 1 of the switch unit Q2 is also electrically coupled to the first ground terminal PGND through a resistor R3, and is electrically coupled to the drive signal input terminal 421 through a diode D6. Wherein, an anode of the diode D6 is electrically coupled to the control terminal 1 of the switch unit Q2, and a cathode of the diode D6 is electrically coupled to the drive signal input terminal 421. In this embodiment, the switch unit Q2 is a transistor that is turned on by a high-level signal, such as an NMOS transistor or an NPN triode, and the drive signal RELAY_EN2 is a high-level signal. In this way, the switch unit Q2 can be turned on when it receives the drive signal RELAY_EN2.

Figure 10:
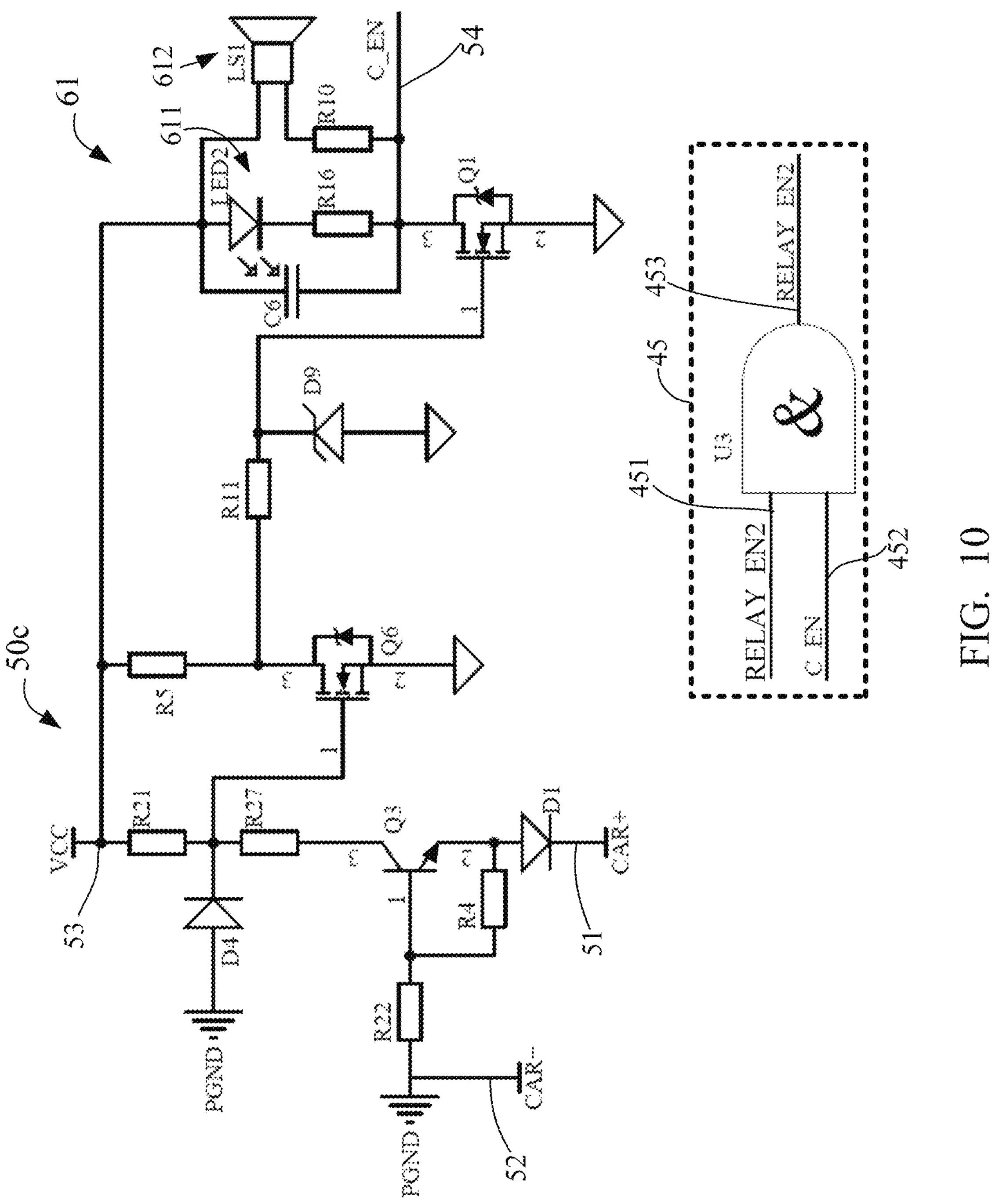
FIG. 10 is a schematic diagram of circuit structures of a reverse connection detection module, a reverse connection state indication module, and a drive signal transmission module of the smart connection device illustrated in FIG. 9.

Referring to FIG. 10, in the third embodiment, the reverse connection detection module 50*c* includes a transistor-containing combined switch circuit, and specifically includes a first detection terminal 51, a second detection terminal 52, a drive voltage input terminal 53, a control signal output terminal 54, a first transistor Q3, a second transistor Q6, and a third transistor Q1. The first detection terminal 51 is electrically coupled to the positive terminal CAR+, and the second detection terminal 52 is electrically coupled to the negative terminal CAR−. As described above, the negative terminal CAR− is also electrically coupled to the first ground terminal PGND. The drive voltage input terminal 53 is electrically coupled to a voltage source VCC, and the reverse connection detection module 50*c* receives, through the drive voltage input terminal 53, a drive voltage provided by the voltage source VCC, so that the reverse connection detection module 50*c* can work normally. The voltage source VCC may be provided by the stable voltage VCC that is output by the regulated power module 81 or by the power source electrically coupled to the power connection terminal 20. In the third embodiment, the voltage source VCC is provided by the stable voltage VCC that is output by the regulated power module 81.

The first transistor Q3 is electrically coupled between the first detection terminal 51 and a control terminal 1 of the second transistor Q6. A control terminal 1 of the first transistor Q3 is electrically coupled to the second detection terminal 52. The second transistor Q6 is electrically coupled between a second ground terminal GND (a power reference ground, that is, the negative terminal BAT−) and a control terminal 1 of the third transistor Q1. The control terminal 1 of the second transistor Q6 is also electrically coupled to the drive voltage input terminal 53 through a resistor R21. The third transistor Q1 is electrically coupled between the second ground terminal GND and the control signal output terminal 54, and the control terminal 1 of the third transistor Q1 is also electrically coupled to the drive voltage input terminal 53 through a resistor R11 and a resistor R5.

Specifically, the control terminal 1 of the first transistor Q3 is electrically coupled to the second detection terminal 52 through a resistor R22, and is electrically coupled to a first connection terminal 2 of the first transistor Q3 through a resistor R4. The first connection terminal 2 of the first transistor Q3 is also electrically coupled to the first detection terminal 51 through a diode D1, wherein a cathode of the diode D1 is electrically coupled to the first detection terminal 51, and an anode of the diode D1 is electrically coupled to the first connection terminal 2 of the first transistor Q3. A second connection terminal 3 of the first transistor Q3 is electrically coupled to the control terminal 1 of the second transistor Q6 through a resistor R27. The control signal output terminal 54 is also electrically coupled to the drive voltage input terminal 53 through a capacitor C6.

The first transistor Q3, the second transistor Q6, and the third transistor Q1 are transistors that are turned on by a high-level signal, such as NMOS transistors or NPN triodes. In the third embodiment, the first transistor Q3 is an NPN triode, and the second transistor Q6 and the third transistor Q1 are both NMOS transistors. It is understandable that the reverse connection detection module 50*c* realizes, by employing simple transistors (such as diodes, triodes, field effect transistors, etc.) and passive devices (such as resistors, capacitors, etc.), the function of detecting the polarity of the electrodes of the external load electrically coupled to the load connection terminal 30, so that the reverse connection state of the external load can be quickly detected based on the fast turn-on and fast turn-off characteristics of the transistors, thereby significantly improving the detection speed and effectiveness of relevant protection functions.

During operation, the reverse connection detection module 50*c* sends the control signal C_EN to the drive signal transmission module 45 to control the transmission of the drive signal RELAY_EN2 by the drive signal transmission module 45, so as to control the on-off state of the switch circuit 40

Specifically, if the external load is reversely coupled to the load connection terminal 30, that is, the positive electrode of the external load is electrically coupled to the negative terminal CAR−, and the negative electrode of the external load is electrically coupled to the positive terminal CAR+, then the control terminal 1 of the first transistor Q3 receives a high-level signal provided by the positive electrode of the external load, so that the first transistor Q3 is turned on. The control terminal 1 of the second transistor Q6 is electrically coupled to the negative electrode of the external load through the turned-on first transistor Q3 and receives a low-level signal, so that the second transistor Q6 is turned off. The control terminal 1 of the third transistor Q1 is electrically coupled to the drive voltage input terminal 53 and is in a high-level state, so that the third transistor Q1 is turned on. The control signal output terminal 54 is electrically coupled to the second ground terminal GND through the turned-on third transistor Q1 and is in a low-level state. At this time, the control signal output terminal 54 outputs the first control signal that is a low-level signal.

If the load connection terminal 30 is under a no-load state, or the external load is correctly coupled to the load connection terminal 30, that is, the positive electrode of the external load is electrically coupled to the positive terminal CAR+, and the negative electrode of the external load is electrically coupled to the positive terminal CAR+, then the control terminal 1 of the first transistor Q3 is electrically coupled to the first ground terminal PGND and receives a low-level signal, so that the first transistor Q3 is turned off. The control terminal 1 of the second transistor Q6 is electrically coupled to the drive voltage input terminal 53 through the resistor R21 and receive a high-level signal, so that the second transistor Q6 is turned on. The control terminal 1 of the third transistor Q1 is electrically coupled to the second ground terminal GND through the turned-on second transistor Q6 and is in a low-level state, so that the third transistor Q1 is turned off. The control signal output terminal 54 is electrically coupled to the drive voltage input terminal 53 and is in a high-level state. At this time, the control signal output terminal 54 outputs the second control signal that is a high-level signal.

In the third embodiment, the drive signal transmission module 45 includes a first input terminal 451, a second input terminal 452, and an output terminal 453. The first input terminal 451 is electrically coupled to the controller 70, and is configured to receive the drive signal RELAY_EN2 output by the controller 70. The second input terminal 452 is electrically coupled to the control signal output terminal 54 of the reverse connection detection module 50*c*, and is configured to receive the control signal C_EN output by the reverse connection detection module 50*c*. The output terminal 453 is electrically coupled to the switch circuit 40.

When the first input terminal 451 receives the drive signal RELAY_EN2 and the second input terminal 452 receives the second control signal output by the reverse connection detection module 50*c*, the drive signal transmission module 45 transmits the drive signal RELAY_EN2 to the switch circuit 40 through the output terminal 453.

The drive signal transmission module 45 also suspends the transmission of the drive signal RELAY_EN2 when the second input terminal 452 receives the first control signal output by the reverse connection detection module 50*c*.

In the third embodiment, the drive signal transmission module 45 is a logic control circuit including logic elements, switch elements, or the like. It is understandable that, in another embodiment, the drive signal transmission module 45 may also be a transmission circuit including other electronic components, as long as the transmission circuit can realize the transmission of the drive signal RELAY_EN2 output by the controller 70, and the transmission function can be controlled by the control signal C_EN output by the reverse connection detection module 50*c*.

In the third embodiment, the drive signal transmission module 45 includes a logical AND gate U3, and the logical AND gate U3 is configured to perform a logical AND operation on the signals respectively received by the first input terminal 451 and the second input terminal 452. As described above, the drive signal RELAY_EN2 is a high-level signal.

During operation, if the external load is reversely coupled to the load connection terminal 30, as described above, the control signal output terminal 54 outputs the first control signal that is a low-level signal, the second input terminal 452 of the logic AND gate U3 receives the first control signal, so that the output terminal 453 of the logic AND gate U3 is kept in a low-level state. At this time, the logical AND gate U3 is unable to output the drive signal RELAY_EN2, regardless of whether the controller 70 outputs the drive signal RELAY_EN2. In this way, even if the user forces the controller 70 to output the drive signal RELAY_EN2 through the button control module 82, the drive signal RELAY_EN2 cannot be transmitted to the switch circuit 40, and the switch circuit 40 will not be conducted, thereby disconnecting the electrical connection between the power source and the external load, so as to prevent the power source from discharging to the external load.

If the load connection terminal is under a no-load state or the external load is correctly coupled to the load connection terminal 30, as described above, the control signal output terminal 54 outputs the second control signal that is a high-level signal, and the second input terminal 452 of the logic AND gate U3 receives the second control signal, that is, a high-level signal. At this time, if the controller 70 outputs the drive signal RELAY_EN2, the logical AND gate U3 can output the drive signal RELAY_EN2. In this way, the user can force, through the button control module 82, the controller 70 to output the drive signal RELAY_EN2, and the controller 70 can also output the drive signal RELAY_EN2 according to actual operating conditions in the automatic output mode, and the drive signal RELAY_EN2 can also be transmitted by the logic AND gate U3 to the switch circuit 40 to conduct the switch circuit 40, thereby conducting the electrical connection between the power source and the external load, so that the power source discharging to the external load.

It can be understood that, in the third embodiment, the drive signal transmission module 45 can normally transmit the drive signal RELAY_EN2 in a normal state.

In the smart connection device 103 provided in the third embodiment of the present disclosure, a transistor-containing combined switch circuit is used as the reverse connection detection module 50*c*, so that the reverse connection state of the external load can be quickly detected based on the fast turn-on and fast turn-off characteristics of the transistors. The drive signal transmission module 45 is arranged on the transmission path of the drive signal RELAY_EN2, and the transmission of the drive signal RELAY_EN2 by the drive signal transmission module 45 is directly controlled by the control signal C_EN output by the reverse connection detection module 50*c*, so that the transmission path of the drive signal RELAY_EN2 can be cut off when the external load is reversely connected. In this way, the objectives of rapidly responding to the first control signal corresponding to the reverse connection state of the external load as well as timely disconnecting the discharge of the power source to the external load can be achieved. It can be seen that the smart connection device 103 provided in the third embodiment of the present disclosure can significantly improve the detection speed and effectiveness of relevant protection functions, thereby significantly improving the safety and reliability of the power output control system. In addition, in the smart connection device 103 provided in the third embodiment of the present disclosure, key components are low in cost, and peripheral circuits are simple and reliable, which not only reduces the material cost of the product, but also saves labor cost and material cost of after-sale products.

It can be understood that in another embodiment, the reverse connection detection module 50*c* may also be a detection circuit composed of sensor devices, such as a photocoupler, to realize the reverse connection detection function of the external load.

Referring to FIG. 9 again, in the third embodiment, the smart connection device 103 further includes a reverse connection state indication module 61 electrically coupled to the reverse connection detection module 50*c*. The reverse connection detection module 50*c* is also configured to send the first control signal to the reverse connection state indication module 61, so as to control the reverse connection state indication module 61 to issue an alarm signal for indicating a reverse connection alarm prompt.

Referring to FIG. 10 again, the reverse connection state indication module 61 includes a display unit 611 and/or an alarm unit 612. The display unit 611 includes at least one light-emitting diode or at least one liquid crystal display device. The display unit 611 is electrically coupled to the reverse connection detection module 50*c*, and the reverse connection detection module 50*c* is further configured to send the first control signal to the display unit 611, so as to control the display unit 611 to emit light or display information to indicating the reverse connection alarm prompt.

The alarm unit 612 includes at least one buzzer or loudspeaker. The alarm unit 612 is electrically coupled to the reverse connection detection module 50*c*. The reverse connection detection module 50*c* is further configured to send the first control signal to the alarm unit 612 to control the alarm unit 612 to emit an alarm sound for indicating the reverse connection alarm prompt.

In the third embodiment, the reverse connection state indication module 61 includes the display unit 611 and the alarm unit 612. The display unit 611 includes a light-emitting diode LED2, and the alarm unit 612 includes a loudspeaker LS1. The light-emitting diode LED2 and the alarm unit 612 are electrically coupled in parallel between the voltage source VCC and the second connection terminal 3 of the third transistor Q1. An anode of the light-emitting diode LED2 is electrically coupled to the voltage source VCC, and a cathode of the light-emitting diode LED2 is electrically coupled to the second connection terminal 3 of the third transistor Q1 through a resistor R16. The loudspeaker LS1 is electrically coupled to the second connection terminal 3 of the third transistor Q1 through a resistor R10.

During operation, if the external load is reversely coupled to the load connection terminal 30, as described above, the third transistor Q1 is turned on, so that the circuit in which the light-emitting diode LED2 and the loudspeaker LS1 are included is conducted, so as to cause the light-emitting diode LED2 to emit light and cause the loudspeaker LS1 to emit an alarm sound to prompt that the external load is reversely coupled to the load connection terminal 30.

If the load connection terminal 30 is under the no-load state or the external load is correctly coupled to the load connection terminal 30, as described above, the third transistor Q1 is turned off, so that the circuit in which the light-emitting diode LED2 and the loudspeaker LS1 are included is disconnected, so that the light-emitting diode LED2 does not emit light and the loudspeaker LS1 does not emit an alarm sound.

In the smart connection device 103 provided in the third embodiment of the present disclosure, the working state of the reverse connection state indication module 61 is directly controlled by the control signal C_EN that is output by the reverse connection detection module 50*c*, so that the objectives of rapidly responding to the first control signal corresponding to the reverse connection state of the external load and timely providing the user with an alarm prompt of the reverse connection state can be achieved. In this way, the user can adjust the electrical connection between the smart connection device 103 and the external load in time.

Fourth Embodiment

Figure 11:
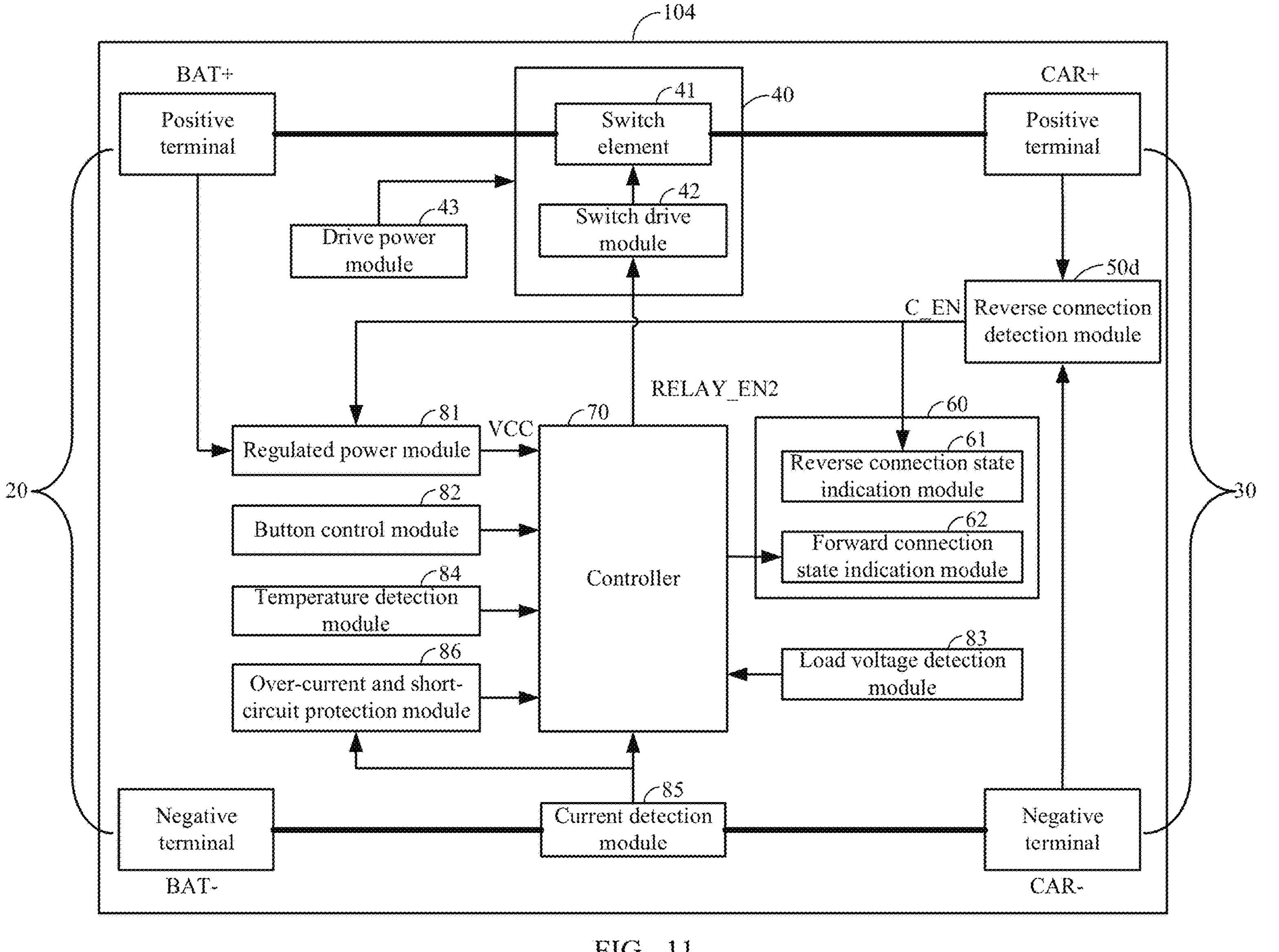
FIG. 11 is a schematic diagram of functional modules of a smart connection device according to a fourth embodiment of the present disclosure.

The fourth embodiment of the present disclosure provides a smart connection device. In the smart connection device, the detection unit is configured to detect the connection state between the load connection terminal and an external load, and the power supply of the regulated power module to the controller is directly controlled by the control signal that is output by the detection unit, so that when the external load is reversely connected, the controller can be prevented from responding to a button instruction input by a user, thereby preventing the controller from outputting the drive signal that is configured to conduct the switch circuit, so that the switch circuit is in the disconnected state. In this way, the control signal corresponding to the reverse connection state of the external load can be quickly responded to, so as to prevent the power source from discharging to the external load FIG. 11 is a schematic diagram of functional modules of a smart connection device 104 according to the fourth embodiment of the present disclosure. It should be noted that the smart connection device 104 corresponds to the smart connection device 100 illustrated in FIG. 1.

As illustrated in FIG. 11, in the fourth embodiment, the regulated power module 81 is electrically coupled to the controller 70. The regulated power module 81 is configured to supply power to the controller 70. The control signal C_EN is configured to enable or suspend the power supply of the controller 70. Specifically, as described above, the control signal C_EN includes a first control signal and a second control signal. In the fourth embodiment, the first control signal is configured to suspend the power supply of the controller 70, so that the controller 70 is kept in a power-off state and is unable to output the drive signal RELAY_EN2, therefore, the switch circuit 40 is kept in the disconnected state, thereby disconnecting the electrical connection between the power source and the external load. That is, the current output circuit 11 through which the power source discharges to the external load is disconnected, so as to prevent the power source from discharging to the external load. It can be understood that the controller 70 stops running when it is in the power-off state, and therefore cannot output the drive signal RELAY_EN2. The second control signal is configured to restore the power supply of the controller 70, so as to keep the controller 70 in a power-on state, wherein the controller 70 can output the drive signal RELAY_EN2 when the controller 70 is in the power-on state. It can be understood that the controller 70 can run normally when it is in the power-on state, and therefore can normally control the on-off state of the switch circuit 40 according to actual operating conditions.

In the fourth embodiment, the detection unit 50 includes a reverse connection detection module 50*d*. The reverse connection detection module 50*d* is configured to detect the connection state between the load connection terminal 30 and the external load, and output a corresponding control signal C_EN according to the detected connection state.

The reverse connection detection module 50*d* is electrically coupled to the regulated power module 81. The reverse connection detection module 50*d* is configured to send the control signal C_EN to the regulated power module 81 to control the regulated power module 81 to supply power to the controller 70, or control the regulated power module 81 to suspend the power supplied to the controller 70.

Specifically, the reverse connection detection module 50*d* is configured to output the first control signal when it detects that the external load is reversely coupled to the load connection terminal 30, and send the first control signal to the regulated power module 81, so as to control the regulated power module 81 to suspend the power supplied to the controller 70, so that the controller 70 is kept in the power-off state.

The reverse connection detection module 50*d* is further configured to output the second control signal when it detects that the load connection terminal 30 is under the no-load state or the external load is correctly coupled to the load connection terminal 30, and send the second control signal to the regulated power module 81, so as to control the regulated power module 81 to restore the power supply of the controller 70, so that the controller 70 is kept in the power-on state.

Since the user can force, through the button control module 82, the controller 70 to output the drive signal RELAY_EN2, when the external load is reversely coupled to the load connection terminal 30, the power supply of the regulated power module 81 to the controller 70 is cut off, so that the controller 70 is kept in the power-off state, and the user can be prevented from inputting any button instructions to force the controller 70 to output the drive signal RELAY_EN2, thereby preventing the power source from discharging to the external load. In this way, electrical safety of the circuits can be ensured. In addition, the power supply of the regulated power module 81 to the controller 70 is directly controlled by the control signal C_EN that is output by the reverse connection detection module 50*d*, therefore, the objectives of rapidly responding to the first control signal corresponding to the reverse connection state of the external load as well as timely disconnecting the discharge of the power source to the external load can be achieved.

In the fourth embodiment, the circuit structures of the reverse connection detection module 50*d* may adopt the circuit structures of the reverse connection detection module 50*a* of the first embodiment illustrated in FIG. 5. For the specific structures of the reverse connection detection module 50*d*, reference may be made to the specific introduction of the reverse connection detection module 50*a* above, which will not be repeated here.

Figure 12:
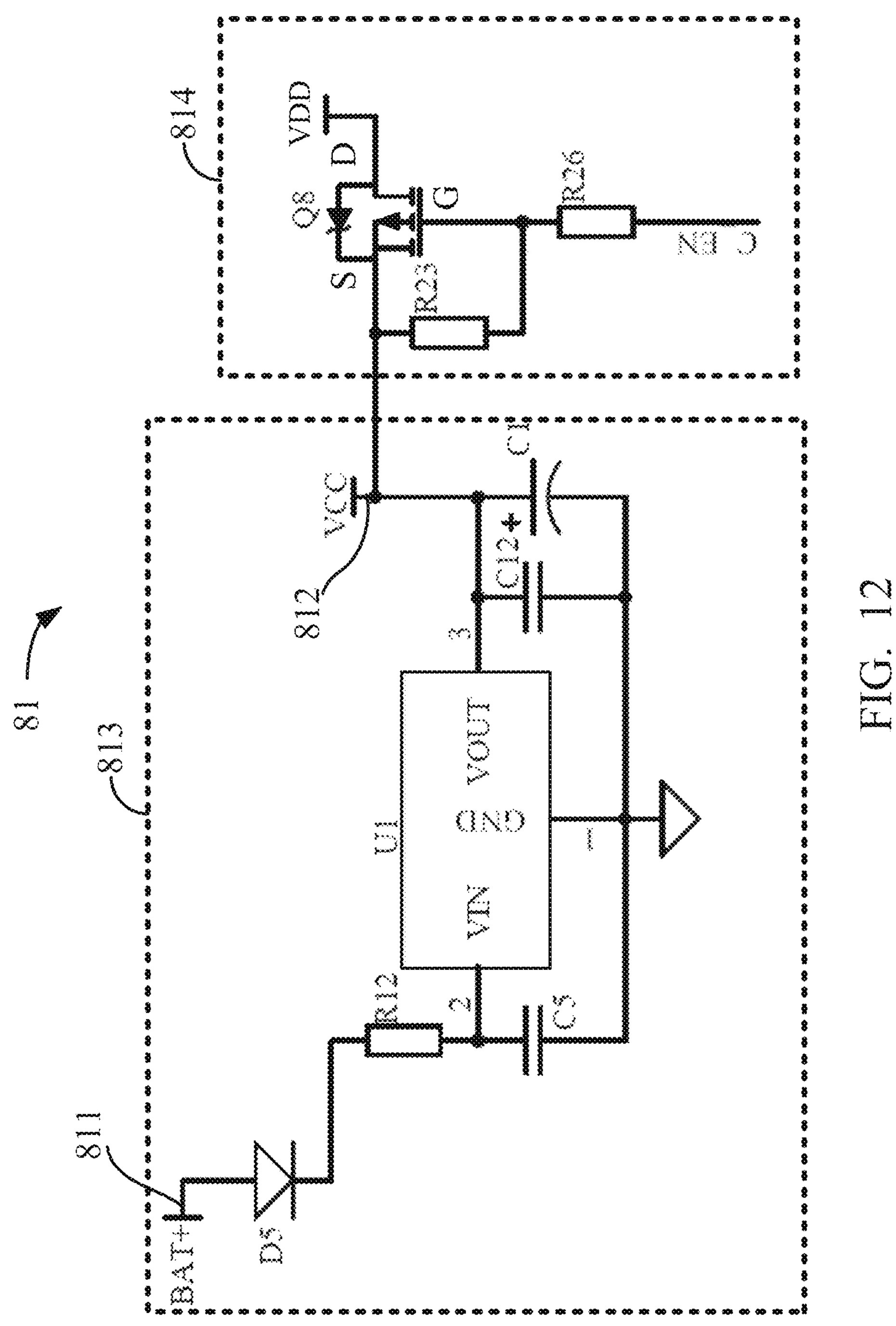
FIG. 12 is a schematic diagram of circuit structures of a regulated power module of the smart connection device illustrated in FIG. 11.
Figure 13:
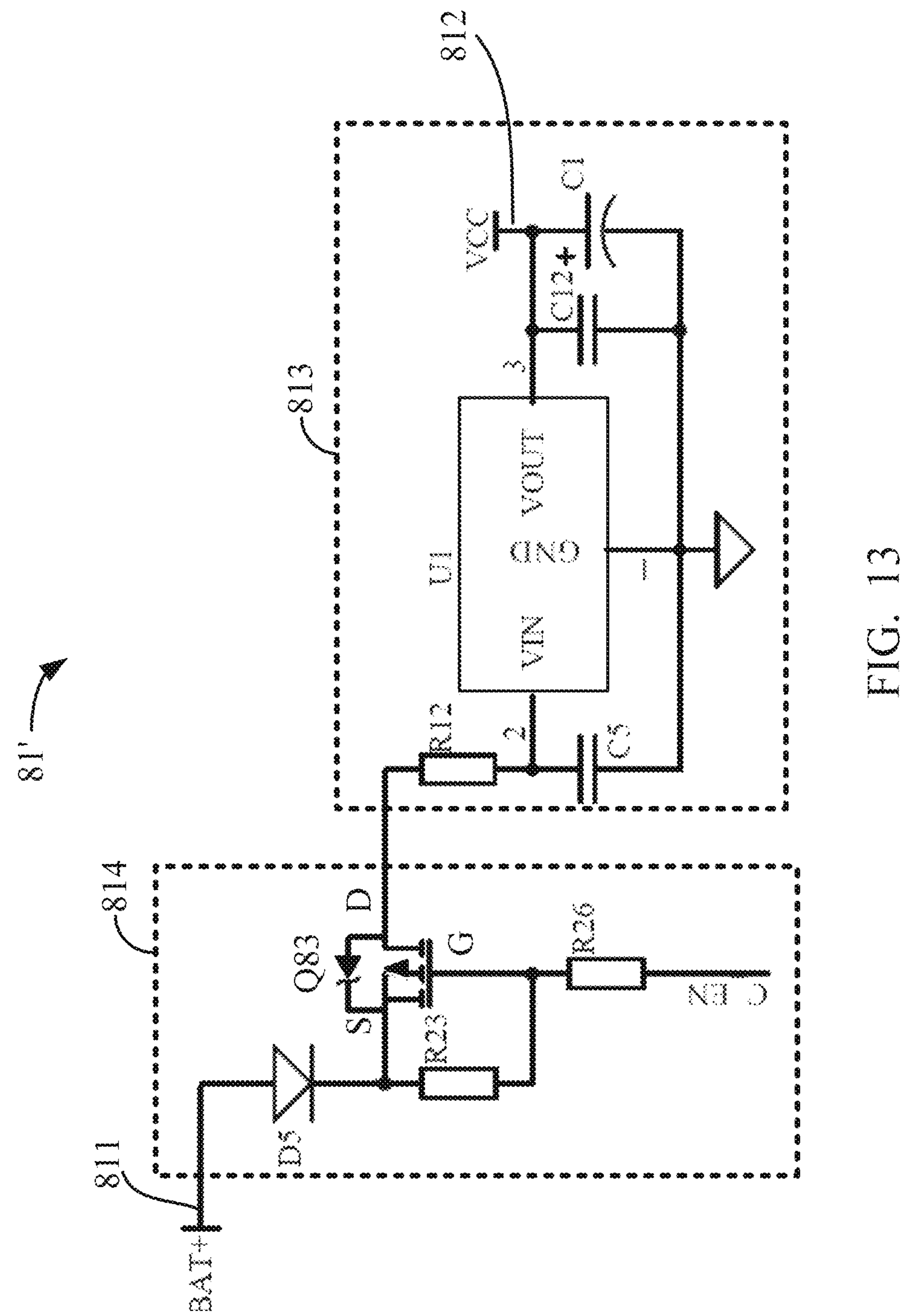
FIG. 13 is a schematic diagram of another circuit structures of the regulated power module of the smart connection device illustrated in FIG. 11.

In the fourth embodiment, the control signal output terminal 54 of the reverse connection detection module 50*d* is electrically coupled, through a resistor R26, to a control terminal G of a voltage control switch Q83 included in the regulated power module 81 (as illustrated in FIG. 12) or the regulated power module 81' (as illustrated in FIG. 13), so that the reverse connection detection module 50*d* can output the control signal C_EN to the regulated power module 81 or 81'.

Referring to FIG. 5 again, according to the specific introduction of the reverse connection detection module 50*a* above, when the external load is reversely coupled to the load connection terminal 30, the first transistor Q3 is turned on, and the second transistor Q6 is turned off. In this way, the control signal output terminal 54 is in a high-impedance state. When the load connection terminal 30 is under the no-load state, or the external load is correctly coupled to the load connection terminal 30, the control signal output terminal 54 outputs the second control signal that is a low-level signal.

In the fourth embodiment, the circuit structures of the regulated power module 81 may adopt the circuit structures illustrated in FIG. 12 or FIG. 13. The circuit structures and working principles of the regulated power module 81 or 81' will be introduced below with reference to FIG. 12-FIG. 14.

Referring to FIG. 12, in one embodiment, the regulated power module 81 includes a power input terminal 811, a regulated power output terminal 812, a regulated power generation module 813, and a control switch module 814. The power input terminal 811 is electrically coupled to the power connection terminal 20, for example, the positive terminal BAT+. The power input terminal 811 is configured to receive the input voltage of the power source through the power connection terminal 20. The regulated power generation module 813 is electrically coupled between the power input terminal 811 and the regulated power output terminal 812. The regulated power generation module 813 is configured to perform voltage conversion on the input voltage, and output the stable voltage VCC at the regulated power output terminal 812. Wherein, the regulated power generation module 813 includes a voltage regulator U1, and the voltage regulator U1 may be a DC-DC converter or a linear voltage regulator.

Figure 14:
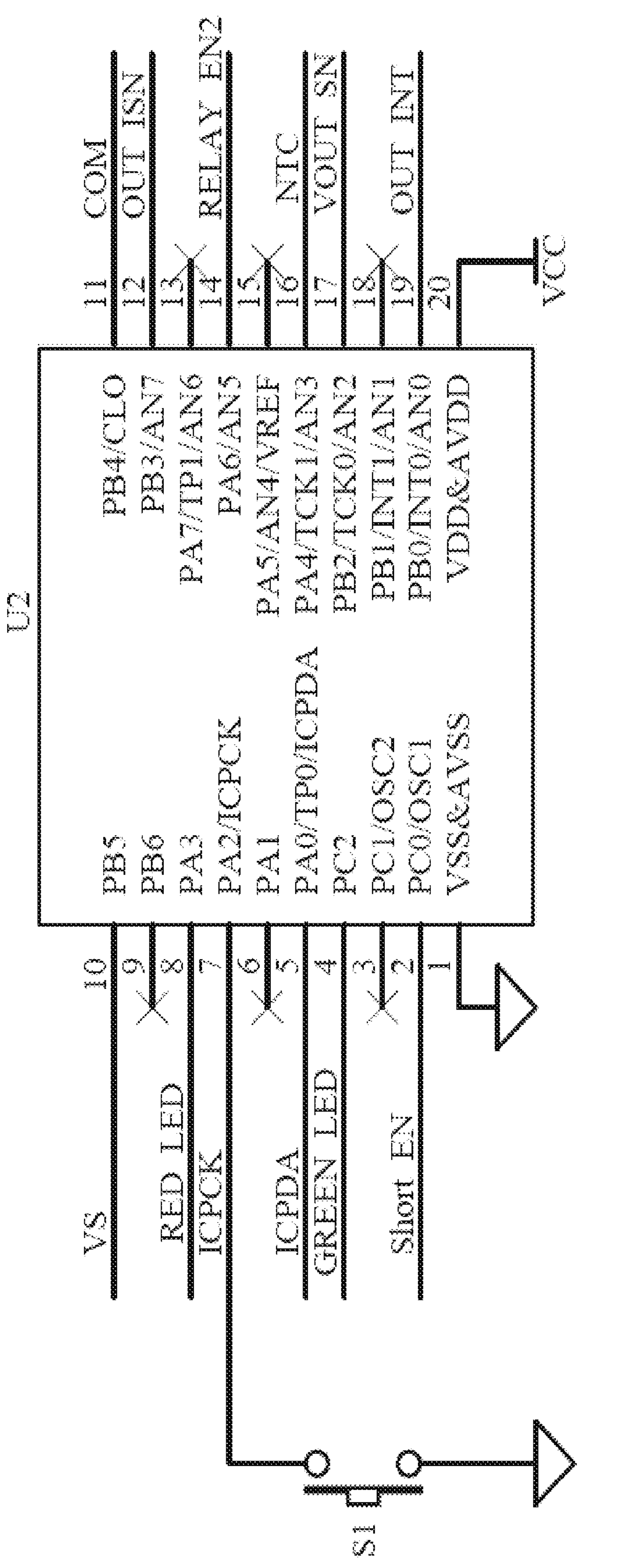
FIG. 14 is a schematic structural diagram of a controller illustrated in FIG. 11.

The control switch module 814 is electrically coupled between the regulated power output terminal 812 and the controller 70. The control switch module 814 includes the voltage control switch Q83 that is electrically coupled between the regulated power output terminal 812 and the controller 70. For example, as illustrated in FIG. 14, the controller 70 is a micro controller U2, and a connection terminal D of the voltage control switch Q83 is electrically coupled to a pin VDD&AVDD of the micro controller U2. The micro controller U2 receives drive voltage through the pin VDD&AVDD, that is, receives the stable voltage VCC output by the regulated power module 81.

Specifically, a first connection terminal S of the voltage control switch Q83 is electrically coupled to the regulated power output terminal 812, a second connection terminal D of the voltage control switch Q83 is electrically coupled to the controller 70, and a control terminal G of the voltage control switch Q83 is electrically coupled to the regulated power output terminal 812 through a resistor R23. The control terminal G of the voltage control switch Q83 is also electrically coupled to the control signal output terminal 54 of the reverse connection detection module 50*d* through a resistor R26, so as to realize the electrical connection between the reverse connection detection module 50*d* and the regulated power module 81, and enable the regulated power module 81 to receive the control signal C_EN output by the reverse connection detection module 50*d*.

In the fourth embodiment, the voltage control switch Q83 is a transistor that is turned on by a low-level signal, such as a PMOS transistor or a PNP triode. As illustrated in FIG. 12, the voltage control switch Q83 is a PMOS transistor.

During operation, the reverse connection detection module 50*d* outputs the control signal C_EN to the control terminal G of the voltage control switch Q83 to switch the on-off state of the voltage control switch Q83, thereby controlling the power supply state of the regulated power module 81 to the controller 70, and then further controlling the power-on/power-off state of the controller 70.

Specifically, if the external load is reversely coupled to the load connection terminal 30, as described above, the control signal output terminal 54 is in a high-impedance state. However, since the control signal output terminal 54 is electrically coupled to the control terminal G of the voltage control switch Q83, therefore, the control signal output terminal 54 is electrically coupled to the regulated power output terminal 812 through the resistor R26 and the resistor R23, so that the control signal output terminal 54 is in a high-level state. At this time, it can also be understood as that the control signal output terminal 54 outputs the first control signal that is a high-level signal.

The control terminal G of the voltage control switch Q83 is electrically coupled to the regulated power output terminal 812 and is in a high-level state, so that the voltage control switch Q83 enters an off state, which can also be understood as that the voltage control switch Q83 enters the off state because its control terminal G receives the first control signal (high-level signal) output from the control signal output terminal 54 of the reverse connection detection module 50*d*, thereby disconnecting the electrical connection between the regulated power output terminal 812 and the controller 70, that is, the power supplied to the controller 70 is cut off, so that the controller 70 cannot receive the stable voltage and is kept in the power-off state. At this time, the controller 70 cannot output the drive signal RELAY_EN2, so that the switch circuit 40 is kept in the disconnected state, thereby disconnecting the electrical connection between the power source and the external load, so as to prevent the power source from discharging to the external load.

If the load connection terminal 30 is under the no-load state or the external load is correctly coupled to the load connection terminal 30, as described above, the control signal output terminal 54 outputs the second control signal that is a low-level signal. The voltage control switch Q83 enters an on state because its control terminal G receives the second control signal (low-level signal) output from the control signal output terminal 54 of the reverse connection detection module 50*d*, so as to conduct the electrical connection between the regulated power output terminal 812 and the controller 70, that is, the power supplied to the controller 70 is restored, so that the controller 70 receives the stable voltage and is kept in the power-on state. At this time, the controller 70 can run normally, and therefore can normally control the on-off state of the switch circuit 40 according to actual operating conditions, so that the power source can discharge to the external load.

It is understandable that, in the one embodiment, the voltage control switch Q83 is in the on state by default in a normal state, so that the regulated power module 81 can continuously output the stable voltage VCC in the normal state, to provide a stable voltage to each functional module of the smart connection device 104.

It is understandable that, in the one embodiment, when the external load is reversely coupled to the load connection terminal 30, although the power supply of the controller 70 is cut off, the regulated power module 81 can still output the stable voltage VCC at the regulated power output terminal 812. Therefore, the regulated power module 81 can still provide operating voltage for other functional modules of the smart connection device 104, such as the reverse connection detection module 50*d*, so as to ensure the safety and stability of power consumption of each functional module of the smart connection device 104. Optionally, the operating voltage of other functional modules of the smart connection device 104 may also be provided by a power source that is electrically coupled to the power connection terminal 20.

Referring to FIG. 13, another embodiment of the present disclosure also provides another structures of the regulated power module. The difference between the regulated power module 81' provided by the embodiment illustrated in FIG. 13 and the regulated power module 81 provided by the embodiment illustrated in FIG. 12 is that the control switch module 814 of the regulated power module 81' is electrically coupled between the power input terminal 811 and the regulated power generation module 813; the regulated power output terminal 812 of the regulated power module 81' is electrically coupled to the controller 70.

In the another embodiment, the first connection terminal S of the voltage control switch Q83 of the control switch module 814 is electrically coupled to the power input terminal 811. The second connection terminal D of the voltage control switch Q83 is electrically coupled to the voltage input terminal of the regulated power generation module 813. The control terminal G of the voltage control switch Q83 is electrically coupled to the power input terminal 811 through a resistor R23. The control terminal G of the voltage control switch Q83 is also electrically coupled to the control signal output terminal 54 of the reverse connection detection module 50*d* through the resistor R26, so as to realize the electrical connection between the reverse connection detection module 50*d* and the regulated power module 81, and to enable the regulated power module 81 to receive the control signal C_EN output by the reverse connection detection module 50*d*.

During operation, the reverse connection detection module 50*d* outputs the control signal C_EN to the control terminal G of the voltage control switch Q83 to switch the on-off state of the voltage control switch Q83, thereby controlling the power supply state of the regulated power module 81', and then further controlling the power-on/power-off state of the controller 70.

Specifically, if the external load is reversely coupled to the load connection terminal 30, as described above, the control signal output terminal 54 is in a high-impedance state. However, since the control signal output terminal 54 is electrically coupled to the control terminal G of the voltage control switch Q83, therefore, the control signal output terminal 54 is electrically coupled to the power input terminal 811 through the resistor R26 and the resistor R23, so that the control signal output terminal 54 is in a high-level state. At this time, it can also be understood as that the control signal output terminal 54 outputs the first control signal that is a high-level signal.

The control terminal G of the voltage control switch Q83 is electrically coupled to the power input terminal 811 and is in a high-level state, so that the voltage control switch Q83 enters an off state, which can also be understood as that the voltage control switch Q83 enters the off state because its control terminal G receives the first control signal (high-level signal) output from the control signal output terminal 54 of the reverse connection detection module 50*d*, thereby disconnecting the electrical connection between power input terminal 811 and the regulated power generation module 813, that is, the power supplied to the regulated power generation module 813 is cut off, so that the regulated power generation module 813 cannot receive the input voltage and suspends outputting the stable voltage, thereby keeping the controller 70 in the power-off state.

If the load connection terminal 30 is under a no-load state or the external load is correctly coupled to the load connection terminal 30, as described above, the control signal output terminal 54 outputs the second control signal that is a low-level signal. The voltage control switch Q83 enters an on state because its control terminal G receives the second control signal (low-level signal) output from the control signal output terminal 54 of the reverse connection detection module 50*d*, so as to conduct the electrical connection between the power input terminal 811 and the regulated power generation module 813, that is, the power supplied to the regulated power generation module 813 is restored, so that the regulated power generation module 813 receives the input voltage and outputs the stable voltage, so that the controller 70 is kept in the power-on state.

It is understandable that, in the another embodiment, when the external load is reversely coupled to the load connection terminal 30, because the regulated power generation module 813 suspends the output of the stable voltage, the regulated power module 81 cannot provide operating voltage for other functional modules of the smart connection device 104, such as the reverse connection detection module 50*d*. Therefore, the operating voltage of the other functional modules of the smart connection device 104 needs to be provided by the power source that is electrically coupled to the power connection terminal 20.

In the smart connection device 104 provided in the fourth embodiment of the present disclosure, a transistor-containing combined switch circuit is used as the reverse connection detection module 50*d*, so that the reverse connection state of the external load can be quickly detected based on the fast turn-on and fast turn-off characteristics of the transistors. The power supply of the regulated power module 81 or 81' to the controller 70 is directly controlled by the control signal output by the reverse connection detection module 50*d*, so that when the external load is reversely connected, the controller 70 can be prevented from responding to the button instruction input by a user, thereby preventing the controller 70 from outputting the drive signal RELAY_EN2 that is configured to conduct the switch circuit, so that the switch circuit 40 is in a disconnected state. In this way, the objectives of rapidly responding to the first control signal corresponding to the reverse connection state of the external load as well as timely disconnecting the discharge of the power source to the external load can be achieved. It can be seen that the smart connection device 104 provided in the fourth embodiment of the present disclosure can significantly improve the detection speed and effectiveness of relevant protection functions, thereby significantly improving the safety and reliability of the power output control system. In addition, in the smart connection device 104 provided by the fourth embodiment of the present disclosure, key components are low in cost, and peripheral circuits are simple and reliable, which not only reduces the material cost of the product, but also saves the manpower and material cost of the after-sale products.

It can be understood that, in another embodiment, the reverse connection detection module 50*d* may also be a detection circuit composed of sensor devices, such as a photocoupler, to realize the reverse connection detection function of the external load.

Referring to FIG. 11 again, in the fourth embodiment, the smart connection device 104 further includes a reverse connection state indication module 61 electrically coupled to the reverse connection detection module 50*d*. The reverse connection detection module 50*d* is also configured to output the first control signal to the reverse connection state indication module 61, so as to control the reverse connection state indication module 61 to issue an alarm signal for indicating a reverse connection alarm prompt.

In the fourth embodiment, the structures of the reverse connection state indication module 61 may adopt the structures of the reverse connection state indication module 61 illustrated in FIG. 5 in the first embodiment. For the specific structures of the reverse connection state indication module 61, reference may be made to the specific introduction above, which will not be repeated here.

Fifth Embodiment

The fifth embodiment of the present disclosure provides a smart connection device. In smart connection device, the detection unit is configured to detect the connection state between the load connection terminal and the external load, and operation states of the button control module are directly controlled by the control signal output by the detection unit, so that when the external load is reversely connected, the user can be prevented from entering the button instructions to force the controller to output the drive signal that is configured to conduct the switch circuit. In this way, the control signal corresponding to the reverse connection state of the external load can be quickly responded to, so as to prevent the power source from discharging to the external load.

Figure 15:
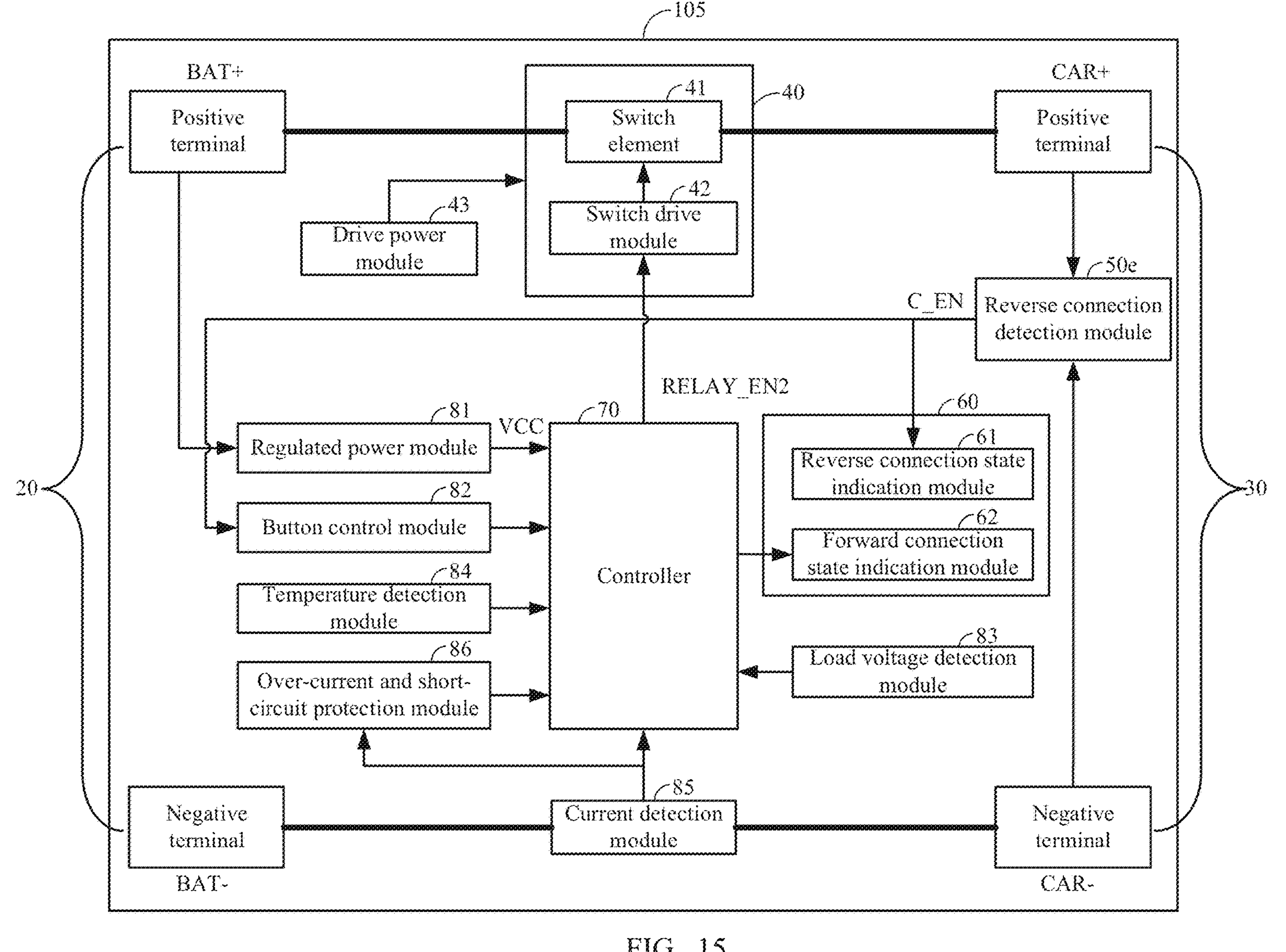
FIG. 15 is a schematic diagram of functional modules of a smart connection device according to a fifth embodiment of the present disclosure.

FIG. 15 is a schematic diagram of functional modules of a smart connection device 105 according to the fifth embodiment of the present disclosure. It should be noted that the smart connection device 105 corresponds to the smart connection device 100 illustrated in FIG. 1.

As illustrated in FIG. 15, in the fifth embodiment, the detection unit 50 includes a reverse connection detection module 50*e*. The reverse connection detection module 50*e* is configured to detect the connection state between the load connection terminal 30 and the external load, and output a corresponding control signal C_EN according to the detected connection state.

The reverse connection detection module 50*e* is also electrically coupled to the button control module 82. The reverse connection detection module 50*e* is also configured to send the control signal C_EN to the button control module 82 to switch the operation states of the button control module 82. The button control module 82 can generate the button instruction in response to a user's pressing operation when the button control module 82 is in an active state, wherein the button instruction is configured to force the controller 70 to output the drive signal RELAY_EN2.

Specifically, the reverse connection detection module 50*e* outputs the first control signal when it detects that the external load is reversely coupled to the load connection terminal 30, and sends the first control signal to the button control module 82, so as to switch the operation state of the button control module 82 to a disable state. Wherein, the button control module 82 is unable to respond to the user's pressing operation to generate the button instruction when it is in the disable state, so that the user cannot force, through the button control module 82, the controller 70 to output the drive signal RELAY_EN2, so that the switch circuit 40 is kept in the disconnected state, thereby disconnecting the electrical connection between the power source and the external load, that is, the current output circuit 11 through which the power source discharges to the external load is disconnected, so as to prevent the power source from discharging to the external load.

The reverse connection detection module 50*e* is also configured to output the second control signal when it detects that the load connection terminal 30 is under the no-load state or the external load is correctly coupled to the load connection terminal 30, and send the second control signal to the button control module 82, so as to switch the operation state of the button control module 82 to the active state, thereby allowing the user to input the button instruction through the button control module 82, to control the controller 70 to output the drive signal RELAY_EN2.

Since the user can force, through the button control module 82, the controller 70 to output the drive signal RELAY_EN2, when the external load is reversely coupled to the load connection terminal 30, the operation state of the button control module 82 is switched to the disable state, which can prevent the user from entering the button instruction to force the controller 70 to output the drive signal RELAY_EN2, thereby preventing the power source from discharging to the external load. In this way, electrical safety of the circuits can be ensured. In addition, the operation states of the button control module 82 is directly controlled by the control signal C_EN that is output by the reverse connection detection module 50*e*, therefore, the objectives of rapidly responding to the first control signal corresponding to the reverse connection state of the external load as well as timely disconnecting the discharge of the power source to the external load can be achieved.

In the fifth embodiment, the circuit structures of the reverse connection detection module 50*e* may adopt the circuit structures of the reverse connection detection module 50*c* illustrated in FIG. 10 in the third embodiment. For the specific structures of the reverse connection detection module 50*e*, reference may be made to the specific introduction of the reverse connection detection module 50*c* above, which will not be repeated here.

Referring to FIG. 10, according to the specific introduction of the reverse connection detection module 50*c* above, when the external load is reversely coupled to the load connection terminal 30, the control signal output terminal 54 outputs the first control signal that is a low-level signal. When the load connection terminal 30 is under the no-load state, or the external load is correctly coupled to the load connection terminal 30, the control signal output terminal 54 outputs the second control signal that is a high-level signal.

Figure 16:
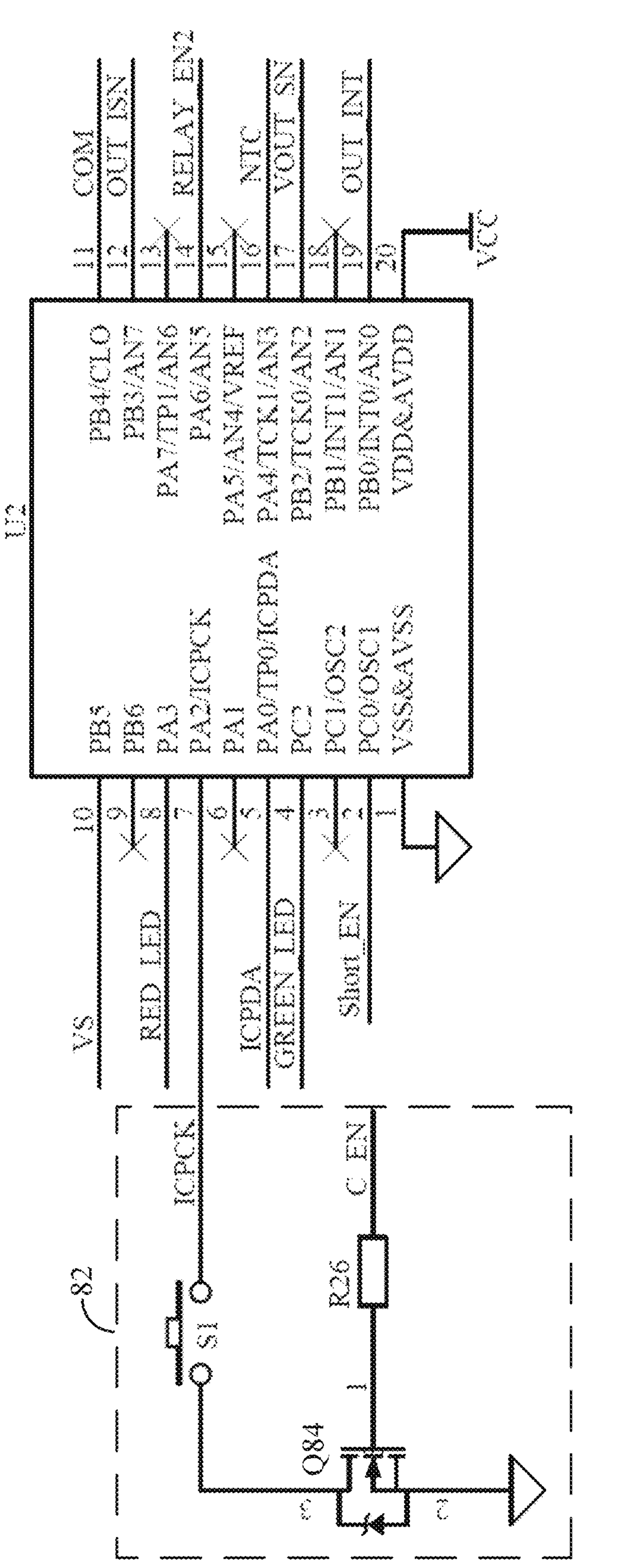
FIG. 16 is a schematic structural diagram of a controller and a button control module illustrated in FIG. 15.

In the fifth embodiment, the circuit structures of the button control module 82 may adopt the circuit structures illustrated in FIG. 16. The circuit structures and working principle of the button control module 82 will be introduced below with reference to FIG. 16.

Referring to FIG. 16, in the fifth embodiment, the controller 70 is a micro controller U2. The button control module 82 includes a button module S1 and a button control switch Q84. The button module S1 is electrically coupled between the button control switch Q84 and the micro controller U2. The button module S1 is configured to receive the user's pressing operation and generate the button instruction in response to the pressing operation. When the button module S1 is in the active state, it can receive the user's pressing operation to generate the button instruction; when the button module S1 is in the disable state, it is unable to generate the button instruction.

In the fifth embodiment, the button module S1 may include mechanical physical buttons or virtual touch buttons. The button module S1 allows the user to interact with the system of the smart connection device 105 through physical or virtual touch buttons.

A control terminal 1 of the button control switch Q84 is electrically coupled to the control signal output terminal 54 of the reverse connection detection module 50*e* through a resistor R26, so as to realize the electrical connection between the reverse connection detection module 50*e* and the button control module 82, so that the reverse connection detection module 50*e* can output the control signal C_EN (including the first control signal and the second control signal) to the control terminal 1 of the button control switch Q84, so as to switch an on-off state of the button control switch Q84, thereby controlling the operation states of the button module S1.

In the fifth embodiment, the button control switch Q84 is a transistor that is turned on by a high-level signal, such as an NMOS transistor or an NPN triode.

During operation, if the external load is reversely coupled to the load connection terminal 30, as described above, the control signal output terminal 54 outputs the first control signal that is a low-level signal. The button control switch Q84 enters the off state because its control terminal 1 receives the first control signal (low-level signal) output from the control signal output terminal 54. A pull-down ground loop of the button module S1 is disconnected because the button control switch Q84 is turned off. Therefore, the button module 51 is kept in the disable state and is unable to respond to the user's pressing operation to generate the button command, so that the controller 70 cannot receive and respond to the button instruction. Therefore, the user cannot force, through the button module 51, the controller 70 to output the drive signal RELAY_EN2, and the switch circuit 40 will not be conducted, thereby disconnecting the electrical connection between the power source and the external load, so as to prevent the power source from discharging to the external load.

If the load connection terminal is under the no-load state or the external load is correctly coupled to the load connection terminal 30, as described above, the control signal output terminal 54 outputs the second control signal that is a high-level signal. The button control switch Q84 enters an on state because its control terminal 1 receives the second control signal (high-level signal) output from the control signal output terminal 54, thereby conducting the pull-down ground loop of the button module 51, so that the button module 51 can be kept in the active state and can receive a user's pressing operation and generate the button instruction. In this way, the user can force, through the button module 51, the controller 70 to output the drive signal RELAY_EN2, so that the power source discharges to the external load.

It is understandable that, in the fifth embodiment, the button control switch Q84 is in the on state by default in a normal state, so that the button module 51 is kept in the active state in the normal state, so that the button module S1 can receive the user's pressing operation in real time, so as to control the output of the controller 70.

In the smart connection device 105 provided in the fifth embodiment of the present disclosure, a transistor-containing combined switch circuit is used as the reverse connection detection module 51*e*, so that the reverse connection state of the external load can be quickly detected based on the fast turn-on and fast turn-off characteristics of the transistors. The operation states of the button control module 82 are directly controlled by the control signal C_EN that is output by the reverse connection detection module 51*e*, so that when the external load is reversely connected, the user can be prevented from entering the button instructions to force the controller 70 to output the drive signal RELAY_EN2 that is configured to conduct the switch circuit 40. In this way, the objectives of rapidly responding to the first control signal corresponding to the reverse connection state of the external load as well as timely disconnecting the discharge of the power source to the external load can be achieved. It can be seen that the use of the smart connection device 105 provided in the fifth embodiment of the present disclosure can significantly improve the detection speed and effectiveness of relevant protection functions, thereby significantly improving the safety and reliability of the power output control system. In addition, in the smart connection device 105 provided in the fifth embodiment of the present disclosure, key components are low in cost, and peripheral circuits are simple and reliable, which not only reduces the material cost of the product, but also saves labor cost and material cost of the after-sale products.

It can be understood that, in another embodiment, the reverse connection detection module 50*e* may also be a detection circuit composed of sensor devices, such as a photocoupler, to realize the reverse connection detection function of the external load.

Referring to FIG. 15 again, in the fifth embodiment, the smart connection device 105 further includes a reverse connection state indication module 61 electrically coupled to the reverse connection detection module 50*e*. The reverse connection detection module 50*e* is also configured to send the first control signal to the reverse connection state indication module 61, so as to control the reverse connection state indication module 61 to issue an alarm signal for indicating a reverse connection alarm prompt.

In the fifth embodiment, the structures of the reverse connection state indication module 61 may adopt the structures of the reverse connection state indication module 61 illustrated in FIG. 10 in the third embodiment. For the specific structures of the reverse connection state indication module 61, reference may be made to the specific introduction above, which will not be repeated here.

A second aspect of the present disclosure also provides a smart connection device. The smart connection device controls an on-off state of the drive power circuit by arranging a software-driven module and a hardware-driven module in the drive power circuit of the switch element, so as to ensure that the drive power circuit is conducted only when the load voltage of the external load meets a preset software-driven condition and a hardware-driven condition at the same time, so as to turn on the electrical connection between the power source and the external load, so that the power source can discharge to the external load. Therefore, when the load voltage of the external load does not meet the starting condition, it is possible to avoid electricity safety incidents caused by the user pressing the button control module to forcibly conduct the electrical connection between the power source and the external load. The technical solution provided by the second aspect of the present disclosure will be described in detail below through a specific embodiment.

Figure 17:
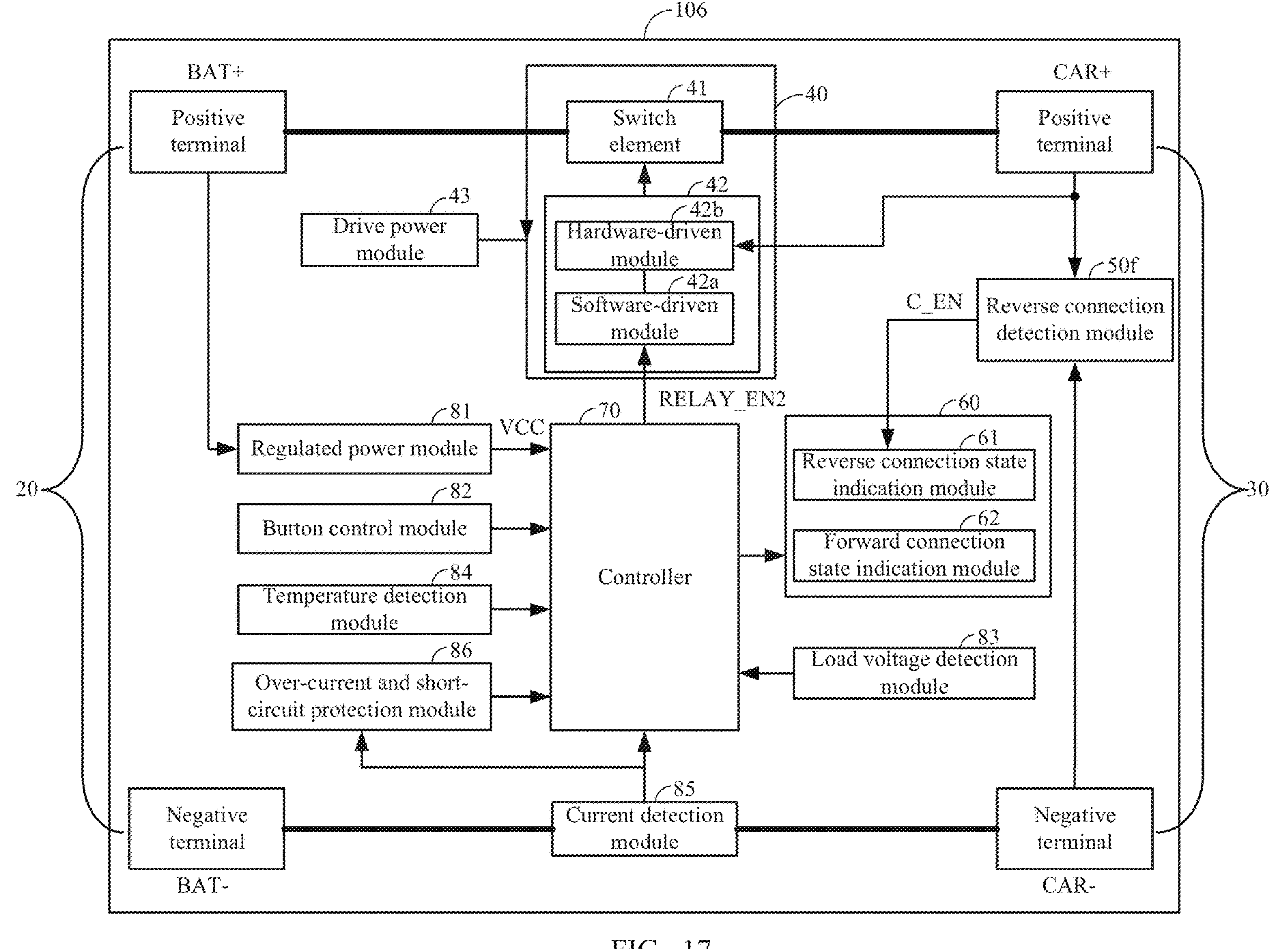
FIG. 17 is a schematic diagram of functional modules of a smart connection device according to a sixth embodiment of the present disclosure.

FIG. 17 is a schematic diagram of functional modules of a smart connection device 106 according to a sixth embodiment of the present disclosure. In the sixth embodiment, the structures of the smart connection device 106 is similar to the structures of the smart connection device 101 illustrated in FIG. 3 in the first embodiment, except that: the control signal C_EN output by a reverse connection detection module 50*f* of the smart connection device 106 is only transmitted to the reverse connection state indication module 61, to control the reverse connection state indication module 61 to issue an alarm signal for indicating a reverse connection alarm prompt; the switch drive module 42 includes a software-driven module 42*a* and a hardware-driven module 42*b*.

The circuit structures of the reverse connection detection module 50*f* and the reverse connection state indication module 61 may adopt the circuit structures illustrated in FIG. 5 in the first embodiment, for the working principle of the reverse connection detection module 50*f*, and the technical solution that the reverse connection detection module 50*f* outputs the first control signal to control the reverse connection state indication module 61 to issue the alarm signal to realize the reverse connection alarm prompt, reference may be made to the specific introduction in the first embodiment above, which will not be repeated here.

In the sixth embodiment, the control signal output terminal 54 of the reverse connection detection module **50*f* is only electrically coupled to the reverse connection state indication module 61, so that the first control signal is only sent to the reverse connection state indication module 61. It should be noted that if other modules or units that do not affect the transmission of the control signal C_EN are provided between the control signal output terminal 54 of the reverse connection detection module 50*f* and the input terminal of the reverse connection state indication module 61**, it is also within the protection scope of the present disclosure.

Figure 18:
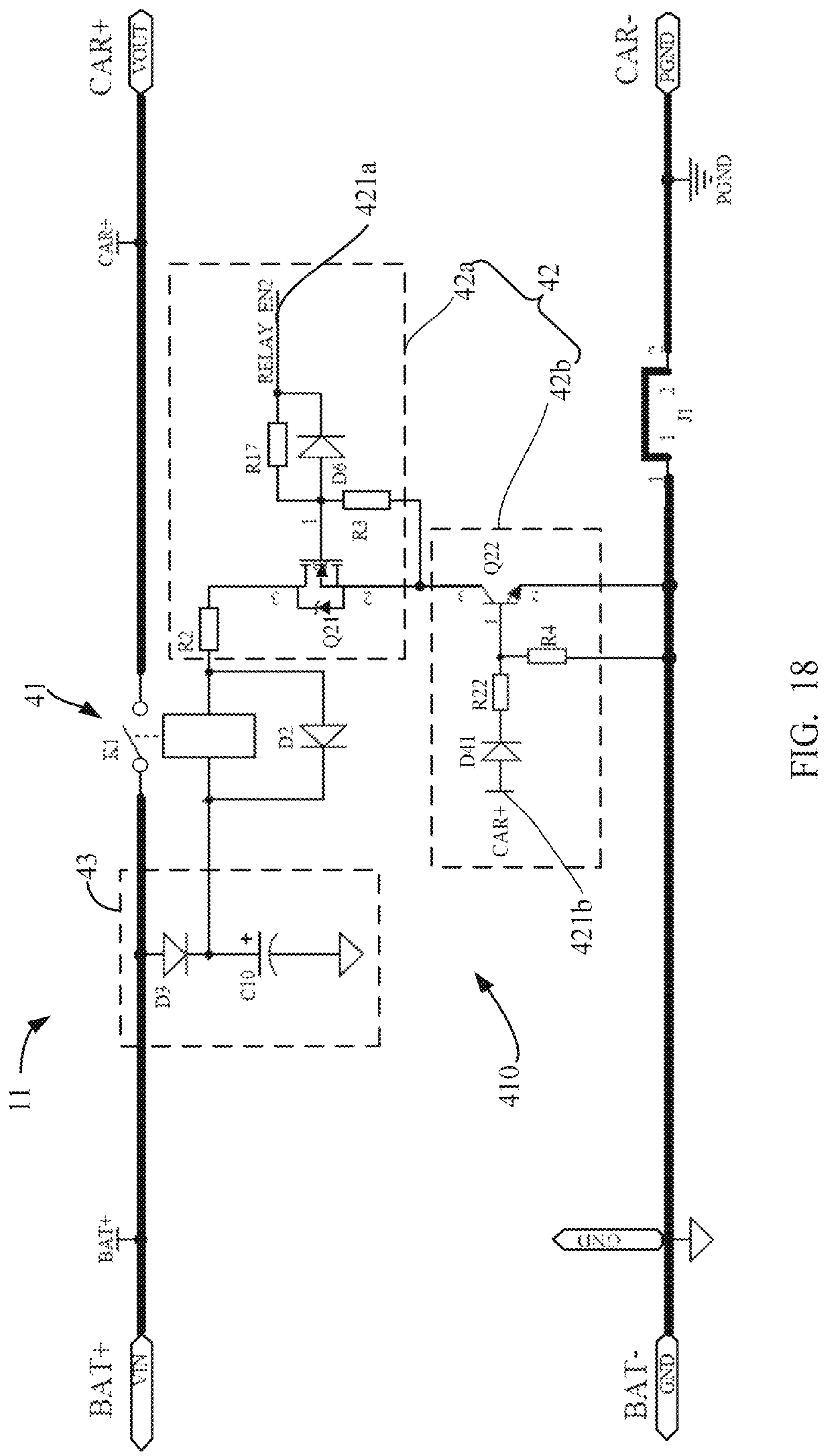
FIG. 18 is a schematic diagram of circuit structures of a current output circuit of the smart connection device illustrated in FIG. 17.

In the sixth embodiment, the circuit structures of the current output circuit 11 through which the power source discharges to the external load may adopt the circuit structures illustrated in FIG. 18. The circuit structures and working principle of the switch drive module 42 will be described below with reference to FIG. 17 and FIG. 18.

As illustrated in FIG. 17 and FIG. 18, in the sixth embodiment, the switch circuit 40 includes a switch element 41 and a switch drive module 42. The switch element 41 is electrically coupled between the power connection terminal 20 and the load connection terminals 30. The switch drive module 42 is electrically coupled to the switch element 41, and configured to realize the on or off of the switch element 41.

The smart connection device 106 further includes a drive power module 43 electrically coupled in the drive power circuit 410 of the switch element 41. The drive power module 43 is configured to provide electrical energy to the switch element 41, so as to turn on the switch element 41. In the sixth embodiment, the on-off state of the switching device 41 can be controlled by controlling the on-off state of the driving power circuit 410 only when the driving power module 43 provides electrical energy to the switch element 41. When the drive power circuit 410 is in a conducting state, the switch element 41 can receive the electrical energy and enter the on state.

As illustrated in FIG. 18, the switch element 41 is a relay K1. The drive power module 43 is electrically coupled to one end of the power supply coil of the relay K1. The power supply coil of the relay K1 can receive the electrical energy of the drive power module 43 when the drive power circuit 410 is conducted, so that the relay K1 is kept in a conducting state because the power supply coil is energized. In one embodiment, the drive power module 43 is electrically coupled to the power connection terminal 20, and the electrical energy of the switch element 41 is provided by the power source that is electrically coupled to the power connection terminal 20. Optionally, in another embodiment, the drive power module 43 may also be electrically coupled to the regulated power module 81, and the electrical energy of the switch element 41 is provided by the stable voltage VCC that is output by the regulated power module 81.

In the sixth embodiment, the on-off state of the drive power circuit 410 is controlled by the switch drive module 42. Specifically, the switch drive module 42 includes a software-driven module **42*a* and a hardware-driven module 42*b* electrically coupled in series in the drive power circuit 410 of the switch element 41. The software-driven module 42*a* and the hardware-driven module 42*b* are configured to cooperatively control the on-off state of the drive power circuit 410, so as to realize the on or off of the switch element 41**.

The software-driven module **42*a* is electrically coupled to the controller 70. The controller 70 is configured to send the drive signal RELAY_EN2 to the software-driven module 42*a*, and the software-driven module 42*a* can conduct the drive power circuit 410** based on the drive signal RELAY_EN.

Specifically, the software-driven module **42*a* includes a software-driven switch Q21 and a drive signal input terminal 421*a*. The software-driven switch Q21 is electrically coupled in series in the drive power circuit 410 of the switch element 41, and configured to control the on-off state of the drive power circuit 410, that is, to realize the conducting or the disconnecting of the drive power circuit 410. The drive signal input terminal 421*a* is electrically coupled to the controller 70, and configured to receive the drive signal RELAY_EN2 output by the controller 70. The software-driven switch Q21 enters the on state when it receives the drive signal RELAY_EN2, so as to conduct the drive power circuit 410 of the switch element 41, so that the switch circuit 40 is in the conducting state. That is, the drive signal RELAY_EN2 is configured to turn on the software-driven switch Q21. Conversely, the software-driven switch Q21 is in the off state when the drive signal RELAY_EN2 is not received, thereby disconnecting the drive power circuit 410 of the switch element 41, and making the switch circuit 40** in the disconnected state.

As illustrated in FIG. 18, a first connection terminal 2 of the software-driven switch Q21 is electrically coupled to the hardware-driven module **42*b*. A second connection terminal 3 of the software-driven switch Q21 is electrically coupled to the other end of the power supply coil of the relay K1 through a resistor R2. A control terminal 1 of the software-driven switch Q21 is electrically coupled to the drive signal input terminal 421*a* through a resistor R17, is electrically coupled to the hardware-driven module 42*b* through a resistor R3, and is electrically coupled to the drive signal input terminal 421*a* through a diode D6. Wherein, An anode of the diode D6 is electrically coupled to the control terminal 1 of the software-driven switch Q21, and a cathode of the diode D6 is electrically coupled to the drive signal input terminal 421*a*. In the sixth embodiment, the software-driven switch Q21 is a transistor that is turned on by a high-level signal, such as an NMOS transistor or an NPN triode, and the drive signal RELAY_EN2 is a high-level signal. Thus, the software-driven switch Q21 can be turned on when it receives the drive signal RELAY_EN2. The hardware-driven module 42*b* is electrically coupled to the positive terminal CAR+. When the hardware-driven module 42*b* detects that the load voltage of the external load meets the preset hardware-driven condition, it conducts the drive power circuit 410**.

Specifically, the hardware-driven module **42*b* includes a hardware-driven switch Q22 and a load voltage detection terminal 421*b*. The hardware-driven switch Q22 is electrically coupled in series in the drive power circuit 410 of the switch element 41, and configured to control the on-off state of the drive power circuit 410, that is, to realize the the conducting or the disconnecting of the drive power circuit 410. The load voltage detection terminal 421*b* is electrically coupled to the positive terminal CAR+ of the load connection terminal 30, and configured to detect the load voltage of the external load through the load connection terminal 30. The hardware-driven switch Q22 can be turned on when the detected load voltage of the external load meets the preset hardware-driven condition. Conversely, when the detected load voltage of the external load does not meet the preset hardware-driven condition, the hardware-driven switch Q22** cannot be turned on, so that the drive power circuit 410 of the switch element 41 is disconnected, so that the switch circuit 40 is in the disconnected state.

As illustrated in FIG. 18, a first connection terminal 2 of the hardware-driven switch Q22 is electrically coupled to the first ground terminal PGND. A second connection terminal 3 of the hardware-driven switch Q22 is electrically coupled to the first connection terminal 2 of the software-driven switch Q21. A control terminal 1 of the hardware-driven switch Q22 is electrically coupled to the load voltage detection terminal 421*b* through a resistor R22, and is electrically coupled to the first ground terminal PGND through a resistor R4. In the sixth embodiment, the hardware-driven switch Q22 is a transistor that is turned on by a high-level signal, such as an NMOS transistor or an NPN triode. In this way, when the external load is coupled to the load connection terminal 30, and the load voltage of the external load is greater than a first preset voltage threshold, for example, 1V, the hardware-driven switch Q22 can be turned on. In the sixth embodiment, the preset hardware-driven condition is that the detected load voltage of the external load is greater than the first preset voltage threshold.

It can be understood that, in the sixth embodiment, the drive power circuit 410 is conducted when the software-driven switch Q21 and the hardware-driven switch Q22 are both in the on state.

Referring to FIG. 17 again, in the sixth embodiment, the smart connection device 106 further includes a button control module 82 electrically coupled to the controller 70. The button control module 82 is able to generate a button instruction in response to a user's pressing operation, so as to force the controller 70 to output the drive signal RELAY_EN2.

It can be understood that working modes of the controller 70 may include an automatic output mode and a forced output mode. In an embodiment, the controller 70 enters the automatic output mode by default after being powered on. When the controller 70 receives the button instruction, the controller 70 enters the forced output mode, and resumes the automatic output mode after outputting the drive signal RELAY_EN2 in response to the button instruction.

The smart connection device 106 also includes a load voltage detection module 83 electrically coupled to the load connection terminal 30. The load voltage detection module 83 is configured to detect, through the load connection terminal 30, the load voltage of the external load, and output a corresponding load voltage sampling signal.

The controller 70 is also electrically coupled to the load voltage detection module 83. The controller 70 is further configured to receive the load voltage sampling signal output by the load voltage detection module 83, and determine whether the voltage value of the load voltage sampling signal is greater than a second preset voltage threshold.

In the sixth embodiment, the controller 70 is further configured to immediately output the drive signal RELAY_EN2 in response to the button instruction only when the controller 70 receives the button instruction and the voltage value of the load voltage sampling signal is greater than the second preset voltage threshold. When the controller 70 receives the button instruction but the voltage value of the load voltage sampling signal is less than or equal to the second preset voltage threshold, the controller 70 does not respond to the button instruction.

It can be understood that when the controller 70 determines that the voltage value of the load voltage sampling signal is greater than the second preset voltage threshold, for example, 0.5V, the controller 70 determines that the external load is correctly coupled to the load connection terminal 30.

When the controller 70 is in the automatic output mode, and when the voltage value of the load voltage sampling signal is greater than the second preset voltage threshold, the controller 70 is further configured to determine whether the load voltage of the external load meets the preset software-driven condition according to the load voltage sampling signal. Wherein, the preset software-driven condition may be set as: a voltage drop of the voltage value of the load voltage sampling signal within a preset time interval meets a preset starting condition.

The controller 70 is further configured to output the drive signal RELAY_EN2 to the software-driven module 42*a* when the controller 70 determines that the load voltage of the external load meets the preset software-driven condition, so as to conduct the drive power circuit 410 of the switch element 41 through the software-driven module 42*a*, so that the switch element 41 is turned on, so that the power source is electrically coupled to the external load, and discharges to the external load.

Taking an example that the external load is a vehicle battery and the power source is a built-in battery pack of a jump starter, in an embodiment, the controller 70 is configured to determine, according to the load voltage sampling signal received within a preset time interval, whether the voltage value of the vehicle battery falls within the preset time interval by an amplitude exceeding a preset amplitude threshold, that is, to determine whether the voltage of the vehicle battery drops sharply. When the controller 70 determines that the voltage value of the vehicle battery falls within the preset time interval by an amplitude exceeding the preset amplitude threshold (that is, the voltage of the vehicle battery drops sharply), and a slope of the voltage drops reaches a preset falling slope, the controller 70 determines that the load voltage of the vehicle battery meets the preset software-driven condition, and outputs the drive signal RELAY_EN2 to conduct the drive power circuit 410, thereby conducting the switch element 41, so that the jump starter is able to provide electrical energy to the vehicle battery.

It is understandable that if the voltage value of the vehicle battery falls within the preset time interval by an amplitude exceeding the preset amplitude threshold, that is, the voltage of the vehicle battery drops sharply, it indicates that the vehicle battery is in use for starting a vehicle. In this case, by turning on the switch element 41, the jump starter can be used to provide electrical energy to the vehicle battery to start the vehicle. It can be understood that the controller 70 does not output the drive signal RELAY_EN2 to turn on the switch element 41 unless the vehicle battery is in use for starting a vehicle. In this way, the electrical energy of the jump starter can be saved, and it can be ensured that the vehicle can be started.

In another embodiment, the controller 70 is configured to determine, according to the received load voltage sampling signal, whether the voltage value of the vehicle battery is less than a third preset voltage threshold. When it is determined that the voltage value of the vehicle battery is less than the third preset voltage threshold, the controller 70 is further configured to determine, according to the load voltage sampling signal received within the preset time interval, whether the voltage value of the vehicle battery falls within the preset time interval by an amplitude exceeding the preset amplitude threshold. When it is determined that the voltage value of the vehicle battery falls within the preset time interval by an amplitude exceeding the preset amplitude threshold, the controller 70 determines that the load voltage of the vehicle battery meets the preset software-driven condition, and outputs the drive signal RELAY_EN2 to conduct the drive power circuit 410, thereby turning on the switch element 41, so that the jump starter can provide electrical energy to the vehicle battery.

It is understandable that if the voltage value of the vehicle battery is less than the third preset voltage threshold, it indicates that the vehicle battery is insufficiently in electric quantity and is in a state of lacking of electricity. If the voltage value of the vehicle battery falls within the preset time interval by an amplitude exceeding the preset amplitude threshold, it indicates that the vehicle battery is in use for starting the vehicle. In this way, the controller 70 does not output the drive signal RELAY_EN2 to turn on the switch element 41 until the smart connection device 106 is correctly coupled to a vehicle battery that is in the state of lacking of electricity and the vehicle battery is in use for starting the vehicle. In this way, it can not only save the electrical energy of the jump starter, but also ensure that the vehicle can be started, and at the same time can prevent the vehicle battery from charging the jump starter.

In the smart connection device 106 provided in the sixth embodiment of the present disclosure, the software-driven module 42*a* and the hardware-driven module 42*b* are provided in the drive power circuit 410 of the switch element 41, to cooperatively control the on-off state of the drive power circuit 410, it can be ensured that the drive power circuit 410 is conducted only when the load voltage of the external load meets the preset software-driven condition and the hardware-driven condition at the same time, so as to conduct the electrical connection between the power source and the external load, so that the power source can discharge to the external load, thereby avoiding electricity safety incidents caused by the user pressing the button control module 82 to forcibly conduct the electrical connection between the power source and the external load when the load voltage of the external load does not meet the starting condition. In addition, the smart connection device 106 can also play the role of double protection, so as to avoid the situation that the switch element 41 cannot be turned off in time when the software or hardware driving circuit is abnormal.

Those skilled in the art can understand that the above-mentioned schematic diagrams illustrated in FIG. 1 to FIG. 18 are only examples of the smart connection devices 100-106 used in the present disclosure to perform functions, such as detecting the connection state of the external load, and controlling, based on the connection state of the external load and/or the load voltage, the power source to discharge to the external load, which do not constitute any limitation on the smart connection devices 100-106. The smart connection devices 100-106 may include more or less components than those illustrated in the schematic diagrams, or may may combine certain components, or different components.

For example, referring to FIG. 3 again, in one embodiment, the smart connection device 101 may further include a load connection state indicating module 60. The load connection state indicating module 60 may include the reverse connection state indication module 61 and a forward connection state indication module 62. When it is determined that the external load is correctly coupled to the load connection terminal 30, the controller 70 may further control the forward connection state indication module 62 to issue an indication signal to provide the user with a corresponding working state indication. The forward connection state indication module 62 may include at least one light-emitting diode or at least one buzzer.

In the embodiments of the present disclosure, the controller 70 may be a programmable control device, such as a micro controller (MCU), a field-programmable gate array (FPGA), or a digital signal processor (DSP), etc. The controller 70 serves as a logic operation and control center of the smart connection device 100, and is mainly responsible for functions such as data collection and conversion, logic operation, data communication, and execution of drive output. The controller 70 is powered by the stable voltage VCC that is output by the regulated power module 81. As illustrated in FIG. 14, the controller 70 can be a micro controller U2 that may include multiple input and output ports. The controller 70 may communicate and exchange information with other functional modules or external devices through the multiple input and output ports, so that the smart connection device 100 can implement the functions such as connection, driving, and control.

Optionally, referring to FIG. 3 again, the smart connection device 101 may further include a communication interface module (not illustrated) electrically coupled to the controller 70. A communication connection may be implemented between the controller 70 and external devices (such as an external power device, or external load) through the communication interface module. In this way, the controller 70 can obtain information (such as current battery voltage, maximum current output capacity, battery temperature, operation state, software version information, etc.) of a battery pack of the external power device, and determine, based on the obtained relevant information, whether electrical parameters of the battery pack of the external power device meets a condition of discharging to the external load, so as to determine whether to output the drive signal RELAY_EN2 to conduct the switch circuit 40. It can be understood that the controller 70 may also send its own software version information, normal and abnormal operation state of the smart connection device 100, voltage and output current signals of the external load, and the like, to the external power device for adaptation and related protection. In other words, through the communication interface module, the controller 70 of the smart connection device 101 can exchange information with the external devices and perform corresponding control.

It can be understood that when the communication provided by the communication interface module is interrupted due to timeout or the data exchanged through the communication interface module is abnormal, or when the voltage provided by the external power device is not within a threshold range set by a program, the controller 70 stops outputting the drive signal RELAY_EN2, thereby disconnecting the switch circuit 40 to cut off the current output circuit 11, and at the same time outputting a corresponding state indications to ensure safety of the system and external devices.

Optionally, the smart connection device 101 further includes a temperature detection module 84 electrically coupled to the controller 70. The temperature detection module 84 is configured to detect operating temperatures of the switch element 41 and/or a built-in battery pack, and the like, and feed back detected temperature values to the controller 70. The controller 70 further analyzes, according to the received temperature values, whether the operating temperatures of the switch element 41 and/or the built-in battery pack exceeds preset thresholds. When it is determined that the operating temperatures of the switch element 41 and/or the built-in battery pack exceeds the preset thresholds, the controller 70 suspends outputting the drive signal RELAY_EN2, so that the switch circuit 40 is disconnected, and the current output circuit 11 is cut off, thereby ensuring the safety of system operation.

Optionally, the smart connection device 101 further includes a current detection module 85 electrically coupled between the power connection terminal 20 and the load connection terminal 30. The current detection module 85 is also electrically coupled to the controller 70. The current detection module 85 is configured to collect the current (that is, the discharge current output by the power source to the external load) in the current output circuit 11 in real time when the switch circuit 40 is in the conducting state, and feed back a detected current sampling signal to the controller 70. In this embodiment, the current detection module 85 is electrically coupled between the negative terminal BAT− and the negative terminal CAR−. In another embodiment, the current detection module 85 may also be electrically coupled between the positive terminal BAT+ and the positive terminal CAR+. The controller 70 further analyzes, based on the received current sampling signal, whether the discharge of the power source is normal. When it is determined that the discharge of the power source is abnormal, the controller 70 suspends outputting the drive signal RELAY_EN2, so that the switch circuit 40 is disconnected, so as to cut off the current output circuit 11, thereby ensuring the safety of system operation.

Optionally, the smart connection device 101 further includes an over-current and short-circuit protection module 86 that is electrically coupled to the current detection module 85 and the controller 70, respectively. The over-current and short-circuit protection module 86 is configured to monitor whether a value of the current sampling signal output by the current detection module 85 exceeds a preset threshold value. When it is determined that the value of the current sampling signal exceeds the preset threshold value, the over-current and short-circuit protection module 86 outputs an interrupt trigger signal to the controller 70, so as to cause the controller 70 to immediately suspend outputting the drive signal RELAY_EN2. In this way, the switch circuit 40 can be quickly disconnected, so as to cut off the current output circuit 11, thereby ensuring the safety of system operation. In another embodiment, an output terminal of the over-current and short-circuit protection module 86 may also be directly coupled to the switch circuit 40, so that the switch circuit 40 is directly disconnected when the value of the current sampling signal exceeds the preset threshold value.

Figure 19:
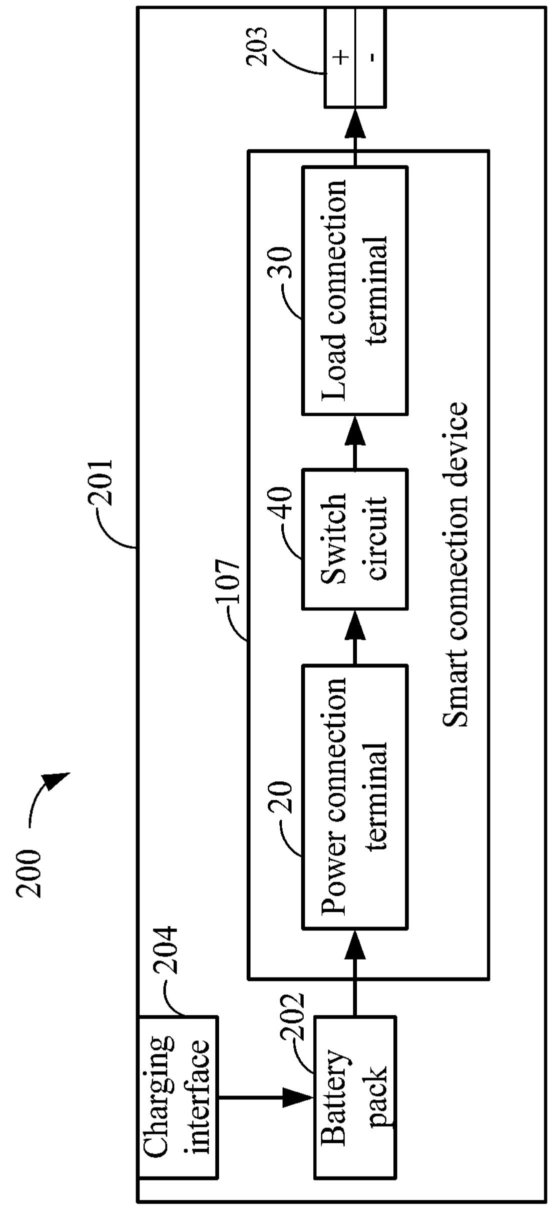
FIG. 19 is a schematic diagram of functional modules of a jump starter according to an embodiment of the present disclosure.
Figure 20:
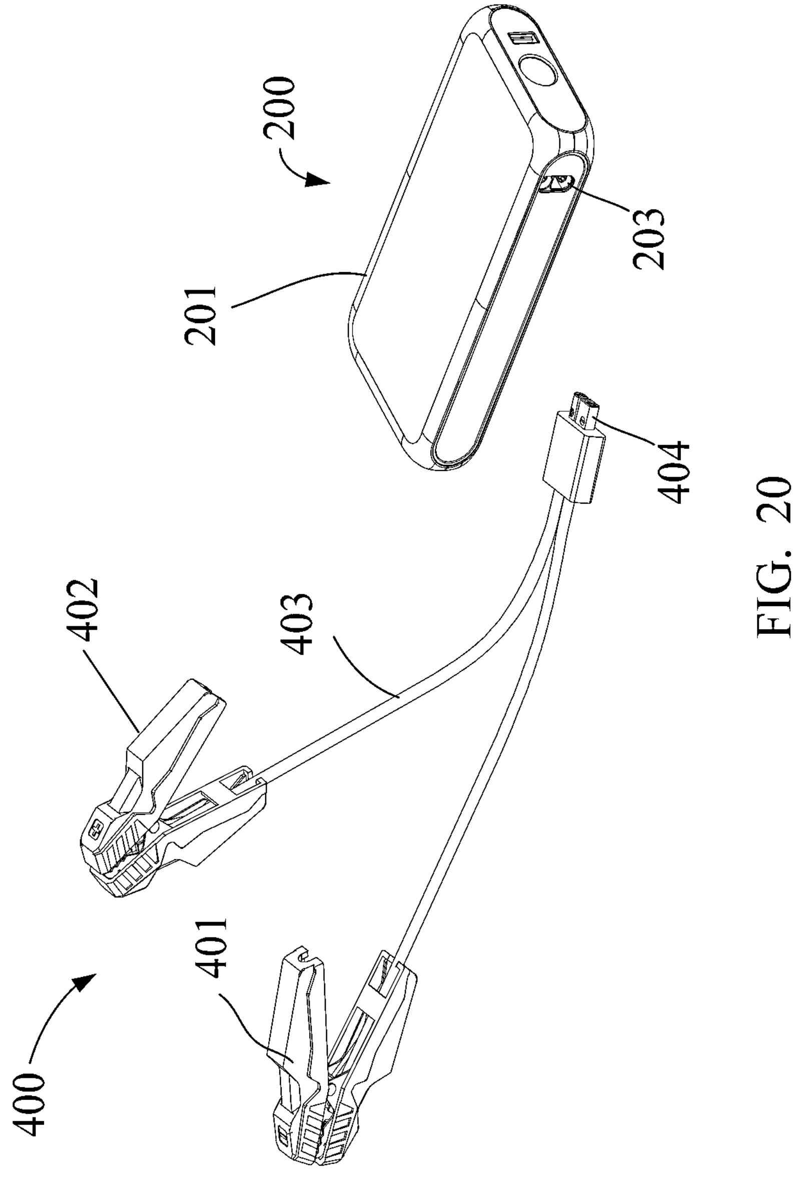
FIG. 20 is a structural diagram of the jump starter illustrated in FIG. 19.

Referring to FIG. 19 to FIG. 20, the present disclosure further provides a jump starter 200. As illustrated in FIG. 19, the jump starter 200 includes a housing 201, a battery pack 202, and a smart connection device 107. Wherein, the smart connection device 107 may adopt the structures of the smart connection device 100-106 provided in any one of the foregoing embodiments. The battery pack 202 and at least part of the structures of the smart connection device 107, such as the power connection terminal 20, the load connection terminal 30, the switch circuit 40, the drive power module 43, the detection unit 50, the controller 70, the regulated power module 81, the load voltage detection module 83, the temperature detection module 84, the current detection module 85, the over-current and short circuit protection module 86, etc., may be provided in the housing 201. At least part of the structures of the smart connection device 107, such as the load connection state indication module 60, the button control module 82, etc., may be provided on the housing 201.

In this embodiment, the jump starter 200 further includes a charging interface 204 provided on the housing 201. The charging interface 204 is configured to electrically couple to an external power source, such as a commercial power source, to receive external power from the external power source to charge the battery pack 202. The type of the charging interface 204 includes but is not limited to a DC interface, a USB interface, a Micro USB interface, a Mini USB interface, a Type-A interface, and a Type-C interface.

The power connection terminal 20 of the smart connection device 107 is electrically coupled to the battery pack 202 of the jump starter 200.

In this embodiment, as illustrated in FIG. 19-FIG. 20, the jump starter 200 further includes a connection jack 203 provided on the housing 201. The connection jack 203 is electrically coupled to the load connection terminal 30 of the smart connection device 107. The connection jack 203 is configured to electrically couple to the external load through an external connection element 400. That is, one end of the connection element 400 is detachably connected to the connection jack 203, and the other end is detachably connected to the external load. An appearance structure of the jump starter 200 may adopt the structure of the jump starter 200 illustrated in FIG. 20 or other structures, and the appearance structure of the jump starter 200 is not specifically limited in the present disclosure.

In this embodiment, the connection element 400 is a wire clamp including a first wire clamp 401, a second wire clamp 402, cables 403, and a connection plug 404. The cables 403 are configured to connect the first wire clamp 401 and the second wire clamp 402 to the connection plug 404 respectively. The connection terminal 404 is electrically and detachably connected to the connection jack 203. The first wire clamp 401 is configured to clamp the positive electrode of the external load, the second wire clamp 402 is configured to clamp the negative electrode of the external load. Under a correct operation, the positive electrode of the external load is electrically coupled to the positive terminal CAR+ through the first wire clamp 401, the connection plug 404, and the connection jack 203. The negative electrode of the external load is electrically coupled to the negative terminal CAR− of the load connection terminal 30 through the second wire clamp 402, the connection plug 404, and the connection jack 203.

Figure 21:
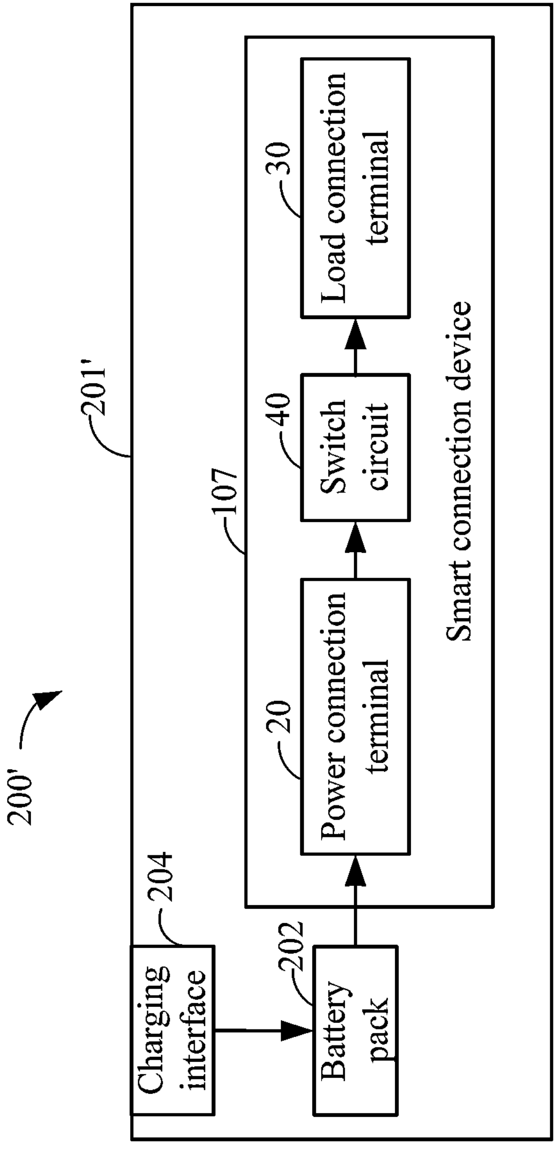
FIG. 21 is a schematic diagram of functional modules of a jump starter according to another embodiment of the present disclosure.
Figure 22:
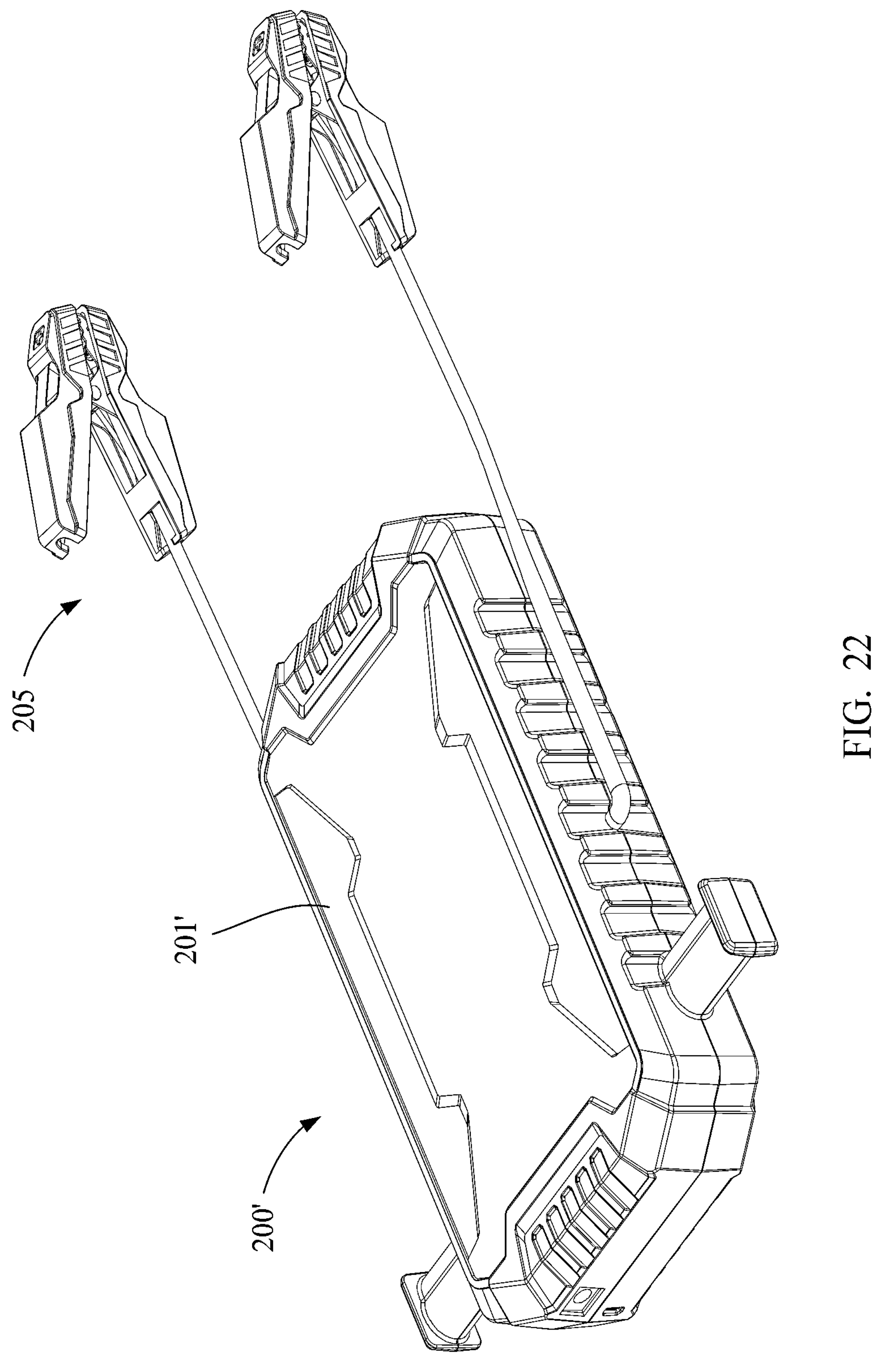
FIG. 22 is a structural diagram of the jump starter illustrated in FIG. 21.

Optionally, in another embodiment, as illustrated in FIG. 21-FIG. 22, a jump starter 200' further includes a connection element 205. One end of the connection element 205 is electrically coupled to the load connection terminal 30 of the smart connection device 107, and the other end of the connection element 205 is configured to electrically couple with the external load. In other words, one end of the connection element 205 is built into the jump starter 200'. In the another embodiment, the connection element 205 is a wire clamp. The structures of the connection element 205 are similar to the structures of the connection element 400 except that the connection plug 404 is not included, which is not repeated here.

In the jump starters 200 and 200' provided in the present disclosure, the above-mentioned smart connection device 107 is employed. When the detection unit 50 detects that the external load is reversely coupled to the load connection terminal, the switch circuit 40 electrically coupled between the external load and the power source can be disconnected in time, so as to achieve the objectives of rapidly responding to the reverse connection state of the external load and preventing the power source from discharging to the external load in time, thereby significantly improving the detection speed and effectiveness of relevant protection functions, and therefore, can significantly improve the safety and reliability of the power output control system. In addition, in the smart connection device 107 provided in the present disclosure, key components are low in cost, and peripheral circuits are simple and reliable, which not only reduces the material cost of the jump starter 200 or 200', but also saves labor cost and material cost of after-sales products.

Figure 23:
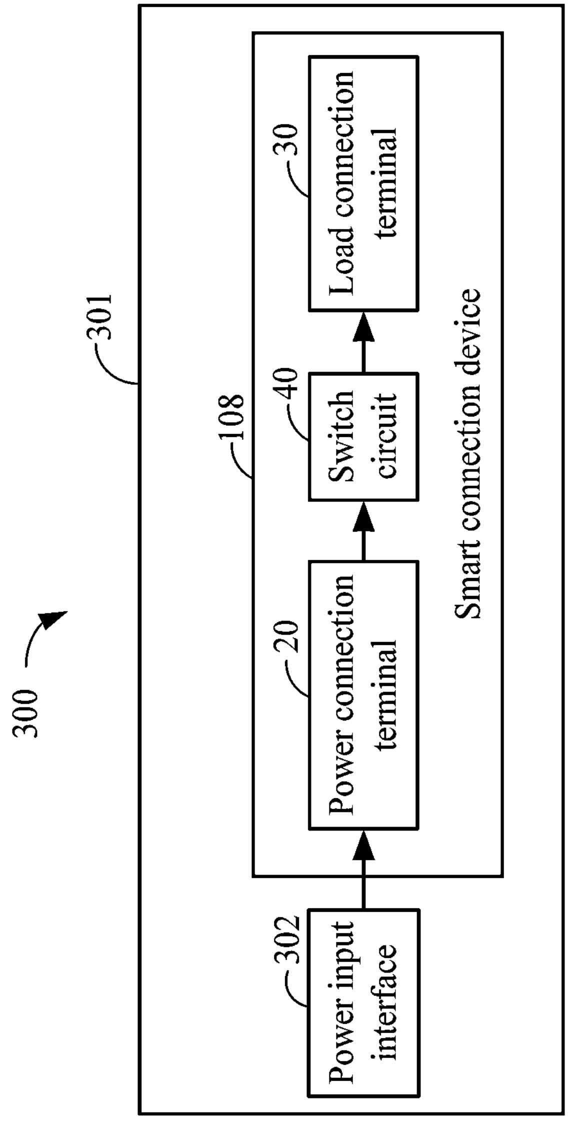
FIG. 23 is a schematic diagram of functional modules of a battery clamp according to an embodiment of the present disclosure.
Figure 24:
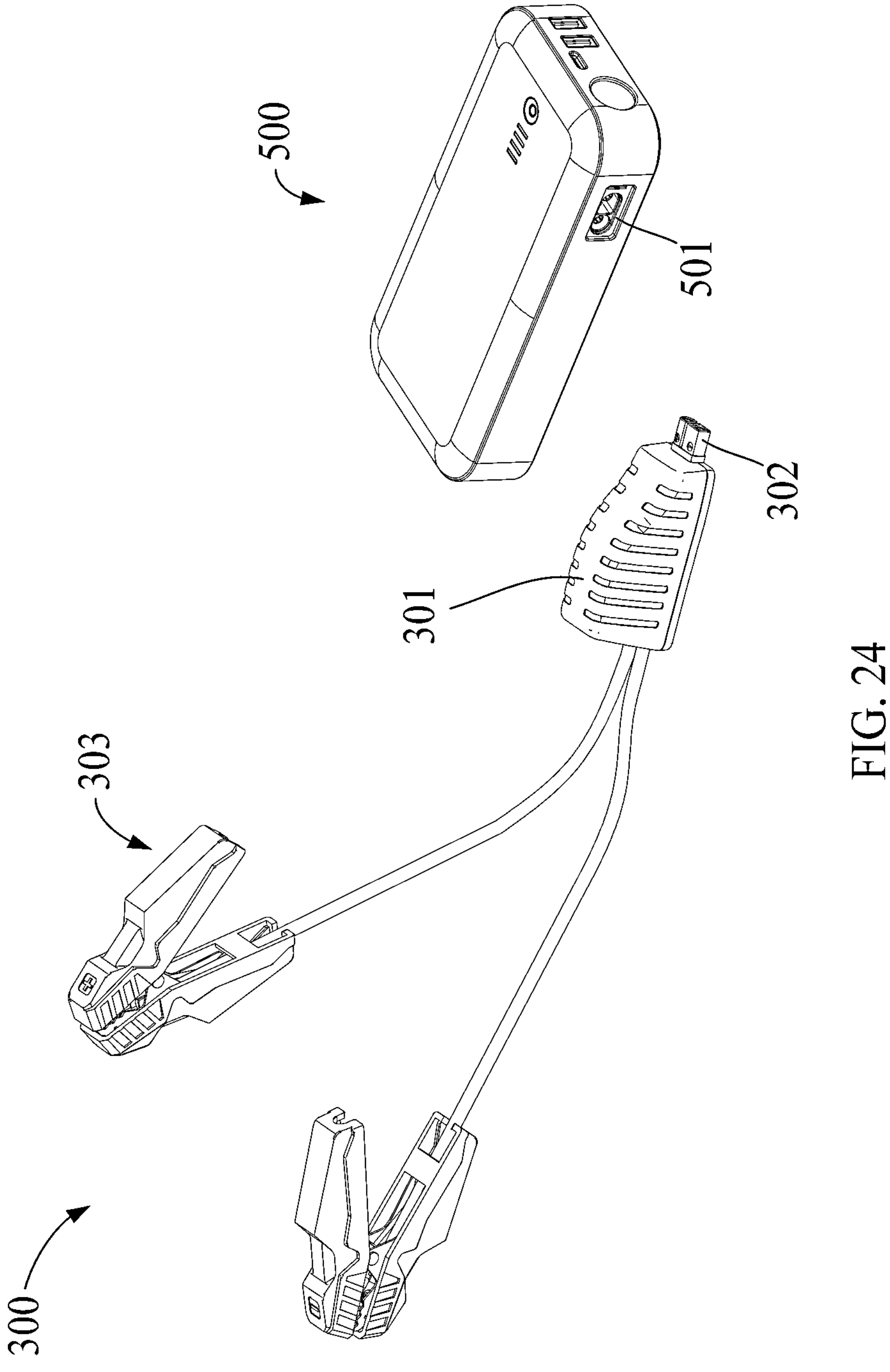
FIG. 24 is a structural schematic diagram of the battery clamp illustrated in FIG. 23.

Referring to FIG. 23-FIG. 24, the present disclosure further provides a battery clamp 300. As illustrated in FIG. 23, the battery clamp 300 includes a housing 301, a power input interface 302, a connection element 303 and a smart connecting device 108. Wherein, the smart connection device 108 may adopt the structures of the smart connection device 100-106 provided in any one of the foregoing embodiments. The power input interface 302 is provided on the housing 301, and the power input interface 302 is configured to electrically couple with an external power device 500, such as an emergency jump starter, wherein the external power device 500 includes a battery pack (not illustrated). In this embodiment, the power input interface 302 is a connection plug. The external power device 500 further includes a connection jack 501 adapted to the power input interface 302 of the battery clamp 300. The battery clamp 300 is electrically coupled to the external power device 500 through a detachable electrical connection between the power input interface 302 and the connection jack 501.

At least part of the structures of the smart connection device 108, such as the power connection terminal 20, the load connection terminal 30, the switch circuit 40, the drive power module 43, the detection unit 50, the controller 70, the regulated power module 81, the load voltage detection module 83, the temperature detection module 84, the current detection module 85, the over-current and short-circuit protection module 86, etc., may be provided in the housing 301. At least part of the structures of the smart connection device 108, such as the load connection status indicator module 60, the button control module 82 and the like may be provided on the housing 301.

The power connection terminal 20 of the smart connection device 108 is electrically coupled to the power input interface 302, and is electrically coupled to the battery pack of the external power device 500 through the power input interface 302.

One end of the connection element 303 is electrically coupled to the load connection terminal 30 of the smart connection device 108, and the other end of the connection element 303 is configured to electrically couple to an external load. In this embodiment, the connection member 303 is a wire clamp. Wherein, the structures of the connection element 303 are similar to the structures of the connection element 400 except that the connection plug 404 is not included, which is not repeated here.

An appearance structure of the battery clamp 300 may adopt the structure of the battery clamp 300 illustrated in FIG. 24 or other structures, and the appearance structure of the battery clamp 300 is not specifically limited in the present disclosure.

In the battery clamp 300 provided in the present disclosure, the above-mentioned smart connection device 108 is employed. When the detection unit 50 detects that the external load is reversely coupled to the load connection terminal, the switch circuit 40 electrically coupled between the external load and the power source can be disconnected in time, so as to achieve the objective of quickly responding to the reverse connection state of the external load and preventing the power source from discharging to the external load in time, thereby significantly improving the detection speed and effectiveness of relevant protection functions, and therefore, can significantly improve the safety and reliability of the power output control system. In addition, in the smart connection device 108 provided in the present disclosure, key components are low in cost, and peripheral circuits are simple and reliable, which not only reduces the material cost of the battery clamp 300, but also saves labor cost and material cost of after-sales products.

Finally, it should be noted that the above embodiments are only used to illustrate the technical solutions of the present disclosure, not to limit it. Although the present disclosure has been described in detail with reference to the above preferred embodiments, those skilled in the art should understand that modification or equivalent replacement of the technical solution of the present disclosure should not depart from the spirit and scope of the technical solution of the present disclosure.

What is claimed is:

1. A smart connection device, comprising:

a power connection terminal configured to electrically couple with a power source;

a load connection terminal configured to electrically couple with an external load;

a switch circuit comprising a switch element and a switch drive module, wherein the switch element is electrically coupled between the power connection terminal and the load connection terminal;

the switch drive module is electrically coupled to the switch element and configured to turn on or turn off the switch element; and a reverse connection detection module electrically coupled to the load connection terminal, wherein the reverse connection detection module is configured to detect a connection state between the load connection terminal and the external load, and output a corresponding control signal according to a detected connection state;

wherein the control signal is configured to switch operation states of the switch drive module, wherein the operation states of the switch drive module comprises an active state and a disable state;

wherein the switch drive module is able to respond to a drive signal to turn on the switch element when the switch drive module is in the active state, thereby conducting an electrical connection between the power source and the external load, so as to realize the discharge of the power source to the external load; wherein the switch element is in an off state when the switch drive module is in the disable state, thereby disconnecting the electrical connection between the power source and the external load, so as to prevent the power source from discharging to the external load.

2. The smart connection device of claim 1, wherein the control signal comprises a first control signal; wherein the reverse connection detection module is configured to output the first control signal when it detects that the external load is reversely coupled to the load connection terminal;

wherein the switch drive module is in the disable state based on the first control signal.

3. The smart connection device of claim 1, wherein the control signal comprises a second control signal; wherein the reverse connection detection module is configured to output the second control signal when it detects that the load connection terminal is under a no-load state or the external load is correctly coupled to the load connection terminal;

wherein the switch drive module is in the active state based on the second control signal.

4. The smart connection device of claim 2, wherein the smart connection device further comprises a disable control module electrically coupled to the reverse connection detection module and the switch drive module respectively; wherein the disable control module is configured to output a disable signal to switch the operation state of the switch drive module to the disable state;

wherein the reverse connection detection module is configured to send the first control signal to the disable control module to control the disable control module to output the disable signal.

5. The smart connection device of claim 3, wherein the smart connection device further comprises a disable control module electrically coupled to the reverse connection detection module and the switch drive module respectively; wherein the disable control module is configured to output a disable signal to switch the operation state of the switch drive module to the disable state;

wherein the reverse connection detection module is configured to send the second control signal to the disable control module to prevent the disable control module from outputting the disable signal, so that the operation state of the switch drive module is able to be in the active state.

6. The smart connection device of claim 4, wherein the switch drive module comprises:

a switch unit electrically coupled in series in a drive power circuit of the switch element, wherein the switch unit is configured to control an on-off state of the drive power circuit; wherein the switch element is able to receive electrical energy and enter an on state when the drive power circuit is in a conducting state; and a drive signal input terminal electrically coupled to a control terminal of the switch unit and configured to receive the drive signal, wherein the drive signal is configured to turn on the switch unit, so as to conduct the drive power circuit;

the control terminal of the switch unit is further electrically coupled to the disable control module to receive a disable signal output by the disable control module, wherein the disable signal is configured to forcibly turn off the switch unit, so as to disconnect the drive power circuit;

wherein the switch unit preferentially responds to the disable signal when it receives the drive signal and the disable signal at the same time.

7. The smart connection device of claim 4, wherein the disable control module comprises a disable signal output terminal and a disable control switch, wherein the disable control switch is electrically coupled between the disable signal output terminal and a ground terminal;

the reverse connection detection module is electrically coupled to the control terminal of the disable control switch, and sends the control signal to the control terminal of the disable control switch to switch an on-off state of the disable control switch, thereby controlling an output state of the disable control module;

wherein the disable control switch enters an on state when it receives the first control signal output by the reverse connection detection module, so that the disable control module outputs a low-level signal, wherein the low-level signal is the disable signal.

8. The smart connection device of claim 5, wherein the disable control module comprises a disable signal output terminal and a disable control switch, wherein the disable control switch is electrically coupled between the disable signal output terminal and a ground terminal;

the reverse connection detection module is electrically coupled to the control terminal of the disable control switch, and sends the control signal to the control terminal of the disable control switch to switch an on-off state of the disable control switch, thereby controlling an output state of the disable control module;

wherein the disable control switch enters an off state when it receives the second control signal output by the reverse connection detection module, so that the disable control module is in a non-output state, thereby preventing the disable control module from outputting the disable signal.

9. The smart connection device of claim 4, wherein the disable control module comprises a disable signal output terminal and a disable control switch, wherein the disable control switch is electrically coupled between the disable signal output terminal and a ground terminal;

wherein the load connection terminal comprises a positive terminal and a negative terminal, wherein the negative terminal of the load connection terminal is electrically coupled to a first ground terminal;

the reverse connection detection module comprises:

a first detection terminal electrically coupled to the positive terminal of the load connection terminal;

a second detection terminal electrically coupled to the negative terminal of the load connection terminal; and a control signal output terminal;

wherein when the external load is reversely coupled to the load connection terminal, the control signal output terminal outputs the first control signal, thereby turning on the disable control switch, so that the disable control module outputs the disable signal;

when the load connection terminal is under a no-load state or the external load is correctly coupled to the load connection terminal, the control signal output terminal outputs a second control signal, thereby turning off the disable control switch, so that the disable control module is in the non-output state.

10. The smart connection device of claim 1, wherein the smart connection device further comprises a controller and a button control module electrically coupled to the controller, wherein the button control module is configured to receive a user's pressing operation to generate a button instruction, and send the button instruction to the controller to force the controller to output the drive signal;

the controller is further electrically coupled to the switch drive module and configured to output the drive signal to the switch drive module when the controller receives the button instruction.

11. The smart connection device of claim 1, wherein the smart connection device further comprises:

a load voltage detection module electrically coupled to the load connection terminal, wherein the load voltage detection module is configured to detect a load voltage of the external load through the load connection terminal, and output a corresponding load voltage sample signal;

a controller electrically coupled to the load voltage detection module and the switch drive module respectively, wherein the controller is configured to receive the load voltage sampling signal output by the load voltage detection module, and determine a connection state and a voltage change state of the external load according to the load voltage sampling signal;

the controller is further configured to output the drive signal to the switch circuit when it determines that the external load is correctly coupled to the load connection terminal and the load voltage of the external load meets a preset starting condition, so as to turn on the switch circuit.

12. The smart connection device of claim 1, wherein the smart connection device further comprises a reverse connection state indication module electrically coupled to the reverse connection detection module, wherein the reverse connection detection module is further configured to send the control signal to the reverse connection state indication module, to control the reverse connection state indication module to issue an alarm signal for indicating a reverse connection alarm prompt.

13. A jump starter, comprising: a battery pack; and a smart connection device comprising: a power connection terminal electrically couple with the battery pack; a load connection terminal configured to electrically couple with an external load; a switch circuit comprising a switch element and a switch drive module, wherein the switch element is electrically coupled between the power connection terminal and the load connection terminal; the switch drive module is electrically coupled to the switch element and configured to turn on or turn off the switch element; and a reverse connection detection module electrically coupled to the load connection terminal, wherein the reverse connection detection module is configured to detect a connection state between the load connection terminal and the external load, and output a corresponding control signal according to a detected connection state; wherein the control signal is configured to switch operation states of the switch drive module, wherein the operation states of the switch drive module comprises an active state and a disable state; wherein the switch drive module is able to respond to a drive signal to turn on the switch element when the switch drive module is in the active state, thereby conducting an electrical connection between the battery pack and the external load, so as to realize the discharge of the battery pack to the external load; wherein the switch element is in an off state when the switch drive module is in the disable state, thereby disconnecting the electrical connection between the battery pack and the external load, so as to prevent the battery pack from discharging to the external load.

14. The jump starter of claim 13, wherein the control signal comprises a first control signal; wherein the reverse connection detection module is configured to output the first control signal when it detects that the external load is reversely coupled to the load connection terminal;

wherein the switch drive module is in the disable state based on the first control signal.

15. The jump starter of claim 13, wherein the control signal comprises a second control signal; wherein the reverse connection detection module is configured to output the second control signal when it detects that the load connection terminal is under a no-load state or the external load is correctly coupled to the load connection terminal;

wherein the switch drive module is in the active state based on the second control signal.

16. The jump starter of claim 14, wherein the smart connection device further comprises a disable control module electrically coupled to the reverse connection detection module and the switch drive module respectively; wherein the disable control module is configured to output a disable signal to switch the operation state of the switch drive module to the disable state;

wherein the reverse connection detection module is configured to send the first control signal to the disable control module to control the disable control module to output the disable signal.

17. The jump starter of claim 15, wherein the smart connection device further comprises a disable control module electrically coupled to the reverse connection detection module and the switch drive module respectively; wherein the disable control module is configured to output a disable signal to switch the operation state of the switch drive module to the disable state;

wherein the reverse connection detection module is configured to send the second control signal to the disable control module to prevent the disable control module from outputting the disable signal, so that the operation state of the switch drive module is able to be in the active state.

18. The jump starter of claim 16, wherein the switch drive module comprises:

a switch unit electrically coupled in series in a drive power circuit of the switch element, wherein the switch unit is configured to control an on-off state of the drive power circuit; wherein the switch element is able to receive electrical energy and enter an on state when the drive power circuit is in a conducting state; and a drive signal input terminal electrically coupled to a control terminal of the switch unit and configured to receive the drive signal, wherein the drive signal is configured to turn on the switch unit, so as to conduct the drive power circuit;

the control terminal of the switch unit is further electrically coupled to the disable control module to receive a disable signal output by the disable control module, wherein the disable signal is configured to forcibly turn off the switch unit, so as to disconnect the drive power circuit;

wherein the switch unit preferentially responds to the disable signal when it receives the drive signal and the disable signal at the same time.

19. The jump starter of claim 16, wherein the disable control module comprises a disable signal output terminal and a disable control switch, wherein the disable control switch is electrically coupled between the disable signal output terminal and a ground terminal;

the reverse connection detection module is electrically coupled to the control terminal of the disable control switch, and sends the control signal to the control terminal of the disable control switch to switch an on-off state of the disable control switch, thereby controlling an output state of the disable control module;

wherein the disable control switch enters an on state when it receives the first control signal output by the reverse connection detection module, so that the disable control module outputs a low-level signal, wherein the low-level signal is the disable signal.

20. The jump starter of claim 17, wherein the disable control module comprises a disable signal output terminal and a disable control switch, wherein the disable control switch is electrically coupled between the disable signal output terminal and a ground terminal;

the reverse connection detection module is electrically coupled to the control terminal of the disable control switch, and sends the control signal to the control terminal of the disable control switch to switch an on-off state of the disable control switch, thereby controlling an output state of the disable control module;

wherein the disable control switch enters an off state when it receives the second control signal output by the reverse connection detection module, so that the disable control module is in a non-output state, thereby preventing the disable control module from outputting the disable signal.

21. The jump starter of claim 13, wherein the jump starter further comprises a housing and a connection jack provided on the housing, wherein the connection jack is electrically coupled to the load connection terminal of the smart connection device, and is configured to electrically couple with the external load through an external connection element; or the jump starter further comprises a connection element, wherein one end of the connection element is electrically coupled to the load connection terminal of the smart connection device, and the other end of the connection element is configured to electrically couple with the external load.

22. A battery clamp, comprising: a housing; a power input interface provided on the housing, wherein the power input interface is configured to electrically couple with an external power device, wherein the external power device comprises a battery pack; and a connection element; a smart connection device comprising: a power connection terminal electrically coupled to the power input interface, and electrically coupled to the battery pack of the external power device through the power input interface; a load connection terminal electrically coupled to one end of the connection element, wherein the other end of the connection element is configured to electrically couple with an external load; a switch circuit comprising a switch element and a switch drive module, wherein the switch element is electrically coupled between the power connection terminal and the load connection terminal; the switch drive module is electrically coupled to the switch element and configured to turn on or turn off the switch element; and a reverse connection detection module electrically coupled to the load connection terminal, wherein the reverse connection detection module is configured to detect a connection state between the load connection terminal and the external load, and output a corresponding control signal according to a detected connection state; wherein the control signal is configured to switch operation states of the switch drive module, wherein the operation states of the switch drive module comprises an active state and a disable state; wherein the switch drive module is able to respond to a drive signal to turn on the switch element when the switch drive module is in the active state, thereby conducting an electrical connection between the battery pack and the external load, so as to realize the discharge of the battery pack to the external load; wherein the switch element is in an off state when the switch drive module is in the disable state, thereby disconnecting the electrical connection between the battery pack and the external load, so as to prevent the battery pack from discharging to the external load.

23. The battery clamp of claim 22, wherein the control signal comprises a first control signal; wherein the reverse connection detection module is configured to output the first control signal when it detects that the external load is reversely coupled to the load connection terminal;

wherein the switch drive module is in the disable state based on the first control signal.

24. The battery clamp of claim 22, wherein the control signal comprises a second control signal; wherein the reverse connection detection module is configured to output the second control signal when it detects that the load connection terminal is under a no-load state or the external load is correctly coupled to the load connection terminal;

wherein the switch drive module is in the active state based on the second control signal.

25. The battery clamp of claim 23, wherein the smart connection device further comprises a disable control module electrically coupled to the reverse connection detection module and the switch drive module respectively; wherein the disable control module is configured to output a disable signal to switch the operation state of the switch drive module to the disable state;

wherein the reverse connection detection module is configured to send the first control signal to the disable control module to control the disable control module to output the disable signal.

26. The battery clamp of claim 24, wherein the smart connection device further comprises a disable control module electrically coupled to the reverse connection detection module and the switch drive module respectively; wherein the disable control module is configured to output a disable signal to switch the operation state of the switch drive module to the disable state;

wherein the reverse connection detection module is configured to send the second control signal to the disable control module to prevent the disable control module from outputting the disable signal, so that the operation state of the switch drive module is able to be in the active state.

27. The battery clamp of claim 25, wherein the switch drive module comprises:

a switch unit electrically coupled in series in a drive power circuit of the switch element, wherein the switch unit is configured to control an on-off state of the drive power circuit; wherein the switch element is able to receive electrical energy and enter an on state when the drive power circuit is in a conducting state; and a drive signal input terminal electrically coupled to a control terminal of the switch unit and configured to receive the drive signal, wherein the drive signal is configured to turn on the switch unit, so as to conduct the drive power circuit;

the control terminal of the switch unit is further electrically coupled to the disable control module to receive a disable signal output by the disable control module, wherein the disable signal is configured to forcibly turn off the switch unit, so as to disconnect the drive power circuit;

wherein the switch unit preferentially responds to the disable signal when it receives the drive signal and the disable signal at the same time.

28. The battery clamp of claim 25, wherein the disable control module comprises a disable signal output terminal and a disable control switch, wherein the disable control switch is electrically coupled between the disable signal output terminal and a ground terminal;

the reverse connection detection module is electrically coupled to the control terminal of the disable control switch, and sends the control signal to the control terminal of the disable control switch to switch an on-off state of the disable control switch, thereby controlling an output state of the disable control module;

wherein the disable control switch enters an on state when it receives the first control signal output by the reverse connection detection module, so that the disable control module outputs a low-level signal, wherein the low-level signal is the disable signal.

29. The battery clamp of claim 26, wherein the disable control module comprises a disable signal output terminal and a disable control switch, wherein the disable control switch is electrically coupled between the disable signal output terminal and a ground terminal;

the reverse connection detection module is electrically coupled to the control terminal of the disable control switch, and sends the control signal to the control terminal of the disable control switch to switch an on-off state of the disable control switch, thereby controlling an output state of the disable control module;

wherein the disable control switch enters an off state when it receives the second control signal output by the reverse connection detection module, so that the disable control module is in a non-output state, thereby preventing the disable control module from outputting the disable signal.

* * * * *